(12) United States Patent
Kojima

(10) Patent No.: US 7,280,699 B2
(45) Date of Patent: Oct. 9, 2007

(54) COMPRESSING AND RESTORING METHOD OF IMAGE DATA BASED ON DOT AREAS AND POSITIONS

(75) Inventor: Shouichi Kojima, Saitama-ken (JP)

(73) Assignee: Venture Wave Inc., Tokyo (JP)

( * ) Notice: Subject to any disclaimer, the term of this patent is extended or adjusted under 35 U.S.C. 154(b) by 669 days.

(21) Appl. No.: 10/148,893

(22) PCT Filed: Dec. 20, 2000

(86) PCT No.: PCT/JP00/09011

§ 371 (c)(1),
(2), (4) Date: Jun. 18, 2002

(87) PCT Pub. No.: WO01/47243

PCT Pub. Date: Jun. 28, 2001

(65) Prior Publication Data

US 2002/0181792 A1     Dec. 5, 2002

(30) Foreign Application Priority Data

Dec. 20, 1999  (JP)  ............................... 11-360326
Apr. 5, 2000   (JP)  ............................. 2000-103889
Dec. 18, 2000  (JP)  ............................. 2000-383573

(51) Int. Cl.
  G06K 9/36   (2006.01)
  G06K 15/00  (2006.01)
  G06K 9/34   (2006.01)

(52) U.S. Cl. ................... 382/238; 382/176; 382/239; 358/3.12

(58) Field of Classification Search ............... None
See application file for complete search history.

(56) References Cited

U.S. PATENT DOCUMENTS 4,350,996 A  *  9/1982  Rosenfeld ................. 358/536
4,870,695 A  *  9/1989  Gonzales et al. ........... 382/238
5,040,060 A     8/1991  Owada et al.
5,384,643 A     1/1995  Inga et al.
5,394,534 A     2/1995  Kulakowski et al.

(Continued)

FOREIGN PATENT DOCUMENTS

EP     0 411 231 A2    2/1991

(Continued)

OTHER PUBLICATIONS

European Search Report dated Aug. 7, 2006.

(Continued)

*Primary Examiner*—Wenpeng Chen
(74) *Attorney, Agent, or Firm*—Westerman, Hattori, Daniels & Adrian, LLP.

(57) ABSTRACT

A method for compressing/restoring image data free from degradation of image quality caused by compression/decompression, a method for compressing image data at high compression ratio, and its restoring method are disclosed. In the image data compressing method, image elements contained in a digital image read from a sheet of paper are extracted (S02), each of the extracted image elements (51-53) is subjected to data compression by a compression method corresponding to the type of the image element (S03-S05), and the compressed image element data (54-56) are stored.

15 Claims, 38 Drawing Sheets

U.S. PATENT DOCUMENTS

| | | | |
|---|---|---|---|
| 5,416,602 A | | 5/1995 | Inga et al. |
| 5,504,842 A | | 4/1996 | Gentile |
| 5,542,031 A | | 7/1996 | Douglass et al. |
| 5,563,649 A | | 10/1996 | Gould et al. |
| 5,764,807 A | * | 6/1998 | Pearlman et al. ............ 382/240 |
| 5,768,142 A | | 6/1998 | Jacobs |
| 5,778,092 A | | 7/1998 | MacLeod et al. |
| 5,832,126 A | | 11/1998 | Tanaka |
| 5,839,380 A | | 11/1998 | Muto |
| 5,887,082 A | | 3/1999 | Mitsunaga et al. |
| 5,898,166 A | * | 4/1999 | Fukuda et al. ............... 235/494 |
| 5,900,952 A | | 5/1999 | Fan |
| 5,949,968 A | | 9/1999 | Gentile |

FOREIGN PATENT DOCUMENTS

| | | |
|---|---|---|
| EP | 0 448 102 A1 | 9/1991 |
| EP | 0 448 725 A1 | 10/1991 |
| EP | 0 597 571 | 5/1994 |
| EP | 0 597 571 A2 | 5/1994 |
| EP | 0 674 289 A2 | 9/1995 |
| EP | 0 856 988 A2 | 8/1998 |
| EP | 0 910 205 A2 | 4/1999 |
| JP | 50-40015 | 7/1975 |
| JP | 62-082771 | 4/1987 |
| JP | 62-083771 | 4/1987 |
| JP | 63-075881 | 4/1988 |
| JP | 01-112377 | 5/1989 |
| JP | 03-146996 | 6/1991 |
| JP | 04-195261 A | 7/1992 |
| JP | 05-075872 A | 3/1993 |
| JP | 07-123237 | 5/1995 |
| JP | 08-204968 | 8/1996 |
| JP | 08-298589 | 11/1996 |
| JP | 10-041699 A | 2/1998 |
| JP | 10-150575 A | 6/1998 |
| JP | 10-285405 A | 10/1998 |
| JP | 11-069179 A | 3/1999 |
| JP | 11-261812 A | 9/1999 |

OTHER PUBLICATIONS

Canadian Office Action dated Mar. 20, 2006.
Canadian Office Action dated Sep. 25, 2006, issued in corresponding Canadian Application No. 2,499,286.
European Search Report dated Nov. 8, 2006 issued in corresponding European Application No. 00985788.9.
Canadian Office Action dated May 16, 2007, Application No. 2,394,545.

* cited by examiner

<PAPER SURFACE>

40

Fig. 5
<PAPER SURFACE>
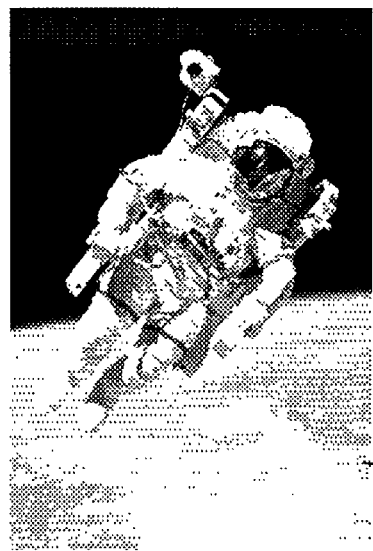
33
36

(ZERO)

(LOWER RIGHT)

(MIDDLE)

(UPPER RIGHT)

(RIGHT 1)

(− RIGHT 1)

I SCREEN

II SCREEN

III SCREEN

IV SCREEN

COMPRESSING AND RESTORING METHOD OF IMAGE DATA BASED ON DOT AREAS AND POSITIONS

TECHNICAL FIELD

The present invention relates to a compressing and restoring method of image data.

BACKGROUND ART

In order to effectively utilize resources used for processing image data, compressing and restoring methods of image data are widely used.

As one of the compressing and restoring methods of image data, a method is known in which all the image elements included in image data are compressed and restored on the basis of one algorithm. In the conventional method of compressing and restoring image data, image data including various kinds of image elements, such as types, handwritten characters, handwritten drawings, free micro dots, tables, illustrations, graphics, tints and photographs are compressed and restored on the basis of the one algorithm.

However, the conventional method of compressing and restoring the image data is difficult to suppress deterioration in a picture quality caused by the compression of the image data for all the image elements included in the image data. For example, when an algorithm which suppresses deterioration of the picture quality in compressing and restoring an image data generated from a photograph is used to compress and restore other image data generated from characters and lines, the edges of the characters and the lines are not clearly restored. Conversely, when another algorithm which suppresses deterioration of the picture quality in compressing and restoring image data generated from characters and lines is used to compress and restore the image data generated from photographs, the image of the photograph tend to be distorted.

A compressing and restoring method of the image data is desirably designed so as to suppress the deterioration in the picture quality caused by the compression of the image data.

Moreover, the conventional method of compressing and restoring the image data is difficult to attain both the improvement of a compression rate and the suppression of the deterioration in the image data caused by the compression of the image data with respect to all the image elements. If image data generated from the image elements such as types, handwritten characters, handwritten drawings, tables and illustrations is compressed and restored on the basis of the algorithm effective for image data generated from photographs, edges of the image elements are disgracefully restored. Furthermore, a focus of the restored picture becomes loose. On the other hand, use of an effective method for compressing the line pictures and the like deteriorates the picture qualities of graphics, tints, photographs and the like. Moreover, a data amount of the compressed data is increased.

The compressing and restoring method of the image data is desirably designed to increase the compression rate and to suppress deterioration of the picture quality caused by the compression of the image data.

Also, operations of compressing and restoring image data generated from pictures drawn on printed matters are generally carried out. As shown in FIG. 41, a picture drawn on a colored printed matter is provided with pixels 501. Each of the pixels 501 is composed of a blue dot 502a, a red dot 502b, a yellow dot 502c and a black dot 502d. The blue dot 502a is a dot provided by a blue screen (a C screen). The red dot 502b is a dot provided by a red screen (an M screen). The yellow dot 502c is a dot provided by a yellow screen (a Y screen). The black dot 502d is a dot provided by a black component (a K screen). The arrangement of the blue dot 502a, the red dot 502b, the yellow dot 502c and the black dot 502d is not limited to that shown in FIG. 41. The blue dot 502a, the red dot 502b, the yellow dot 502c and the black dot 502d are collectively referred to as a dot 502. The dot 502 may be square as shown in FIG. 42A, and may be differently shaped, for example, circular as shown in FIG. 42B.

The dots 502 included in one screen are regularly arranged on screen lines 503 in accordance with a print rule, as shown in FIG. 43. The screen lines 503 and an X-axis cross each other at an angle defined by the print rule. The angle is different for each of the screens. The screen lines 503 are arranged in parallel to each other at an equal interval. A screen ruling is defined as being 1/ds, where ds is the interval between the screen lines 503. When a line segment of a unit length, typically one inch, in a direction vertical to the screen line 503 is considered, the screen ruling implies the number of the screen lines 503 crossing the line segment.

The dot 502 is arranged such that the center thereof is located on the screen line 503. Here, when the dot 502 is square, the center of the dot 502 implies a point at which the diagonals thereof cross each other. When the dot 502 is formed in a circle, the center of the dot 502 implies a center of the circle.

An area of each dot 502 indicates a graduation. As the area of the dot 502 is larger, an eye of a human recognizes that a concentration of a position of the dot 502 is higher.

The picture composed of the dots having the arrangements and the shapes as mentioned above originally has a large redundancy.

However, the conventional method of compressing and restoring the image data does not use the mechanism that the picture drawn on the printed matter is composed of the dots. The conventional method of compressing and restoring the image data does not compress the picture drawn on the printed effectively.

It is desired to provide a method of effectively compressing the image data generated from the picture composed of the dots and restoring it.

Moreover, in the conventional method of compressing and restoring image data, the dot is compressed and restored without any discrimination from other image elements included in the picture. The dot itself is not restored. Here, if the restored image data is enlarged or contracted, an area ratio of the dot to the entire picture, namely, a dot percent is not stored. For this reason, if the restored image data is enlarged or contracted, a color may be deteriorated. Moreover, if the restored image data is enlarged or contracted, moiré may be induced.

It is desired that the deterioration in the picture quality is not induced even if the operation such as the enlargement or the contraction is performed on the restored image data while the image data generated from the picture composed of the dots is compressed and restored.

Also, in the image data compressing method, the compression of image data is desired to be executed at a high speed. In particular, the compression of image data indicative of a picture whose edge is emphasized is desired to be done at a high speed.

Also, in the image data compressing method, it is desired to provide a compressing and restoring method of image data, which effectively compresses and restores image data generated from a printed matter composed of micro point, each of which does not have the arrangements defined by the print rule and has small areas.

DISCLOSURE OF INVENTION

An object of the present invention is to provide a compressing and restoring method of image data, in which deterioration in picture qualities caused by the compression and restoration is suppressed.

Another object of the present invention is to provide a compressing and restoring method of image data, in which a compression rate is large.

Still another object of the present invention is to provide a compressing and restoring method of image data, in which a compression rate is large and deterioration in picture qualities caused by the compression and restoration is suppressed.

Still another object of the present invention is to provide a compressing and restoring method of image data, in which image data generated from a printed matter composed of dots is effectively compressed and restored.

Still another object of the present invention is to provide a compressing method of image data, in which the compression of the image data is done at a high speed.

Still another object of the present invention is to provide a compressing method of image data, in which the compression of image data representative of pictures whose edges are emphasized is done at a high speed.

Also, it is to provide a compressing and restoring method of image data, in which image data generated from a printed matter composed of micro points, each of which does not have the arrangement defined by the print rule and has a small area is effectively compressed and restored.

An image data compressing method according to the present invention extracts an image element included in a digital image read from a page space, uses a compressing method corresponding to a kind of an image element, and performs a data compression on each extracted image element, and stores each compressed image element data in a memory.

The respective images have respective features. The respective image elements can be classified and extracted on the basis of the features. The compression and restoration of the image element data in accordance with algorithms corresponding to kinds of the extracted image elements enable to suppress the deterioration in the picture quality caused by the compression and restoration. Also, they result in the improvement of a compression rate.

For example, the compressing and restoring processes effective for edges are performed on an image whose edges are desired to be clearly restored. The compressing and restoring processes effective for a print dot picture are performed on the image such as graphics, tints and photographs, in which print pictures are desired to be clearly restored. The compressing and restoring processes effective for a set of fine micro points arranged without any rules (hereinafter, they may be referred to as "free micro dots") are carried out in order to restore a set of free micro dots at a high compression and a clear manner.

As a method of judging a kind of each image element, the following judging methods can be used.

In a first judging method, the kind of each image element is judged by the processes in the following. An image element constituted by a set of the free micro dots is distinguished by the fact that the areas thereof are larger than print dots and smaller than a predetermined area, and the image element does not have regularity of the print dots.

Also, the print picture is a set of the small dots having the regularity of the print dots. The print picture is distinguished by the existence of the regularity of the print dots. All the remaining image elements are judged as line picture images.

In a second judging method, the kind of each image element is distinguished by a difference of a form element. A type character has a feature of a character appearance. A handwritten character has no feature of the character appearance. Also, a signet, a seal and a line picture have a feature of a set of free lines, namely, a feature that there is neither character appearance nor print dot. A tint has a feature that there is a regularity of print dots and there is no graduation. A graduation net has a feature that there is the regularity of the print dots and there is a graduation in dot rows. A photograph net has a feature that although there is the regularity of the print dots, there is no regularity in the tint and the graduation net. The kind of each image element is judged from those features.

In a third judging method, the kind of each image element is distinguished by a difference of a display element. In short, sentences have a feature that a series of characters are continuously arranged. Comics have a feature that there are an illustration, a free micro line and a micro dot. Also, maps have a feature that there is a determined regularity with regard to a map. Advertisements have a feature that there is an advertisement frame and there is regularity with regard to an arrangement on a page space. Tables have a feature that there is a quadrangle composed of ruled lines. Photographs have a feature that there is no regularity in the tint and the graduation net while there is the regularity of the print dots. The kind of each image element is judged from those features.

In the image data compressing method, each compressed image element data is desirably provided with a position information representative of where the image element corresponding to each image element data existed on the page space, and a screen ruling information.

Also, in the image data compressing method, the digital image obtained from the page space may be a color image. In this case, the extraction of the image element and the data compression of the image element are desired to be carried out for each color component.

In an image data restoring method of the present invention, each image element data, which is read from a page space and compressed, is restored by using a restoring method corresponding to a kind of the image element, and the respective restored image elements are superimposed and synthesized to thereby restore a page space image.

In this case, a position information and a line density information added to each compressed image element data are used to carry out an editing process, such as a rotation, a variation, an enlargement or a contraction of the image element, and then restore the page space image.

Also, the compressed image element data is provided for each color component. In this case, preferably, an image element data for each color component is restored by using a restoring method corresponding to a kind of the image element, and the restored image element for each color component is superimposed and synthesized to thereby restore an image.

An image data compressing method according to the present invention includes:

obtaining an image data representative of a picture;

extracting a first image element data from the image data;

extracting a second image element data from the image data;

compressing the first image element data to generate a first compression image element data; and compressing the second image element data to generate a second compression image element data. Here, a first extracting algorithm for extracting the first image element data is different from a second extracting algorithm for extracting the second image element data. Moreover, a first compressing algorithm for generating the first compression image element data is different from a second compressing algorithm for extracting the second image element data.

The first and second image element data, which are extracted from the first and second extracting algorithms that are different from each other, have the features different from each other. The first and second image element data, which have the features different from each other, are respectively compressed in accordance with the first and second compressing algorithms that are different from each other. This enables to suppress the deterioration in the picture quality caused by the compression and the restoration, and also results in the improvement of the compression rate.

It should be noted that another image element data other than the first and second image element data might be extracted from the image data by using another extracting algorithm. In this case, the other image element data is compressed by using another compressing algorithm to generate another compression image element data.

In the image data compressing method, the obtaining step preferably includes the steps of:

obtaining a color image data representative of a color picture; and extracting a portion representative of a component of a predetermined color from the color image data to generate the above-mentioned image data.

This provides the compressing and restoring method of the color image data in which the deterioration in the picture quality is suppressed. Also, This provides the compressing and restoring method of the color image data in which the compression rate is improved.

Also, in the image data compressing method, the step of extracting the first image element data preferably includes the step of extracting a first portion from the image data to generate the first image element data. The first portion corresponds to a dot portion composed of dots in the picture.

In this case, the step of generating the first compression image element data preferably includes the step of generating the first compression image element data on the basis of the areas of the dots.

In the image data compressing method, the step of extracting the second image element data preferably includes the step of extracting a second portion from the image data to generate the second image element data. The second portion corresponds to a free micro dot region of the picture, the free micro dot region including free micro dots which are not the above-mentioned dots and each of which has an area equal to or less than a predetermined area.

Also, the step of generating the second compression image element data preferably includes the steps of:

dividing the free micro dot region into a plurality of rectangular regions;

recognizing a shape of a pattern inside each of the rectangular regions, the pattern being included by image patterns of the image; and encoding the shape to generate the second compression image element data.

Also, the free micro dots may include first and second free micro dots. In this case, the step of generating the second compression image element data preferably includes the step of generating the second compression image element data, on the basis of a relative position between the first free micro dot and the second free micro dot.

Also, the step of generating the second compression image element data preferably includes the steps of:

defining a rectangular region including free micro dots in the free micro dot region; and generating the second compression image element data on the basis of in accordance with an average of concentrations inside the rectangular region.

Preferably, the image data compressing method further includes the step of extracting a third image element data that is a portion of the image data other than the first image element data and the second image data of the image data.

Preferably, the image data compressing method further includes the step of generating a collectively compressed image element data on the basis of the first compression image element data and the second compression image element data.

In the image data compressing method, the step of generating the first compression image element data preferably includes the steps of:

detecting a graduation of an image element represented by the first compression image element data by scanning along a scanning line;

calculating an outline position of an outline of the image element on the basis of the graduation; and generating the first compression image element data in accordance with the boundary position.

An image data compressing method according to the present invention includes the steps of:

obtaining an image data representative of a picture containing dots;

determining areas of the dots;

determining positions of the dots; and generating a compression data on the basis of the areas and the positions.

In the image data compressing method, it is preferable that the dots include first and second dots, the areas includes a first area of the first dot and a second area of the second dot, and the compression data is generated on the basis of an area difference between the first area and the second area.

In the image data compressing method, it is preferable that the positions preferably includes a first position of the first dot and a second position of the second dot, and the compression data is generated on the basis of a distance between the first position and the second position.

In the image data compressing method, the step of obtaining the image data representative of the image including the dots preferably includes the steps of:

obtaining another image data representative of another picture; and generating the above-mentioned dots based on graduations of the other picture to generate the image data.

An image data compressing method of the present invention includes the steps of:

obtaining an image data representative of a picture;

detecting graduations of the picture by scanning along a scanning line;

calculating an outline position of an outline of the picture in accordance with the graduation; and generating a compression data on the basis of the outline position.

An image data compressing method of the present invention includes the steps of:

obtaining an image data indicative of a picture including free micro dots having areas within a predetermined area range; and generating a compression data on the basis of positions of the free micro dots.

In this case, it is preferable that the free micro dots include first and second free micro dots, and the step of generating the compression data further includes the step of generating the compression data on the basis of a relative position between the first and second free micro dots.

Also, the step of generating the compression data preferably includes the steps of:

defining a rectangular region containing the free micro dots in the picture; and generating the compression data on the basis of an average of concentrations inside the rectangular region.

It is also preferable that it further includes the steps of: defining a rectangular region containing the free micro dots in the picture; and generating the compression data on the basis of a distance between the free micro dots and a side of the rectangular region.

Also, the step of generating the compression data preferably includes the steps of:

defining a rectangular region in the picture;

recognizing a shape of a pattern of a portion included in the rectangular region in the free micro dots; and encoding the shape and generating the compression data.

An image data extracting method of the present invention includes the steps of:

obtaining an image data representative of a picture containing dots; and extracting a portion representative of the dots from the image data.

In this case, the extracting step preferably includes the steps of: scanning the picture to detect a change position at which a graduation is changed; and extracting the portion on the basis of an interval between the change positions.

An image data processing method according to the present invention includes the steps of:

obtaining an image data representative of a picture containing a first dot and a second dot arranged in accordance with a print rule;

shifting the second dot to define a virtual dot;

generating a third dot located between the first dot and the virtual dot; and erasing the virtual dot.

Here, a virtual dot position of the virtual dot is located on a straight line through which the first dot and the second dot are connected. Moreover, the virtual dot is located in a first direction toward the second dot from the first dot with respect to the second dot. A virtual dot area of the virtual dot is equal to a second dot area of the second dot. A third dot position of the third dot is determined so as to comply with the print rule. A third dot area of the third dot is determined by an interpolation on the basis of a virtual dot position of the virtual dot, a dot position of the first dot, and the third dot position of the third dot, a first dot area of the first dot and the virtual dot area of the virtual dot.

An image data restoring method of the present invention includes the steps of:

obtaining a compression data, wherein the compression data contains:

a first compression image element data compressed in accordance with a first compressing algorithm; and a second compression image element data compressed in accordance with a second algorithm different from the first compressing algorithm, restoring the first compression image element data to generate a first restoration image element data;

restoring the second compression image element data to generate a second restoration image element data; and generating a restoration image data representative of an image from the first restoration image element data and the second restoration image element data.

An image data restoring method of the present invention includes the steps of:

obtaining a compression data containing an area difference data representative of the difference in the area between a first dot and a second dot, and a distance data representative of a distance between the first dot and the second dot; and restoring an image data so as to contain the first dot and the second dot on the basis of the area difference data and the distance data.

In the image data restoring method, the image data is restored so as to further include a third dot located between the first dot and the second dot; and an area of the third dot is determined on the basis of the area difference data.

An image data restoring method of the present invention includes the steps of:

obtaining a compression data containing a position data representative of positions of free micro dots having areas within a predetermined area range; and restoring an image data representative of a picture composed of the free micro dots on the basis of the positions.

In this case, it is preferable that the compression data includes an average of concentrations inside a rectangular region defined for the picture, and the step of restoring the image data includes the step of restoring the image data on the basis of the average.

It is also preferable that the position data has a distance between the free micro dot and a side of a rectangular region defined for the picture, and the step of restoring the image data includes the step of restoring the image data on the basis of the distance.

BRIEF DESCRIPTION OF DRAWINGS

FIG. 5 shows an image element included in a print dot image element data 52;

BEST MODE FOR CARRYING OUT THE INVENTION

Embodiments according to the present invention will be described below with reference to the attached drawings.

FIRST EMBODIMENT

A compressing method and a restoring method of an image data of the first embodiment is a method of compressing and restoring an image data generated by capturing a picture drawn on a paper with a scanner.

Figure 2:
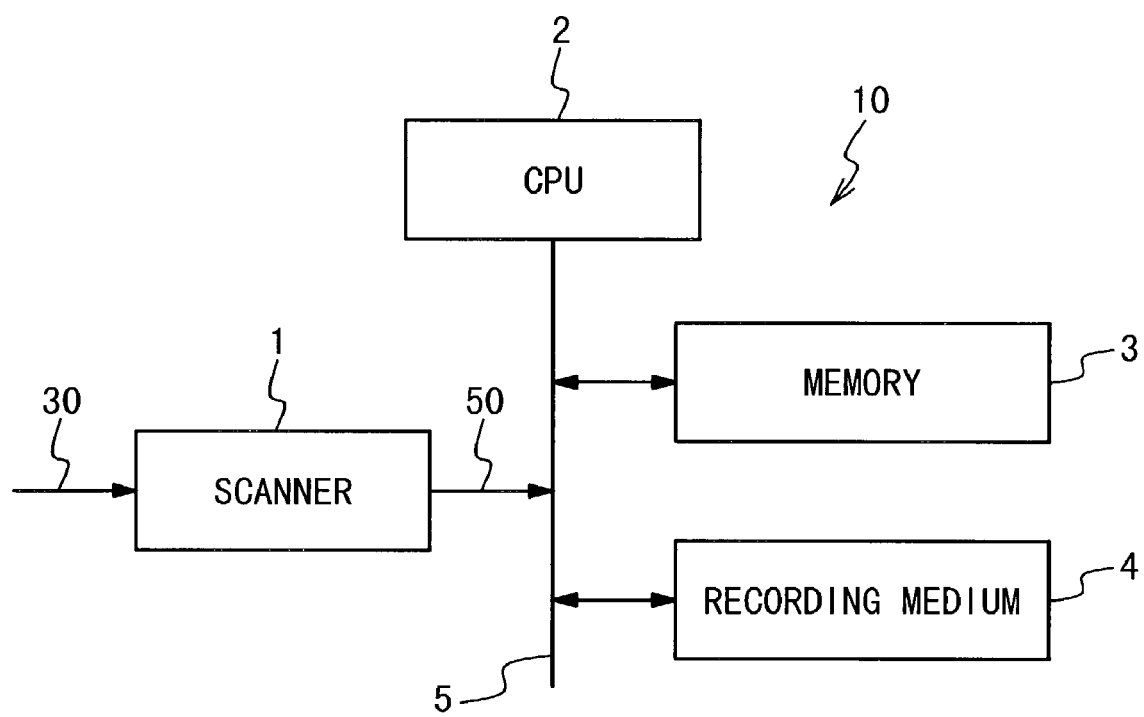
FIG. 2 shows a hardware resource 10 in which the image data compressing method of the first embodiment and a restoring method are carried out.

The compressing and restoring method of the image data of the first embodiment is carried out by using a hardware resource. As shown in FIG. 2, the hardware resource 10 includes a scanner 1, a CPU 2, a memory 3, a recording medium 4 and a bus 5. The scanner 1, the CPU 2, the memory 3 and the recording medium 4 are connected to the bus 5. The scanner 1 captures an image 30 drawn on a page space to generate a page space image data 50. The CPU 2 carries out an operation for compressing or restoring the page space image data 50. The memory 3 stores the page space image data 50 and the data generated by the process for carrying out the compressing and restoring method of the image data of the first embodiment. The recording medium 4 stores a program describing the procedures included in the compressing and restoring method of the image data of the first embodiment. The CPU 2 is operated in accordance with the program. The bus 5 transmits the data to be exchanged between the scanner 1, the CPU 2, the memory 3 and the recording medium 4.

Figure 1:
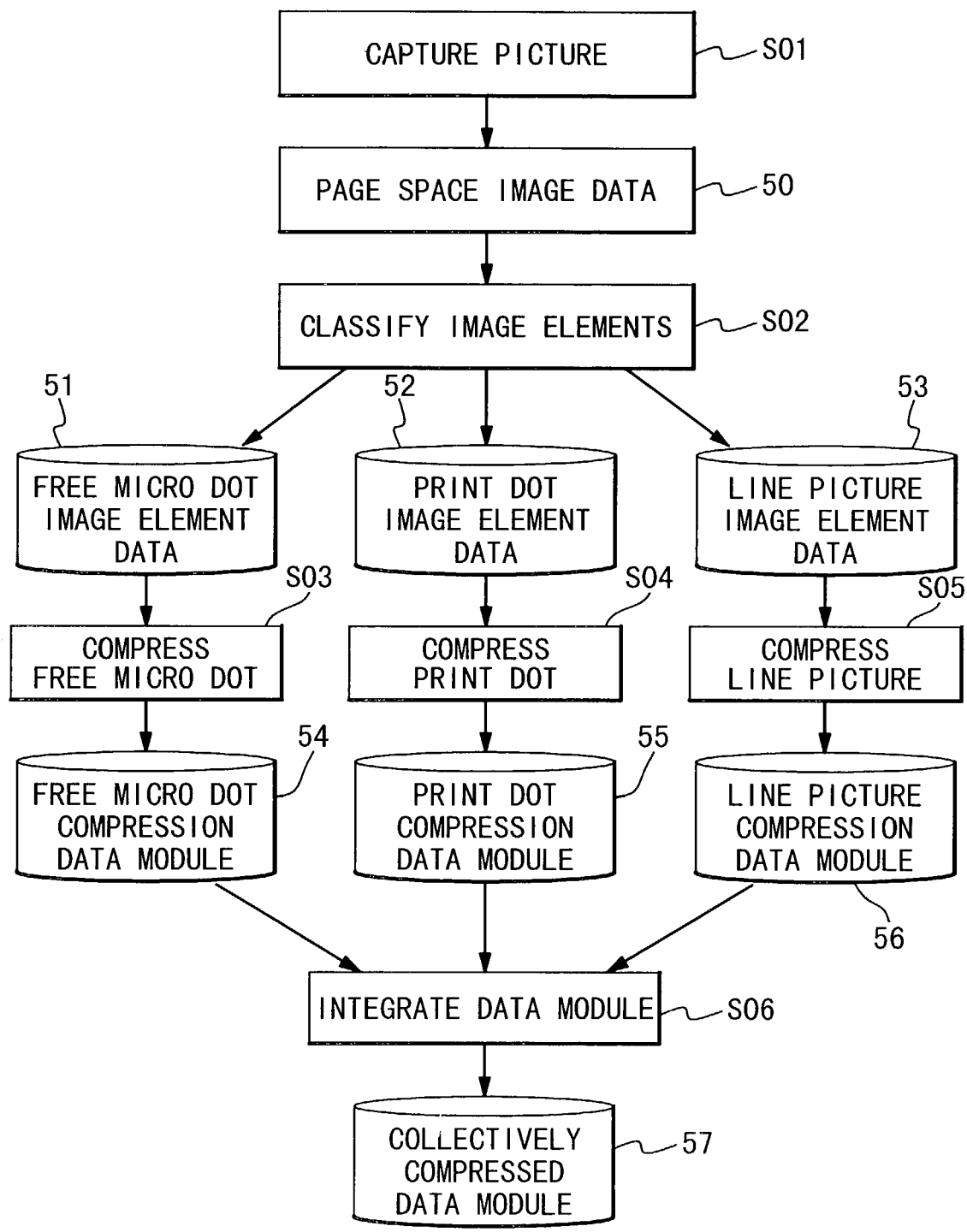
FIG. 1 is a flowchart showing an image data compressing method of a first embodiment of the present invention.

In the compressing method and the restoring method of the image data of the first embodiment, at first, as shown in FIG. 1, the image 30 drawn on the page space is captured by the scanner 1 to generate the page space image data 50 (Step S01).

Figure 3:
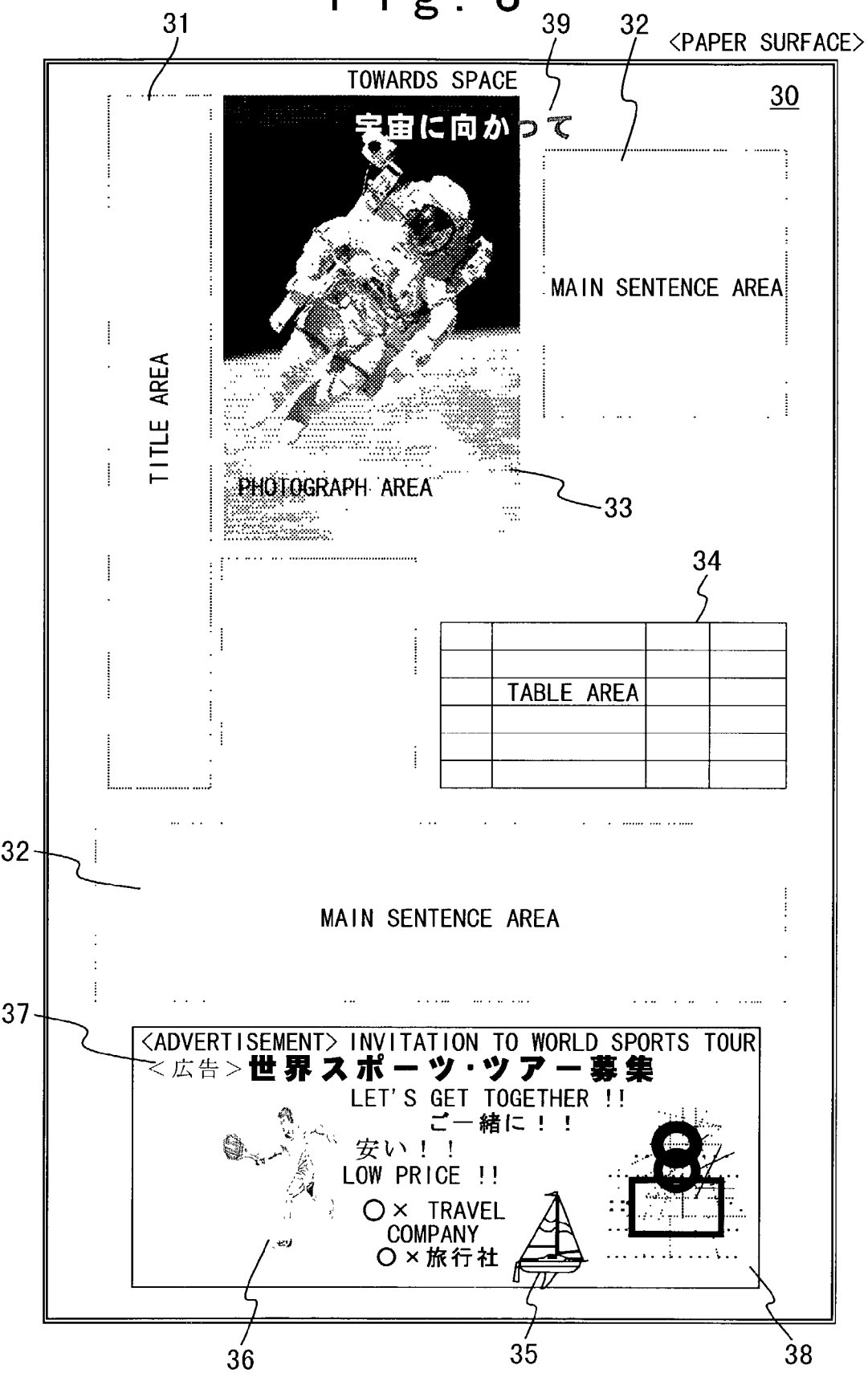
FIG. 3 shows an image 30 to be compressed.

The image 30, which is captured by the scanner 1, is a monochrome image. As shown in FIG. 3, the image 30 is provided with a title 31, main sentences 32, a photograph 33, a table 34, an illustration 35, a graphic 36, advertisement characters 37, a comic 38, and a photograph title 39, which are randomly arranged. The title 31, the main sentence 32 and the advertisement characters 37 are constituted by characters printed with type. The photograph 33 and the graphic 36 are constituted by a group of dots having an arrangement defined by a print rule.

Hereafter, an element constituting the image 30 may be referred to an image element. Each of The title 31, the main sentence 32, the photograph 33, the table 34, the illustration 35, the graphic 36, the advertisement characters 37, the comic 38 and the photograph title 39 constitutes an image element. Moreover, parts of the title 31, the main sentence 32, the photograph 33, the table 34, the illustration 35, the graphic 36, the advertisement 37 and the comic 38 can constitute an image element.

Next, the image elements of the image 30, which is represented by the page space image data 50, are extracted and classified (Step S02).

Portions corresponding to micro dots placed without complying with the print rule are extracted from the page space image data 50 to generate a free micro dot image element data 51. Hereafter, the micro dots placed without complying with the print rule is referred to as free micro dots. Regions that are placed without complying with the print rule are smaller than a predetermined area and larger than an area of a print dot, are extracted as the free micro dots.

Figure 4:
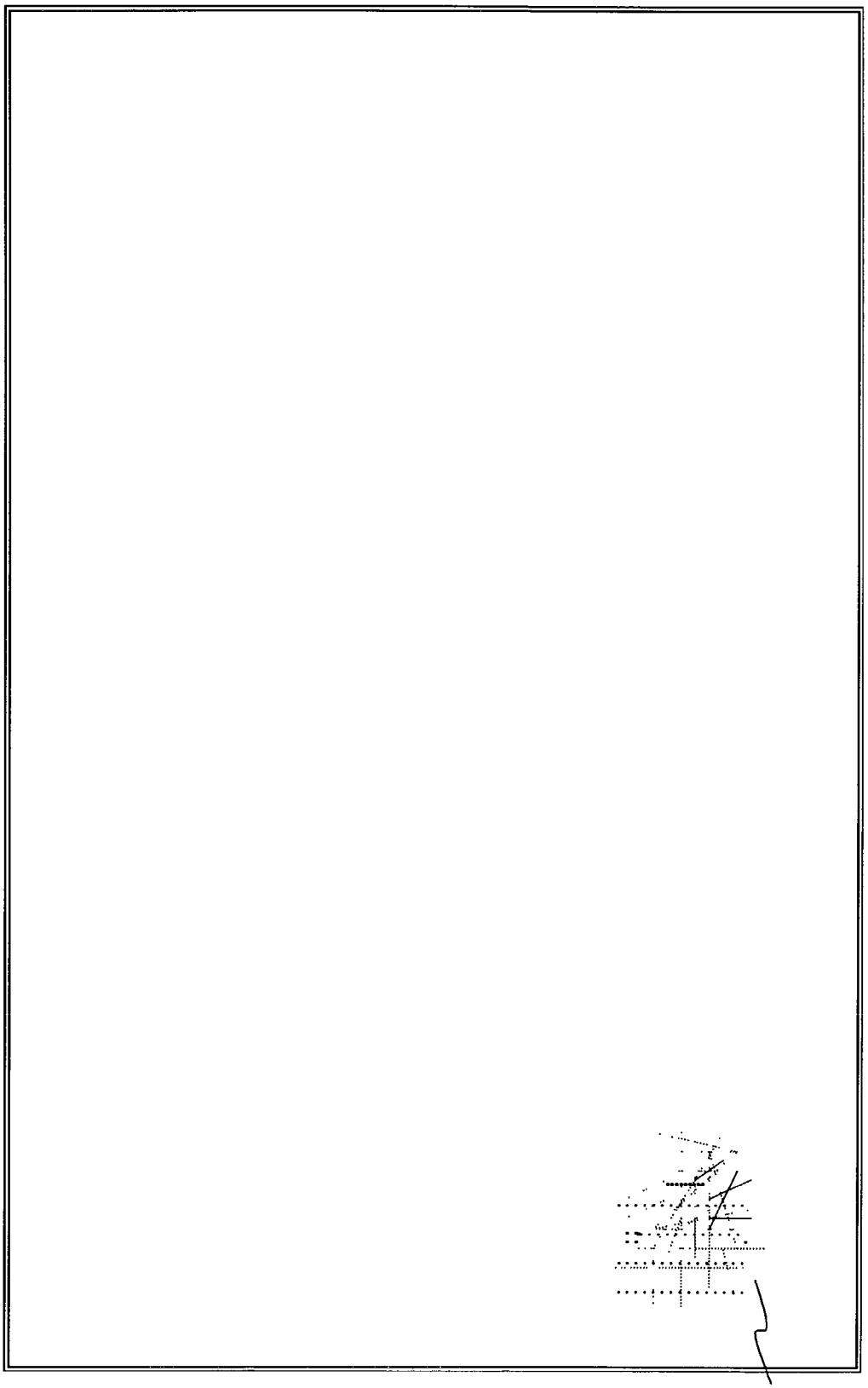
FIG. 4 shows an image element included in a free micro dot image element data 51.

FIG. 4 shows a content of the free micro dot image element data 51. As shown in FIG. 4, the free micro dot image element data 51 is provided with the data indicative of an image element 40 that is a part of the comic 38. That is, the portion corresponding to the image element 40 is extracted as the free micro dot image element data 51 from the page space image data 50.

The free micro dot image element data 51 is implemented with position information representative of a position of the image element 40 included in the free micro dot image element data 51.

Moreover, the portion corresponding to a group of the dots included in the image 30 is extracted from the page space image data 50 to generate a print dot image element data 52 (Step S04). The group of dots has an arrangement defined by the print rule. The group of the dots is extracted by using the fact that the group of dots has an arrangement defined by the print rule to generate the print dot image element data 52.

Figure 44:
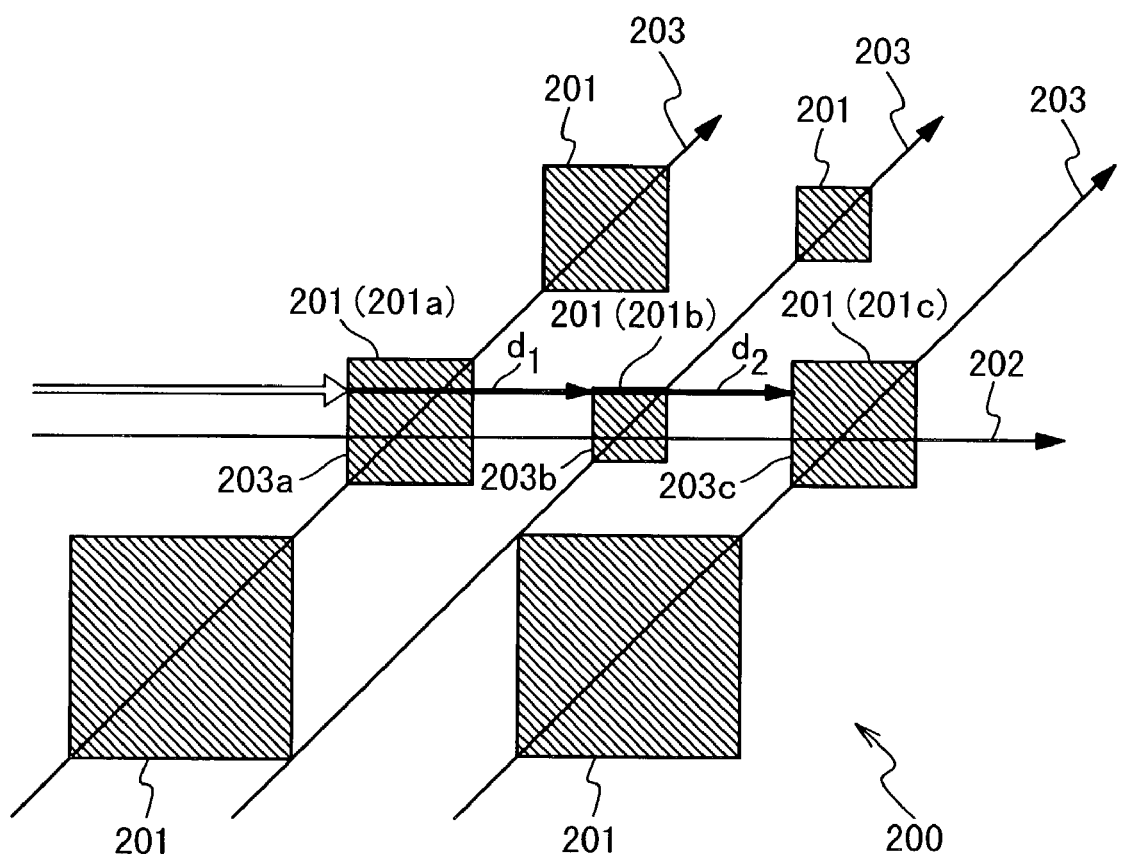
FIG. 44 shows an extracting method of a set of dots.

First, a set composed of points having an area smaller than a maximum area of a dot defined by the print rule is extracted from the page space image data 50. Moreover, it is judged whether or not the set is a set of print dots. FIG. 44 shows a set 200 extracted from the page space image data 50. The set 200 is composed of points 201.

The set 200 is scanned along a scanning line 202 extending in an X-axis direction. An edge of the point 201 is detected from the change in a graduation. Let us suppose that an edge 203a of a certain point 201a is detected as the result of the scanning along the scanning line 202. Moreover, let us suppose that the set 200 is scanned along the scanning line 202 to sequentially detect an edge 203b and an edge 203c located at left ends of other points 201b, 201c, respectively. Moreover, in this case, if a first interval between the edge 203a and the edge 203b and a second interval between the edge 203b and the edge 203c are a predetermined unit interval, the point 201a, the point 201b and the point 201c are judged to be the dots. As for the other points 201, it is judged whether or not their points are the dots in the same way. If most of the points 201 included in the set 200 are judged to be the dots, the set 200 is judged to be the set of the dots.

The above mentioned unit interval is determined on the basis of a density of the screen lines 203 defined by the print rule and a possible angle between the scanning line 202 and the screen line 203. If the points 201 included in the set 200 are the dots, they must be arrayed on the screen line 203. In this case, the angle between the scanning line 202 extending along the x-axis direction and the screen line 203 is determined to be one of 0°, 15°, 30°, 45°, 60°, 75° and 90° in accordance with the print rule. Moreover, an interval ds between the screen lines 203 is also determined in accordance with the print rule. Six unit intervals $d_{norm}^1$ to $d_{norm}^6$ are respectively determined corresponding to the six angles except 0° from among the possible angles between the scanning line 202 and the screen line 203. It holds $$d_{norm}^i = ds \cos \theta_s^i,$$

where $\theta_s^1 = 15°$,
$\theta_s^2 = 30°$,
$\theta_s^3 = 45°$,
$\theta_s^4 = 60°$,
$\theta_s^5 = 75°$, and
$\theta_s^6 = 90°$.

If an interval between any one point among the points 201 included in the set 200 and an edge of another point adjacent thereto is substantially equal to one unit interval among the six unit intervals $d_{norm}^1$ to $d_{norm}^6$, the set 200 is judged to be the set of the dots.

If the angle between the scanning line 202 and the screen line 203 is 0°, this method is impossible to judge whether or not the certain set 200 is the set of the dots. Changing the direction of the scanning line 202, however, enables to judge whether or not the set 200 is the set of the dots.

The set 200 judged to be the set of the dots is extracted to thereby generate the print dot image element data 52.

It should be noted that the direction of the scanning line is not limited to the x-axis direction. Needless to say, the direction of the scanning line may be a different direction.

FIG. 5 shows a content of the print dot image element data 52. As shown in FIG. 5, the print dot image element data 52 is composed of data representative of the photograph 33 and the graphic 36. That is, the portion corresponding to the photograph 33 and the graphic 36 is extracted from the page space image data 50 as the print dot image element data 52.

The print dot image element data 52 is implemented with position information representative of the positions of the graphic 36 and the photograph 33 included in the print dot image element data 52.

Moreover, the portion that is not extracted as the free micro dot image element data 51 nor as the print dot image element data 52 is extracted as a line picture image element data 53 (Step S05).

Figure 6:
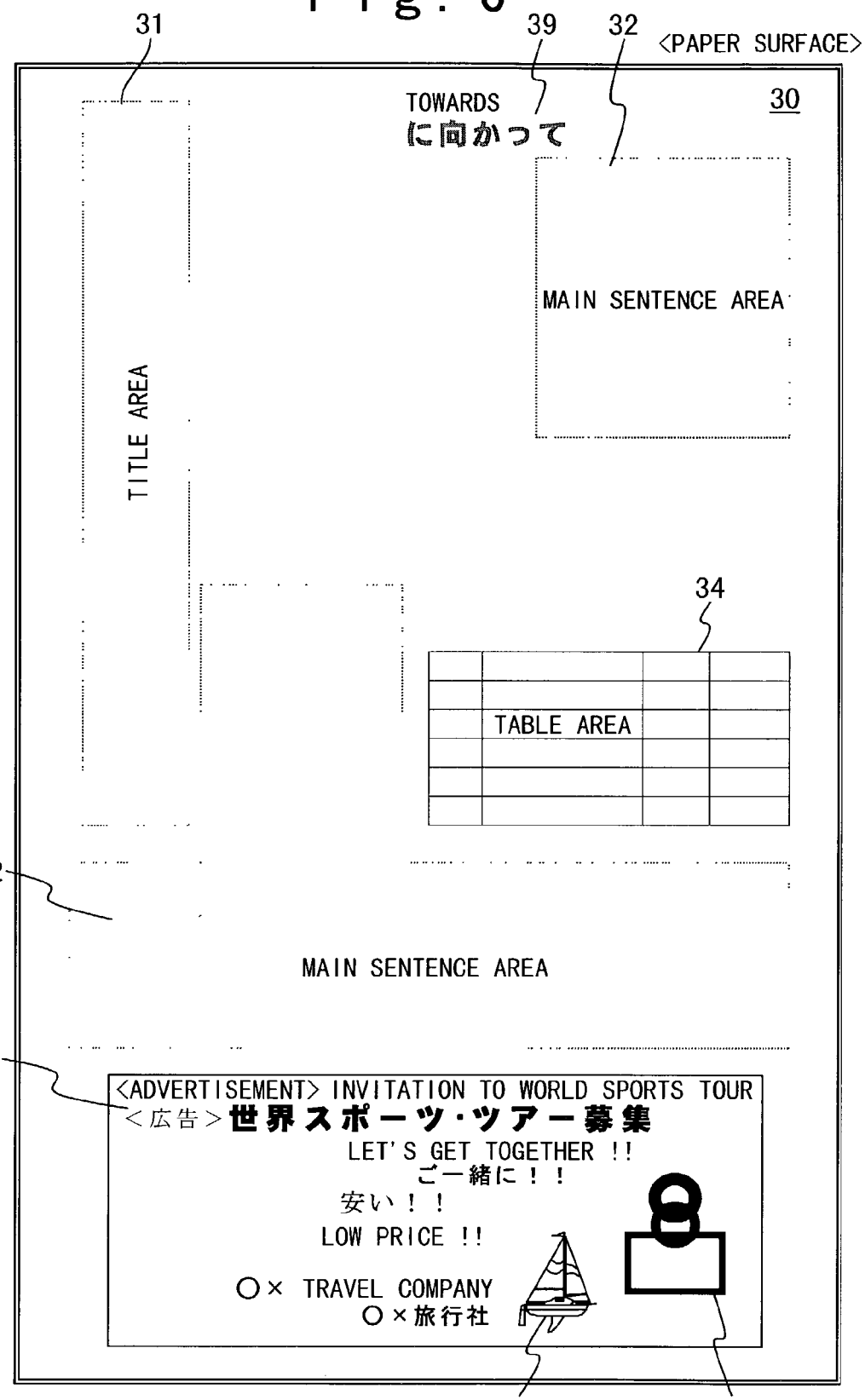
FIG. 6 shows an image element included in a line picture image element data 53.

FIG. 6 shows a content of the line picture image element data 53. As shown in FIG. 6, the line picture image element data 53 is constituted by data representative of the title 31, the main sentences 32, the table 34, the illustration 35, the advertisement characters 37, the image element 40 and the image element 41 that is a part of the comic 38. A portion of the image 30 that is poor in change of contrast and corresponds to a portion whose edge is clear is stored in the line picture image element data 53.

As shown in FIG. 1, the above mentioned free micro dot image element data 51 is compressed in accordance with a free micro dot compressing algorithm to generate a free micro dot compression data module 54 (Step S03). In the free micro dot pattern compressing algorithm, an area to be compressed is divided into area patches. Moreover, a pattern included in each of the area patches is encoded to thereby generate the free micro dot compression data module 54.

The free micro dot pattern compressing algorithm will be described below in detail.

Figure 7:
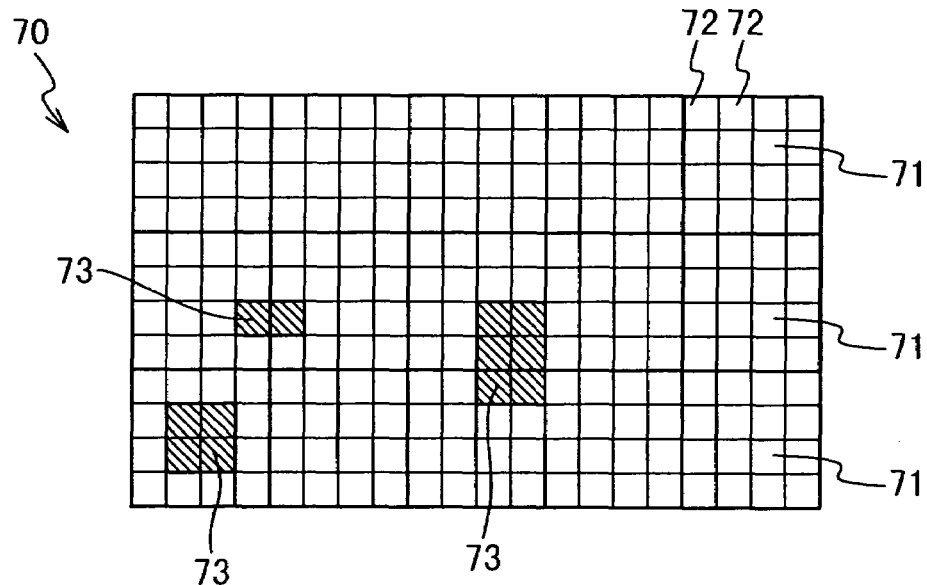
FIG. 7 is a view describing a free micro dot pattern compressing algorithm.

As shown in FIG. 7, a target area 70 to be compressed is divided into area patches 71. Each of the area patches 71 is composed of 16 small regions 72 arranged in 4 rows and 4 columns. The number of the small regions 72 included in the area patch 71 is not limited to 16 (4 rows and 4 columns). For example, each of the area patches 71 may be composed of 16 small regions arranged in 8 rows and 8 columns.

Moreover, a pattern of each of the area patches 71 is recognized. The pattern is recognized on the basis of whether or not an image element 73 exists in each of the small regions 72 included in the area patch 71.

Figure 8A:
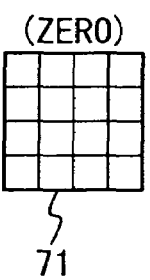
FIGS. 8A to 8F are views showing various patterns of an area patch 71.
Figure 8B:
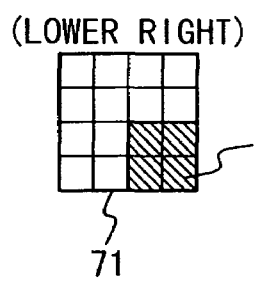
Figure 8C:
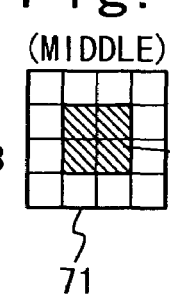
Figure 8D:
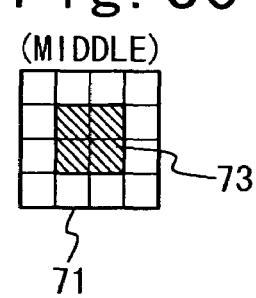
Figure 8E:
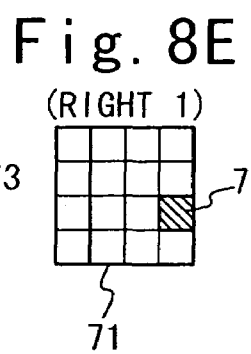
Figure 8F:
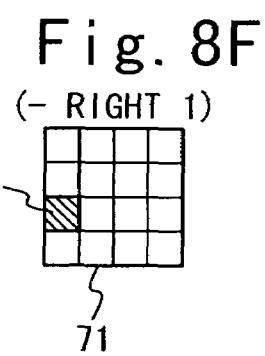

FIGS. 8A to 8F show the examples of various patterns of the area patches 71. FIG. 8A shows an area patch 71 having a zero pattern. The area patch 71 has no image element 73. FIG. 8B shows an area patch 71 having a lower right pattern. The lower right pattern is the pattern where the image elements 73 exist in four small regions 72 located in the lower right portion of the area patch 71. FIG. 8C shows an area patch 71 having a central pattern. The central pattern is the pattern where the image elements 73 exist in four small regions 72 located in the center of the area patch 71. FIG. 8D shows an area patch 71 having an upper right pattern. The upper right pattern is the pattern where the image elements 73 exist in two small regions 72 located in the upper right portion of the area patch 71. FIG. 8E shows an area patch 71 having a right 1 pattern. The right 1 pattern is the pattern where the image element 73 exists in a small region 72 located on a second line from the bottom of the area patch 71 and on a first row from the right. FIG. 8F shows an area patch 71 having a right 1 pattern. The right 1 is the pattern where the image element 73 exists in a small region 72 located on a second line from the bottom and on a first row from the left.

In the free micro dot pattern compressing algorithm, symbols different from each other are predetermined corresponding to each of the various patterns of the area patch 71. The symbols different from each other are defined corresponding to each of the patterns shown in FIGS. 8(a) to (f).

The pattern of the area patch 71 is encoded with the predetermined symbols. The encoded pattern is compressed, and the free micro dot pattern compressing algorithm is completed.

The free micro dot image element data 51 is compressed in accordance with the above mentioned free micro dot pattern compressing algorithm to thereby generate the free micro dot compression data module 54.

On the other hand, as shown in FIG. 1, the print dot image element data 52 is compressed in accordance with the print dot compressing algorithm to generate a print dot compression data module 55 (Step S04). The print dot compressing algorithm calculates a direction of the screen lines on which the dots are arrayed, and a screen ruling of the screen lines per unit length. Moreover, a dot vector having as the elements thereof the difference in the area and the relative position between the centers of the dots included in the picture is calculated. Moreover, the dot vector is encoded. The print dot compression data module 55 includes data representative of the encoded dot vector, the direction of the screen lines and the screen ruling of the screen lines per unit length.

The print dot compressing algorithm makes use of the fact that the picture included in the print dot image element data 52 is composed of the dots and thus the redundancy thereof is large. Consequently, the print dot image element data 52 is effectively compressed.

The print dot pattern compressing algorithm will be described below in detail.

Figure 9:
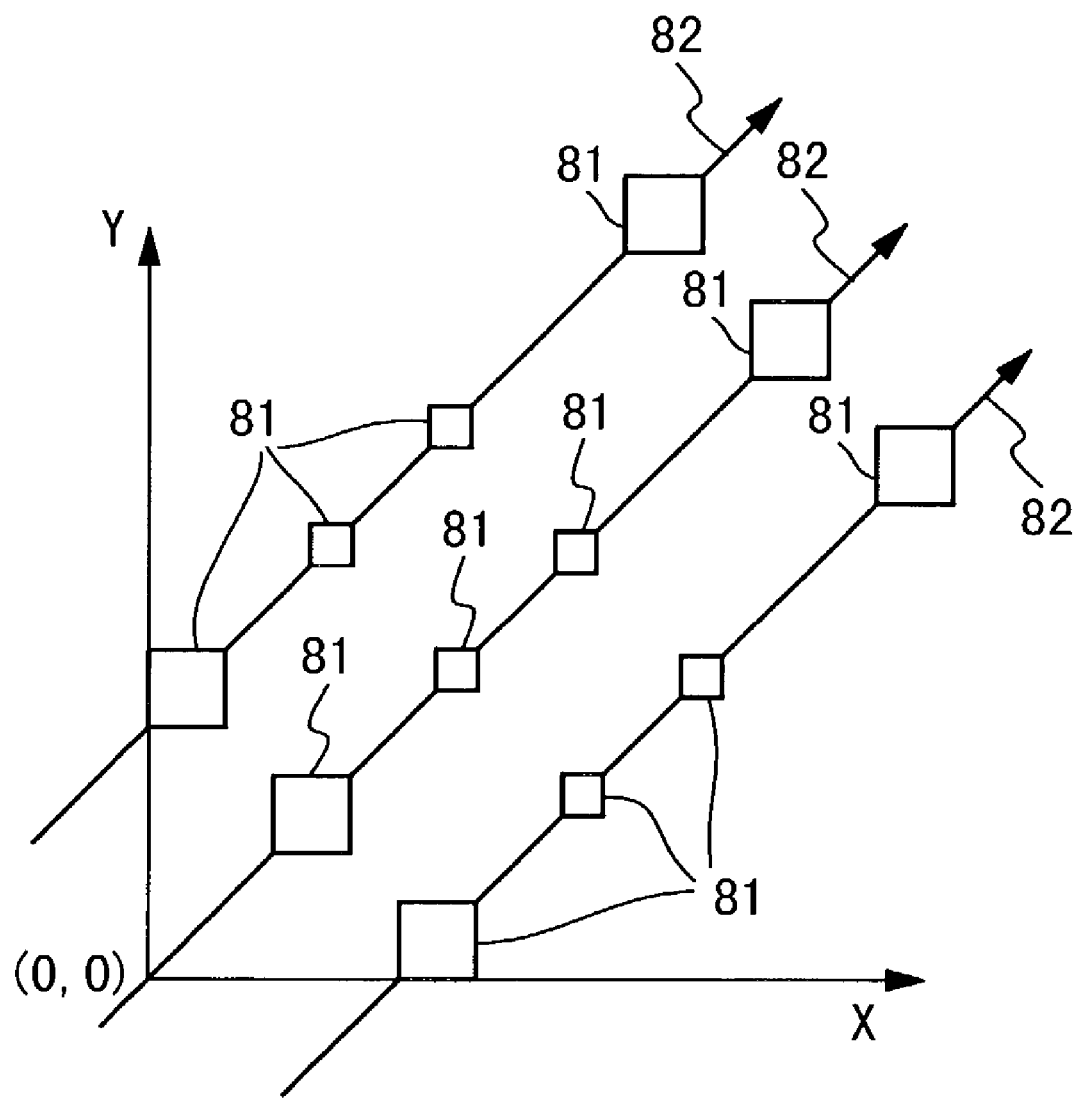
FIG. 9 shows a part of a picture included in the print dot image element data 52.

The print dot image element data 52 is constituted by the data representative of the picture composed of the dots, as mentioned above. FIG. 9 shows a part of the picture included in the print dot image element data 52. Dots 81 included in the print dot image element data 52 are arranged in accordance with the arrangement defined by the print rule. The dots 81 are arranged on screen lines 82.

Figure 10:
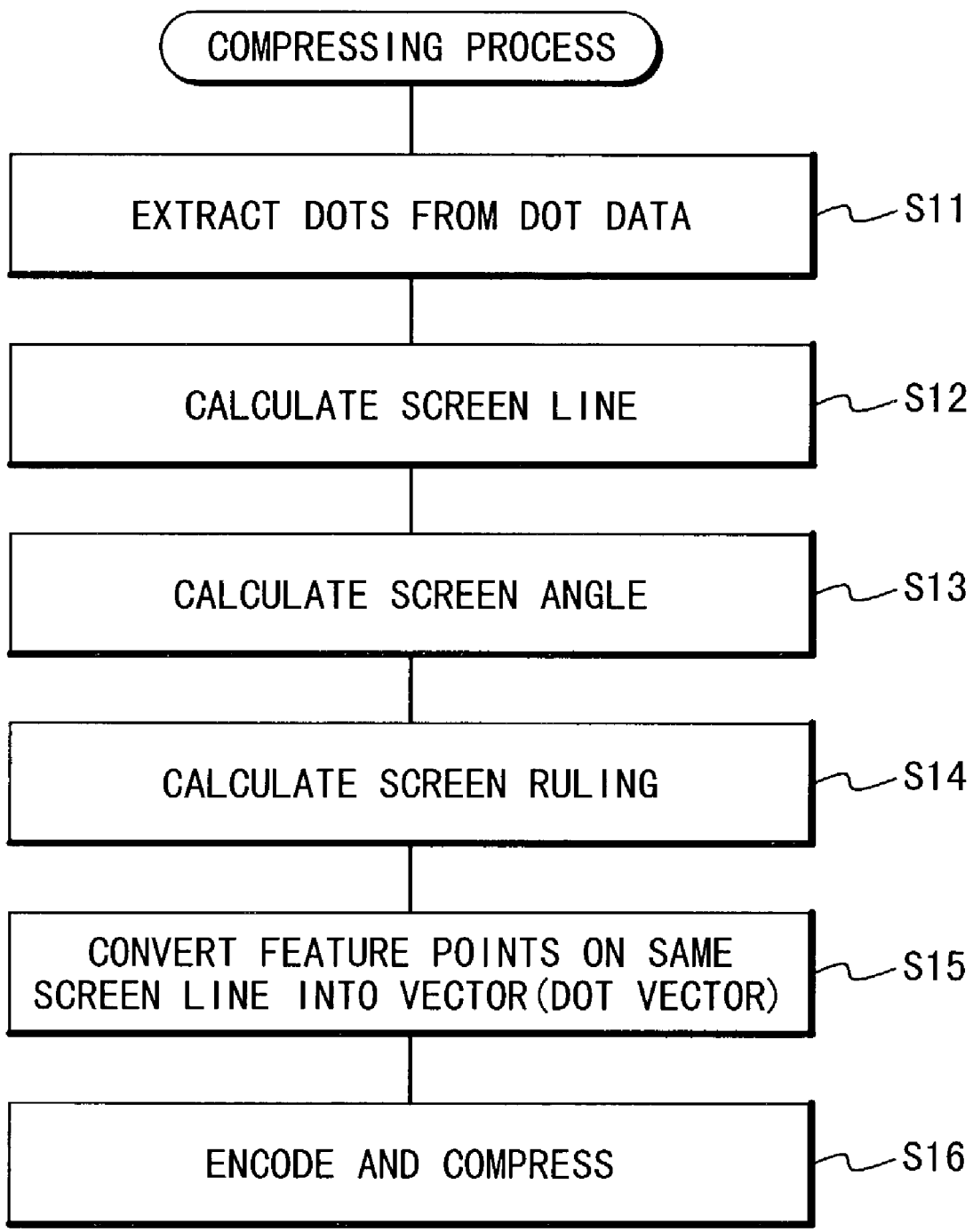
FIG. 10 is a flowchart showing a print dot pattern compressing algorithm.

FIG. 10 is a flowchart showing the print dot pattern compressing algorithm. At first, as shown in FIG. 10, the print dot pattern compressing algorithm respectively calculates the areas and positions of the center of the dots 81 included in the print dot image element data 52 (Step S11).

Shapes of the dots 81 may be distorted. This is because the print dot image element data 52 is generated from an image 30 printed on a paper. The dot 81 is printed so as to be square while the image 30 is printed on the paper. In the process for printing the image 30 on the paper, however, factors of ink permeation and the like cause the shapes of the dots to be distorted. Thus, the print dot image element data 52 generated from the image 30 printed on the paper is constituted by the data representative of the dots 81 whose shapes are distorted.

The respective areas of the dots 81, whose shapes are distorted, are calculated by any of two methods as descried below.

Figure 11:
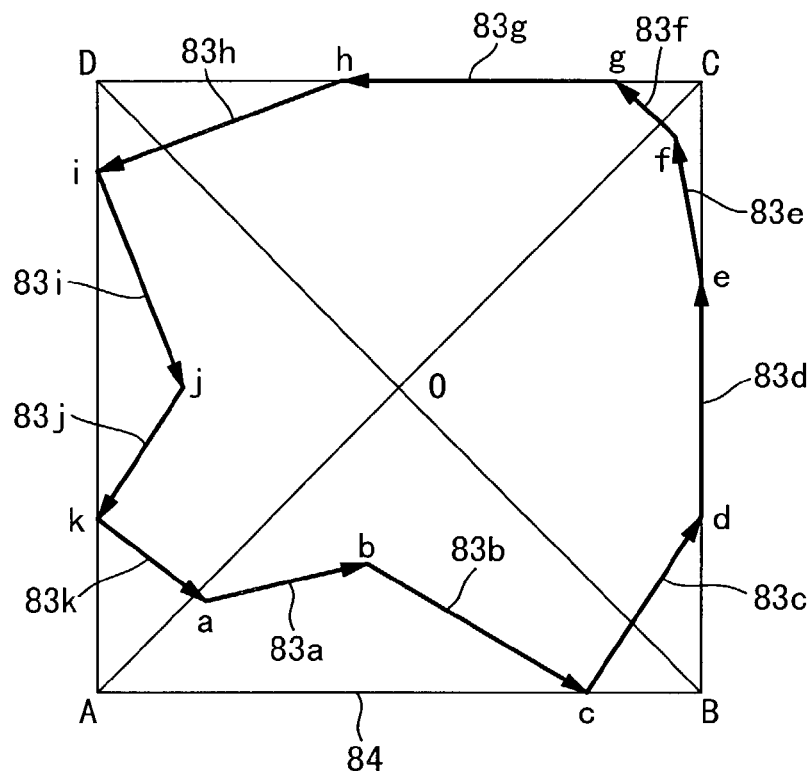
FIG. 11 is a view showing a first method of calculating an area of a dot and a method of determining a center of the dot.

As shown in FIG. 11, a first method of calculating the area firstly extract an outline of the dot 81 indicated by the print dot image element data 52. Curvature points are determined counterclockwise or clockwise in turn on the outline of the extracted dot 81. The curvature point is a point at which an extension direction of the outline of the dot 81 is changed. Curvature points a to k are determined in turn.

Moreover, vectors for connecting two curvature points adjacent to each other are determined. Vectors 83a to 83k are determined. The vectors 83a to 83k make the round of the outline of the dot 81. The sum of the vectors 83a to 83k is a 0 vector.

Next, a square 84 is determined so that the square 84 is circumscribed about a polygon having curvature points a to k as the vertexes, and a length of sides thereof is minimum. Let the four vertexes of the square 84 be respectively vertex A, B, C and D. An area of the dot 81 is calculated by subtracting an area of a portion that is located inside the square 84 and located outside the polygon having the curvature points a to k as the vertexes, from the area of the square 84. That is, it is calculated by subtracting the areas of a polygon Acbak, a triangle Bdc, a triangle eCg, a triangle hDi and a triangle ijk, from the area of the square 84.

Figure 12:
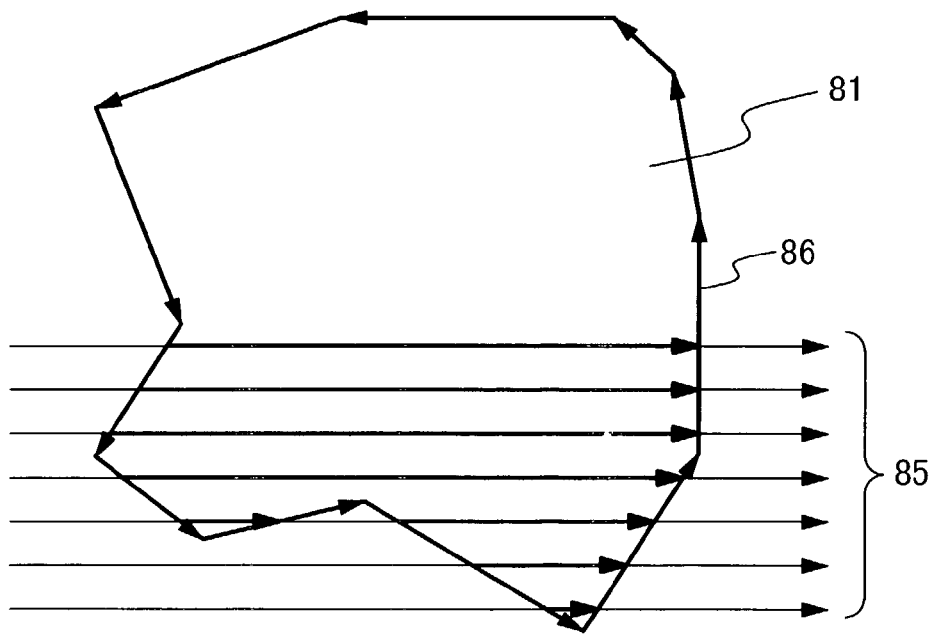
FIG. 12 is a view showing a second method of calculating an area of a dot.
Figure 13A:
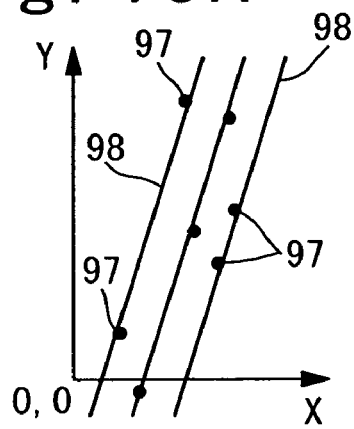
FIGS. 13A to 13D are views showing a first method of extracting screen lines.
Figure 13B:
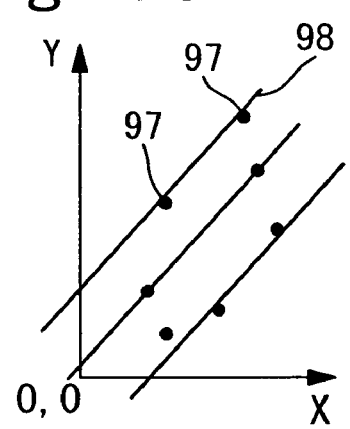
Figure 13C:
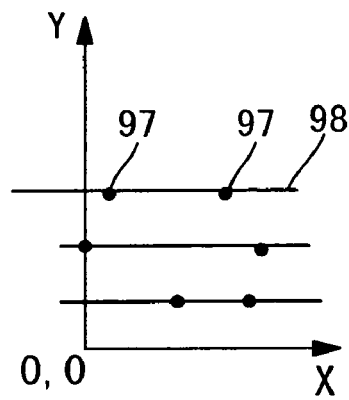
Figure 13D:
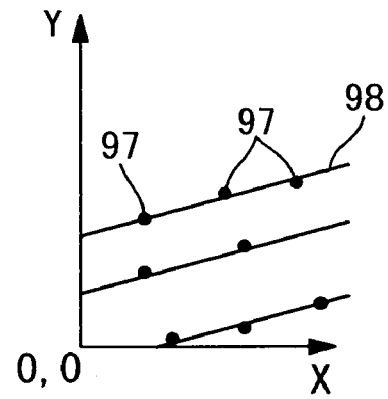

A second method of calculating the area firstly determines scanning lines 85, as shown in FIG. 12. The scanning lines 85 are determined so as to be extended in the x-axis direction. The scanning lines 85 can be determined so as to be extended in a different direction, for example, a y-axis direction. The scanning lines 85 are arranged in parallel to each other at an equal interval. The dot 81 is scanned along the scanning lines 85. A boundary 86 of the dot 81 is detected from the change of graduation. An area inside the boundary 86 is an area of the dot 81.

The area of the dot 81 having any shape is calculated by using any of the first method and the second method as mentioned above.

Moreover, the position of the center of the dot 81 is calculated as follows. At first, as shown in FIG. 11, the square 84, which is circumscribed about the dot 81, is determined in which the length of one side is minimum. The position of the central point of the dot 81 is defined as an intersection O of diagonals AC, BD of the square 84. Here, the following equation is established:

AO=BO=CO=DO.

A position at a certain dot is defined as a position of a center of the dot. Hereafter, if a position of a dot is noted, the position of the dot implies the position of the center of the dot. Also, a distance between certain two dots implies a distance between a center of one dot and a center of another dot.

Moreover, as shown in FIG. 10, screen lines are extracted (Step S12). The screen lines are extracted by using any of the following three methods.

A first method of extracting the screen lines firstly extracts the dots having a larger area than a predetermined area, from the dots 81. Hereafter, ones of the dots 81, which have the larger area than the predetermined area, are referred to as screen line extraction dots. FIGS. 13A to 13D show the arrangement of centers 97 of the screen line extraction dots. The centers 97 of the screen line extraction dots are substantially aligned in a certain direction. Straight lines that extend in the direction to pass through the centers 97 of the screen line extraction dots are recognized as screen lines 98. In order to determine the screen lines 98, a least-squares method is used if necessary.

Figure 14:
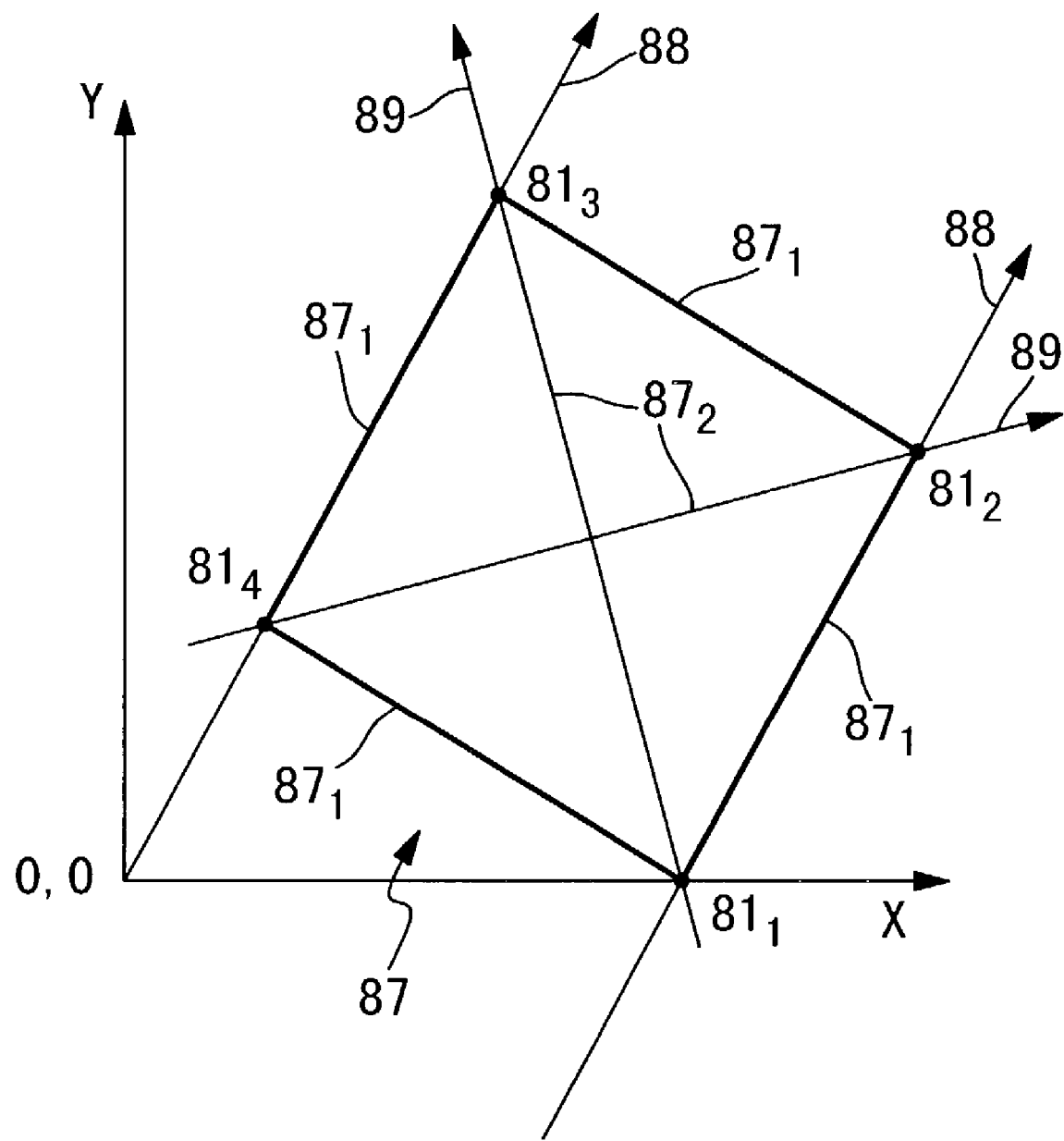
FIG. 14 is a view showing a second method of extracting screen lines.

A second method of extracting the screen lines firstly extracts four dots from the dots 81, as shown in FIG. 14. At this time, the four dots are extracted such that the centers of the extracted dots are substantially vertexes of a square. Hereafter, the extracted dots 81 are referred to as dots $81_1$ to $81_4$.

A plurality of straight lines 88 and a plurality of straight lines 89 shown in FIG. 14 are recognized as the candidates of the screen lines. Here, the straight lines 88 are the straight line that extend in the same direction as the sides of $87_1$ of the square 87 with the four centers of the dots $81_1$ to $81_4$ as the vertexes thereof and passes through the centers of the dots $81_1$ to $81_4$. On the other hand, as for the straight lines 89, the straight lines 89 that extend in diagonal lines $87_2$ of the square 87 and pass through the centers of the dots $81_1$ to $81_4$ are recognized as the candidates of the screen lines.

Figure 15A:
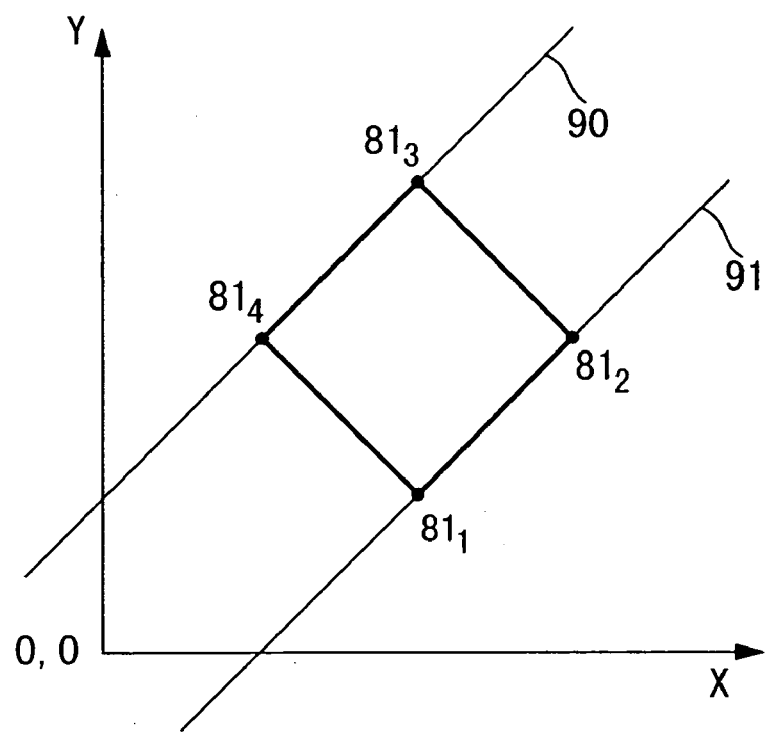
FIGS. 15A and 15B are views showing possible arrangements in dots $81_1$ to $81_4$.

The reason why both of the straight lines 88, 89 can be the candidates of the screen line is that the dots $81_1$ to $81_4$ have any of the two arrangements is described below. As shown in FIG. 15A, there may be a case that two dots each of dots $81_1$ to $81_4$ are located on two screen lines 90, 91.

Figure 15B:
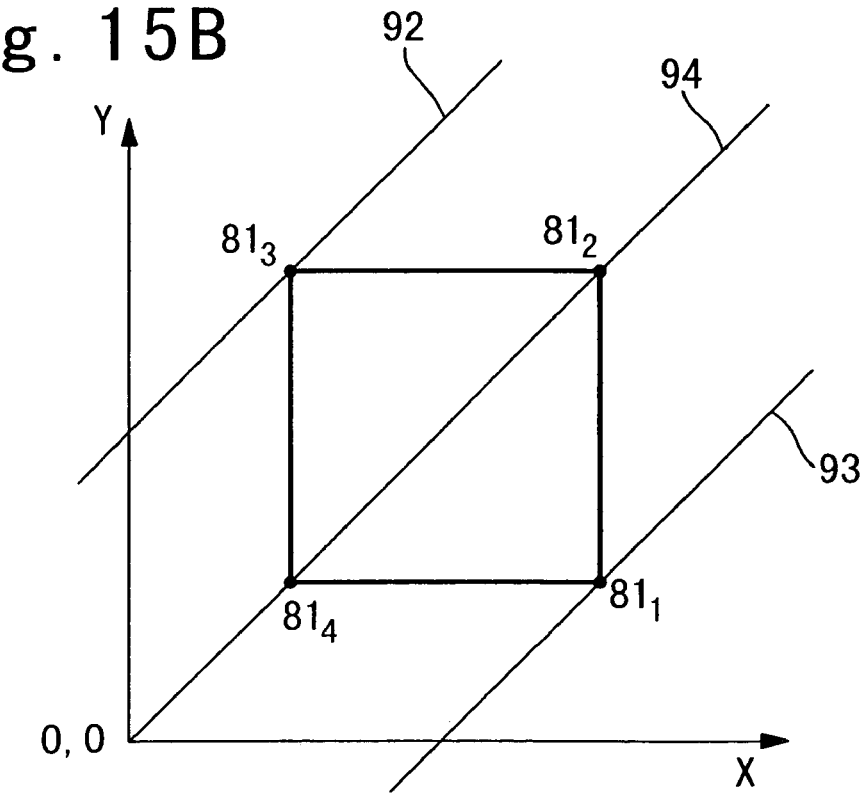

Also, as shown in FIG. 15B, there maybe a case that one of the dots $81_1$ to $81_4$ is located on a screen line 92, another one of the dots $81_1$ to $81_4$ is located on a screen line 93, and the remaining two of the dots $81_1$ to $81_4$ are located on a screen line 94 that is located between the screen lines 92, 93.

The extraction of the four dots 811 to 814 does not give the basis of judging whether the dots $81_1$ to $81_4$ have the arrangement shown in FIG. 15A or the arrangement shown in FIG. 15B. Therefore, both the straight lines 88 and the straight lines 89 are recognized as the candidates of the screen lines. Which of the straight lines 88 and the straight lines 89 are the true screen lines is judged from an angle between the straight lines 88 and an X-axis and/or a x-axis, and an angle between the straight lines 89 and an X-axis and/or a x-axis.

Figure 16:
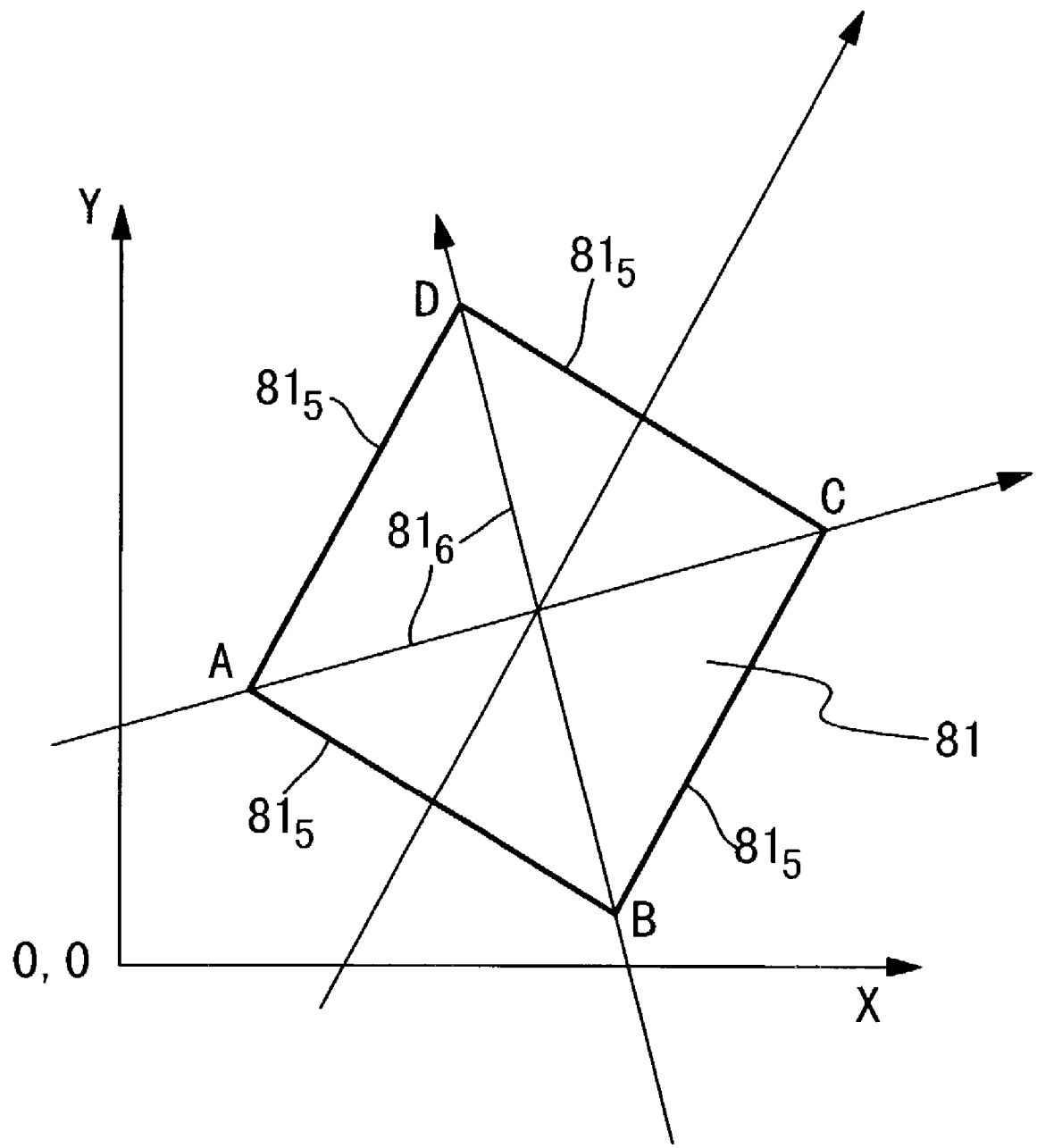
FIG. 16 is a view showing a third method of extracting screen lines.

A third method of extracting the screen lines extracts the screen lines from the shape of a dot 81, as shown in FIG. 16. In printing, the dot 81 is printed such that an extending direction of a side of a square, which is an outline of the dot 81, or an extending direction of a diagonal line comes in coincidence with the direction of the screen lines. The printed dot 81, even if its shape is slightly distorted, has a shape of a substantial square. In the third method of extracting the screen line, straight lines, which extend in an extending direction of a side $81_5$ of the square or an extending direction of a diagonal line $81_6$ and pass through the center points of the dots 81, are recognized as the screen lines.

Figure 17:
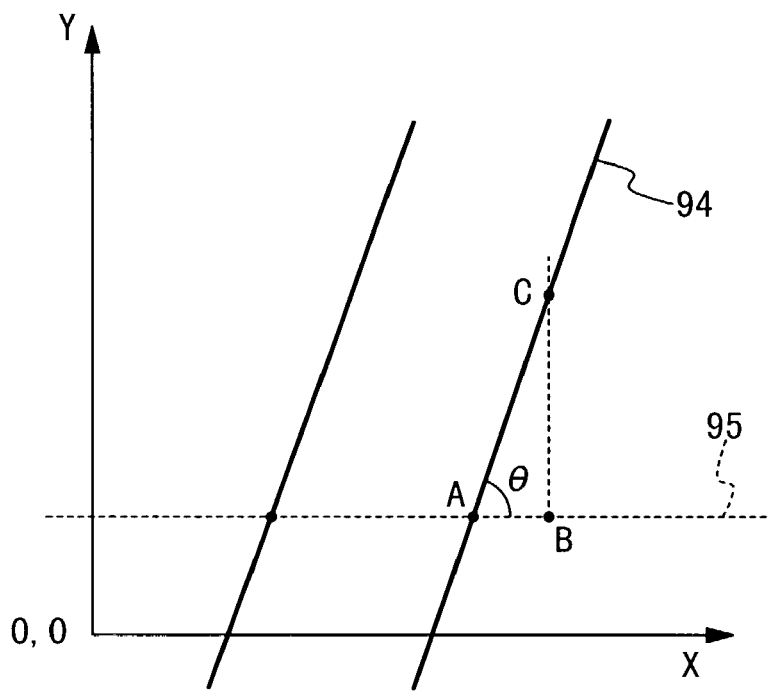
FIG. 17 is a view showing a method of calculating a screen angle.

Moreover, as shown in FIG. 10, a screen angle θ between the extracted screen lines and the X-axis is calculated (Step S13). As shown in FIG. 17, let points A, C be located on the screen line 94.

Let a point B be a foot of a perpendicular line dropped from the point C to a straight line 95 parallel to the X-axis through the point A. The screen angle θ is given by:

$\theta = \tan^{-1}(AB/BC)$.

The screen angle θ may be noted as $(n_{AB}, n_{BC})$ by using a number $n_{AB}$ of dots located on a line segment AB and a number $n_{BC}$ of dots located on a line segment BC.

The screen angle θ is added to the above mentioned print dot compression data module 55. When a picture is restored from the print dot compression data module 55, the screen angle θ is used, which is included in the print dot compression data module 55.

Figure 18:
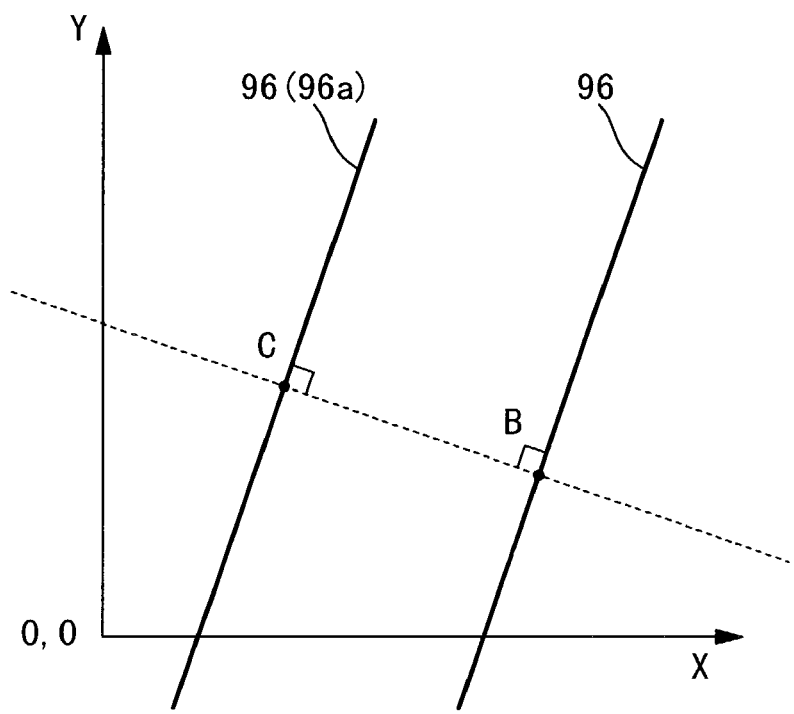
FIG. 18 is a view showing a method of calculating a screen ruling.

Moreover, as shown in FIG. 10, a screen ruling D is calculated (Step S14). The screen ruling D is calculated as follows. As shown in FIG. 18, the number of the screen lines 96 that intersect a straight line BC having a unit length is calculated as the screen ruling D where the straight line BC is a straight line orthogonal to screen lines 96 extracted at a step S12.

The screen ruling D is given by:

$D = 1/d_s$, where $d_s$ is the interval between the screen lines 96 is. The screen ruling D is added to the above mentioned print dot compression data module 55. When the picture is restored from the print dot compression data module 55, the screen ruling D is used which is included in the print dot compression data module 55.

Figure 19:
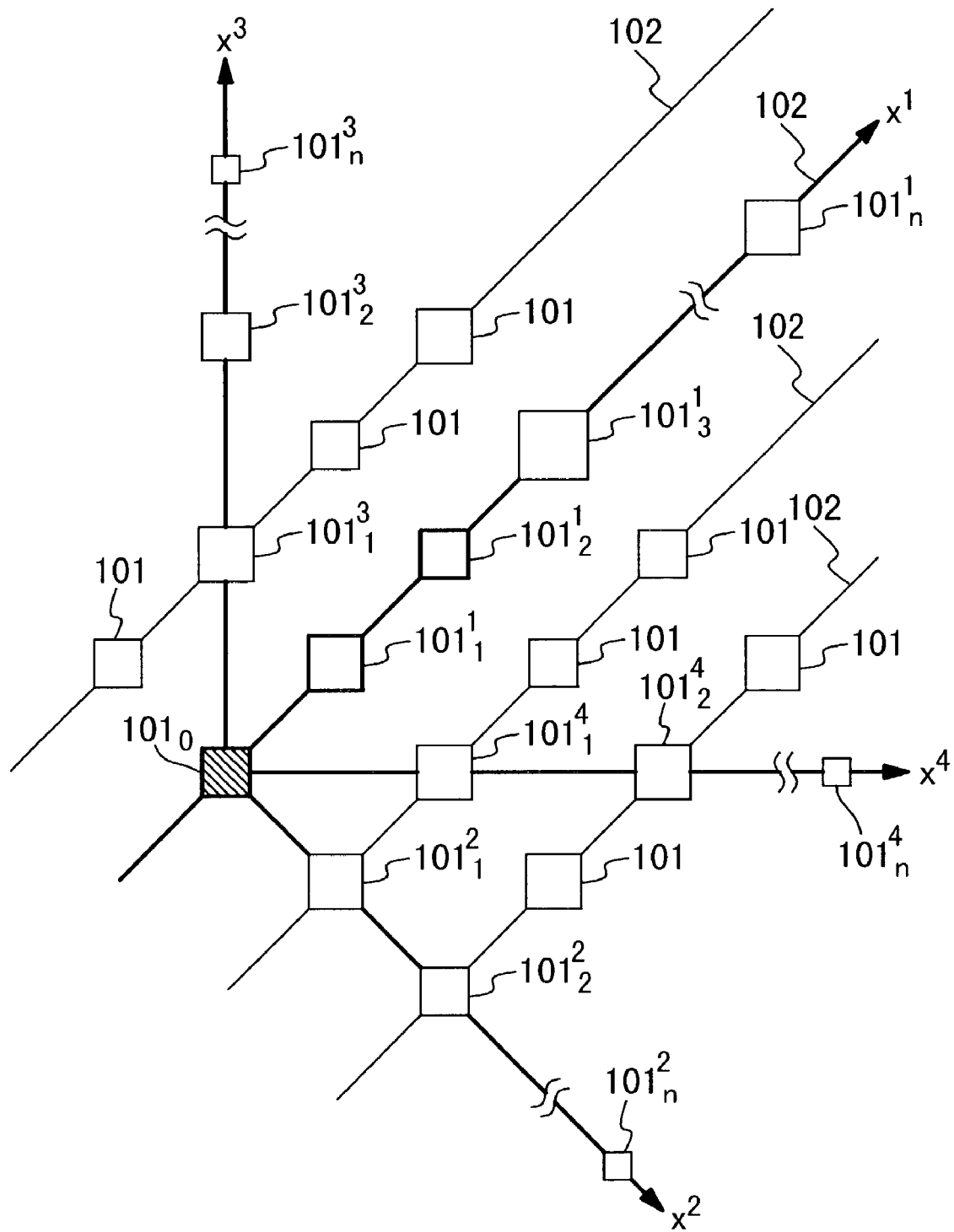
FIG. 19 is a view showing a method of calculating a dot vector.

Moreover, as shown in FIG. 10, dot vectors are calculated (Step S15). The process for calculating the dot vectors from dots 101 aligned on screen lines 102 as shown in FIG. 19 will be described below.

One of the dots 101 is defined as a characterizing dot. For the characterizing dot, a dot vector is determined which is an eighth-dimension vector. Here a firstly determined characterizing dot for one screen line among the screen lines 102 is referred to as a standard characterizing dot. If the determined characterizing dot is the standard characterizing dot, a position and an area of the standard characterizing dot are added to the print dot compression data module 55.

In this embodiment, at first, a dot vector $p_0$ is determined with a dot $101_0$ as the characterizing dot. The dot $101_0$ is the standard characterizing dot, and a position and area thereof are added to the print dot compression data module 55.

Next, an $x^1$-axis, an $x^2$-axis, an $x^3$-axis and an $x^4$-axis are determined with the center of the characterizing dot as an origin. The $x^1$-axis direction is the direction parallel to the screen lines 102. The $x^2$-axis direction is the direction vertical to the screen lines 102. The $x^3$-axis direction and the $x^4$-axis direction are the directions angled at 45° with respect to the screen lines 102. The $x^1$-axis, the $x^2$-axis, the $x^3$-axis and the $x^4$-axis are determined with the dot $101_0$ as the origin.

Two of the elements of the dot vector $p_0$ are determined in relation to the $x^1$-axis. A vector having the two of the elements of the dot vector $p_0$ determined in relation to the $x^1$-axis as the elements thereof is referred to as a dot small vector $p^1_0$. In the same way, vectors having the two of the elements of the dot vector $p_0$ respectively determined in relation to the $x^2$-axis, the $x^3$-axis and the $x^4$-axis from as the elements thereof are referred to as a dot small vector $p^2_0$, a dot small vector $p^3_0$ and a dot small vector $p^4_0$, respectively.

At first, the dot small vector $p^1_0$ is determined. The dot small vector $p^1_0$ is calculated from the positions and the areas of the dots $101_1$ to $101_n$ located on the $x^1$-axis, in the dot 101.

Figure 20:
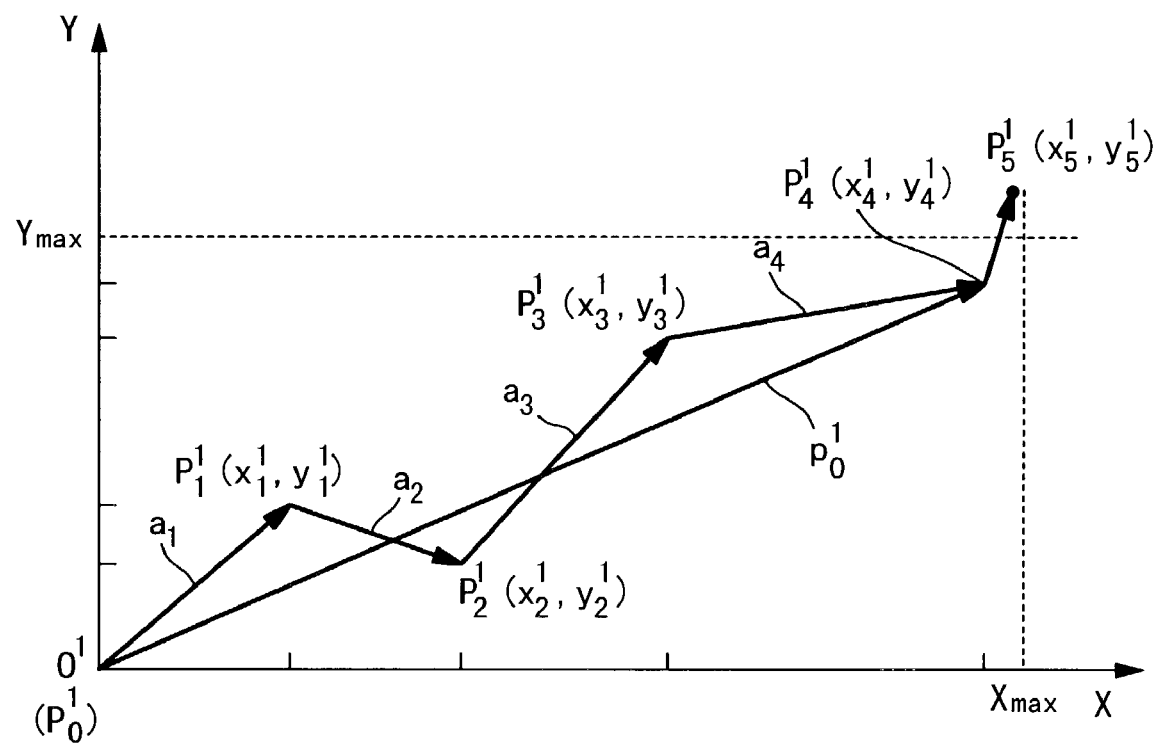
FIG. 20 is a view showing positions at which a dot $101_0$ and dots $101^1_1$ to $101^1_n$ are located in an imaginary coordinate system $Q_1$.

In order to determine the dot small vector $p^1_0$, an imaginary coordinate system $Q^1$ is firstly determined. In the imaginary coordinate system $Q^1$, as shown in FIG. 20, a dot $101_0$, which is the characterizing dot, is placed at the origin $O^1$. Moreover, dots $101^1_0$ to $101^1_n$ are placed at points $p^1_1$ to $P^1_n$, respectively.

The coordinates of the points $P^1_1$ to $P^1_n$ are determined as follows. Let an x-coordinate of the point $P^1_i$ of the points $P^1_1$ to $P^1_n$ be $x^1_i$, and a y-coordinate thereof be $y^1_i$. At this time, the x-coordinate $x^1_i$ of the point $P^1_i$ is determined so as to be equal to a distance between a dot $101^1_i$ and the dot $101_0$ in the actual space. Moreover, the y-coordinate $y^1_i$ is determined by the following equation:

$$y^1_i = S^1_i - S_0$$

where $S^1_i$ is an area of the dot $101_1{}^i$ and $S_0$ is an area of the dot $101_0$.

Moreover, let $q^1_j$ be a position vector at the point $P^1_i$ in the imaginary coordinate system $Q^1$. The position vector $q^1_i$ is given by:

$$q^1_i = (x^1_i, y^1_i).$$

Moreover, an adjacent dot vector $a^1_i$ is defined as follows:

$$a^1_i = q^1_i - q^1_{i-1}.$$

The adjacent dot vector $a^1_i$ is the difference between the position vectors of two dots adjacent to each other. The adjacent dot vector $a^1_i$ is given by:

$$a^1_i = (\Delta x_{1i}, \Delta y^1_i)$$

where $$\Delta x^1_i = x^1_i - x^1_{i-1}$$
$$\Delta y^1_i = y^1_i - y^1_{i-1}$$

The dot small vector $p_0{}^1$ is determined to be equal to a position vector $q^1_k$ when k' is defined as being the minimum value of an integer k satisfying the following condition.

Condition: for all integers J that are 2 or more and k or less:

$$|x^1_j| \leq x_{max},\quad (a)$$

$$|y^1_j| \leq y_{max},\quad (b)$$

$$\Delta x^1_j \leq x_{dif},\quad (c)$$

$$\Delta y^1_j \leq Y_{dif},\quad (d)$$

where $x_{max}$, $y_{max}$, $x_{dif}$ and $y_{dif}$ are predetermined standard values.

In detail, they are determined as follows. At first, for j being 2, it is judged whether or not the conditions (a) to (d) are satisfied. If any of the conditions (a) to (d) is not satisfied, a dot small vector $p^1_0$ is determined as a position vector $q^1_1$.

Next, for j being 3, it is judged whether or not the conditions (a) to (d) are satisfied. If any of the conditions (a) to (d) is not satisfied, the dot vector $p^1_0$ is determined as a position vector $q^1_2$.

After that, while j is incremented in turn, it is judged whether or not the conditions (a) to (d) are satisfied. The dot small vector $p^1_0$ is determined as a position vector $q_{k'}$ when any of the conditions (a) to (d) is firstly dissatisfied for j being k'+1.

As for a case shown in FIG. 20, when j is 2 or more and 4 or less, all of the conditions (a) to (d) is satisfied. However, when j=5, $|y^1_5| > y_{max}$ and thus the condition (b) is not satisfied. Therefore, k' is determined as being 4. That is, the dot small vector $p^1_0$ is given by:

$$p^1_0 = q^1_4.$$

The dot small vector $p^1_0$ equal to the position vector $q_{k'}$ is a vector from the origin O, that is, the point $P_0$ to the point $q_{k'}$. Here, it holds:

$$p^1_0 = (x^1_{k'}, y^1_{k'}),$$

$$= (x^1_{k'}, S^1_{k'}, -S_0).$$

As mentioned above, the $x^1_k$ is the distance between the dot $101_0$ and the dot $101^1_{k'}$. Moreover, the $S^1_{k'} - S_0$ is the difference in the area between the dot $101_0$ and the dot $101^1_{k'}$. That is, the dot small vector $p^1_0$ is the vector having as the elements the distance between the dot $101_0$ and the dot $101^1_k$ and the difference in the area between the dot $101_0$ and the dot $101^1_k$. Thus, the dot small vector $p^1_0$ includes the information of the positions and the areas of the dots $101_1$ to $101_{k'}$.

The same operation is carried out for the $x^2$-axis, the $x^3$-axis and the $x^4$-axis, to respectively determine a dot small vector $p^2_0$, a dot small vector $p^3_0$ and a dot small vector $p^4_0$. The dot small vector $p^2_0$ is calculated from dots $101^2_1$ to $101^2_n$ of the dots 101, the dots $101^2_1$ to $101^2_n$ being located on the $x^2$-axis. The process for calculating the dot small vector $p^2_0$ from the dots $101^2_1$ to $101^2_n$ located on the $x^2$-axis is identical to the process for calculating the dot small vector $p^1_0$ from the dots $101^1_1$ to $101^1_n$ located on the $x^1$-axis.

Also, the dot small vector $p^3_0$ is calculated from dots $101^3_1$ to $101^3_n$ of the dots 101, the dots $101^3_1$ to $101^3_n$ being located on the $x^3$-axis. The process for calculating the dot small vector $p^3_0$ from the dots $101^3_1$ to $101^3_n$ located on the $x^3$-axis is identical to the process for calculating the dot small vector $p^1_0$ from the dots $101^1_1$ to $101^1_n$ located on the $x^1$-axis.

The dot small vector $p^4_0$ is calculated from dots $101^4_1$ to $101^4_n$ of the dots 101, the dots $101^4_1$ to $101^4_n$ being located on the $x^4$-axis. The process for calculating the dot small vector $p^4_0$ from the dots $101^4_1$ to $101^4_n$ located on the $x^4$-axis is similar to the process for calculating the dot small vector $p^1_0$ from the dots $101^1_1$ to $101^1_n$ located on the $x^1$-axis.

The dot vector $p_0$ is determined from the dot small vector $p^1_0$, the dot small vector $p^2_0$, the dot small vector $p^3_0$ and the dot small vector $p^4_0$.

The dot vector $p_0$ includes the information representative of the positions and areas of the dots that are located on the $x^1$-axis and between the dot $101_0$ and the dot $101^1$. Moreover, the dot vector $p_0$ includes the information representative of the positions and areas of the dots that are located on the $x^2$-axis and between the dot $101_0$ and the dot $101^2$. Moreover, the dot vector $p_0$ includes the information representative of the positions and areas of the dots that are located on the $x^3$-axis and between the dot $101_0$ and the dot $101^3$. Moreover, the dot vector $p_0$ includes the information representative of the positions and areas of the dots that are located on the $x^4$-axis and between the dot $101_0$ and the dot $101^4$.

Following the calculation of the dot vector $p_o$, another dot $101^1_{k'}$ that is the end point of the dot small vector $p^1_0$ is determined as the characterizing dot, and the other dot vector $P_{k'}$ is determined. After that, towards a $+x^1$-axis direction, the calculations of the dot vectors are carried out in turn.

The calculation of the dot vector is similarly performed on the other screen lines. The calculation of the dot vector is performed on all the dots included in the print dot image element data 52.

The thus-generated dot vector p is the eighth-dimensional vector, and the elements thereof is represented by:

$$p=(x^1, \Delta S^1, x^2, \Delta S^2, x^3, \Delta S^3, x^4, \Delta S^4),$$

where $x^1$ is a distance between a characterizing dot and an $x^1$ dot that is another dot located on the $x^1$-axis;

$\Delta S^1$ is the difference in the area between the characterizing dot and the $x^1$ dot;

$x^2$ is a distance between the characterizing dot and an $x^2$ dot that is another dot located on the $x^2$-axis;

$\Delta S^2$ is the difference in the area between the characterizing dot and the $x^3$ dot;

$x^3$ is a distance between the characterizing dot and an $x^3$ dot that is the different dot located on the $x^3$-axis;

$\Delta S^3$ is the difference in the area between the characterizing dot and the $x^3$ dot;

$x^4$ is a distance between the characterizing dot and an $x^4$ dot that is another dot located on the $x^4$-axis; and $\Delta S^4$ is the difference in the area between the characterizing dot and the $x^4$ dot.

The calculated dot vector is encoded to calculate the print dot compression data module 55 (Step S16). During encoding, the dot vector is compressed to increase the compression ratio.

By the above mentioned processes, the print dot image element data 52 is compressed in accordance with the print dot pattern compressing algorithm to generate the print dot compression data module 55.

On the other hand, as shown in FIG. 1, the line picture image element data 53 is compressed in accordance with the line picture compressing algorithm to generate the line picture compression data module 56 (Step S05). In the line picture compressing algorithm, an edge of an image element is detected, and a vector indicative of a direction of the edge is then calculated. Moreover, the vector is encoded to thereby generate the line picture compression data module 56.

The line picture compressing algorithm will be described below in detail.

Figure 21:
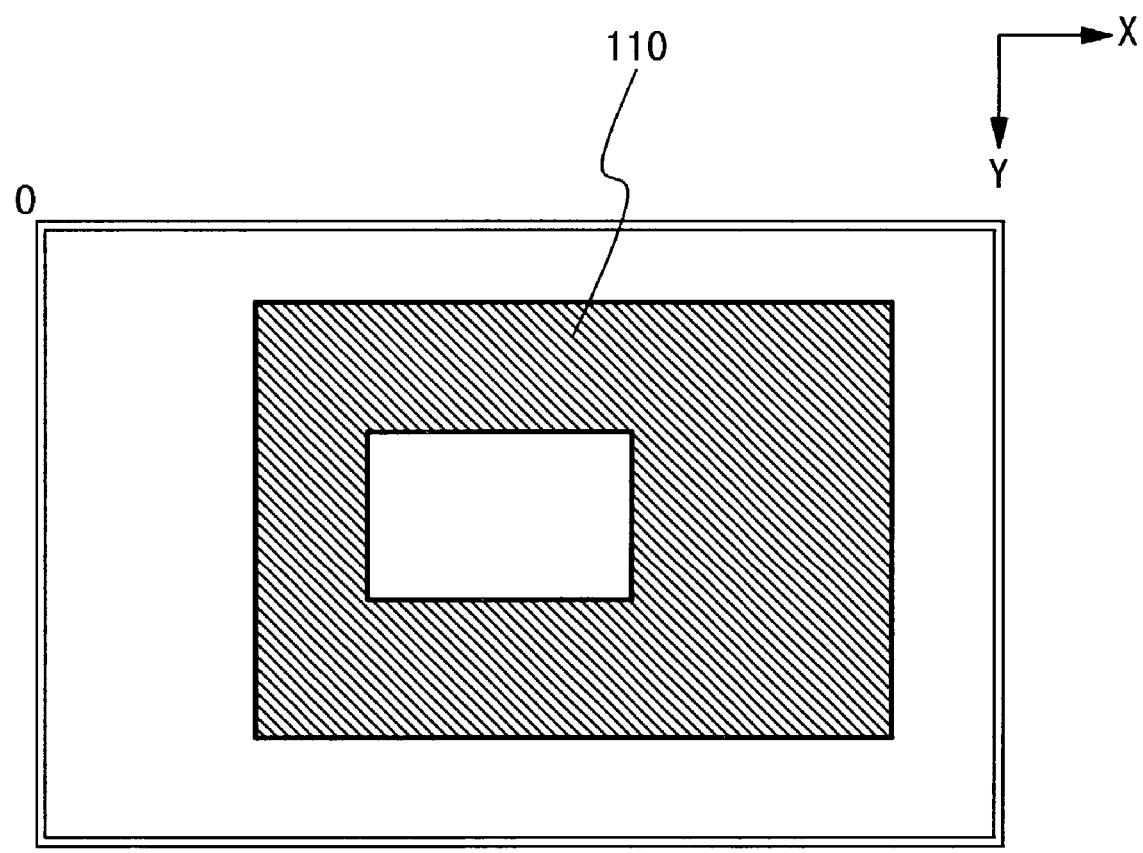
FIG. 21 shows a picture to be compressed on the basis of a line picture compression algorithm.
Figure 22:
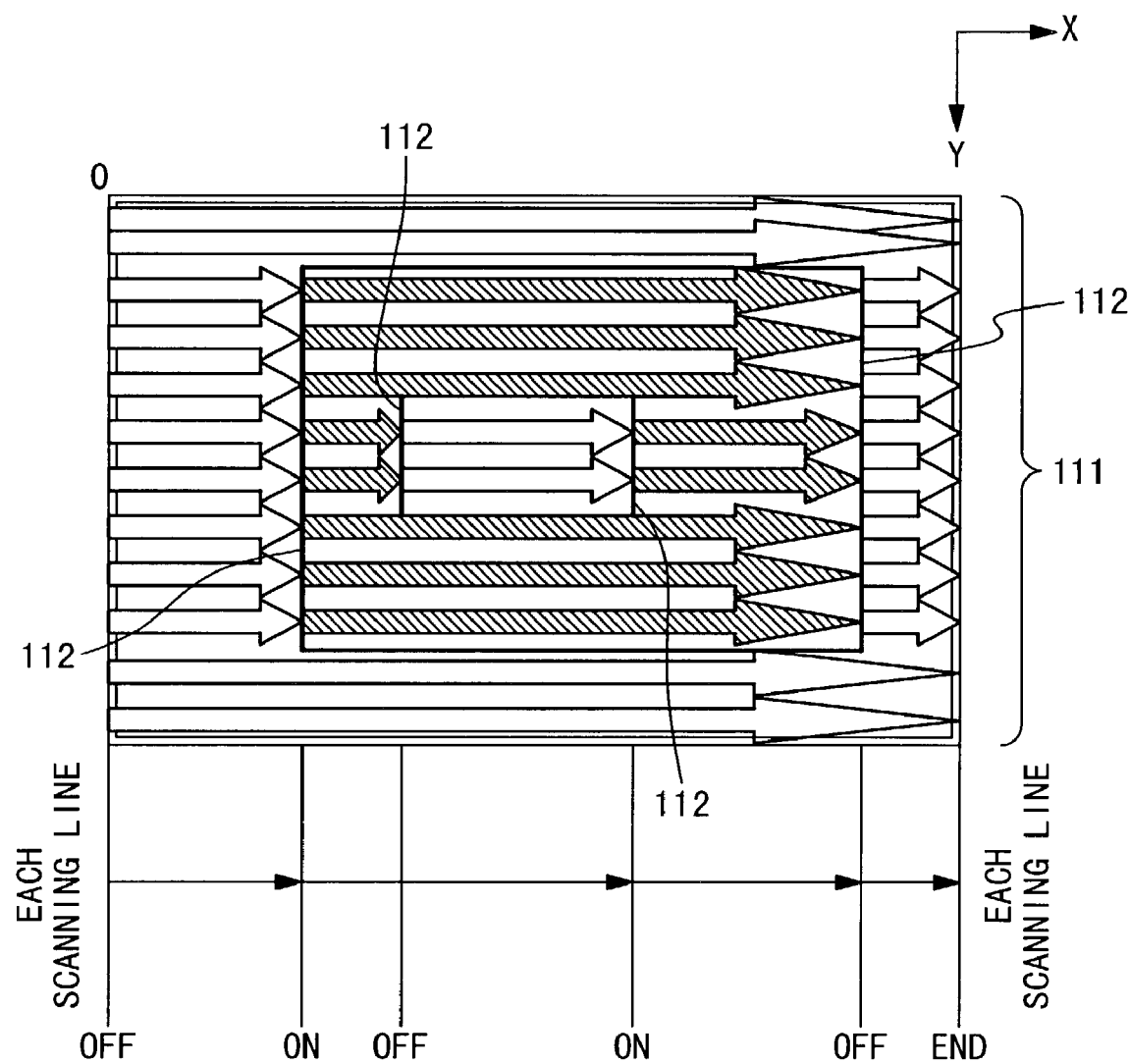
FIG. 22 shows a detecting method of edges 112.

The line picture compressing algorithm is explained by using a exemplary case when a original picture 110 shown in FIG. 21 is compressed in accordance with the line picture compressing algorithm. At first, as shown in FIG. 22, the original picture 110 is scanned along a scanning line 111, and a graduation of the original picture 110 are detected. The scanning line 111 is parallel to the x-axis. Edges 112 of the original picture 110 are detected from the change of the graduation. The edges 112 are located where the graduation is sharply changed.

The direction of the scanning line 111 is not limited to the direction parallel to the X-axis. The scanning line 111 may be parallel to the Y-axis, and it may be another direction.

Scanning the original picture 110 along the scanning line 111 to detect the edge 112 enables to increase the speed of the detection of the edge 112 of the original picture 110. This is desirable in that the speed of the compression of data representative of the picture indicated as the line picture is made faster.

Figure 23:
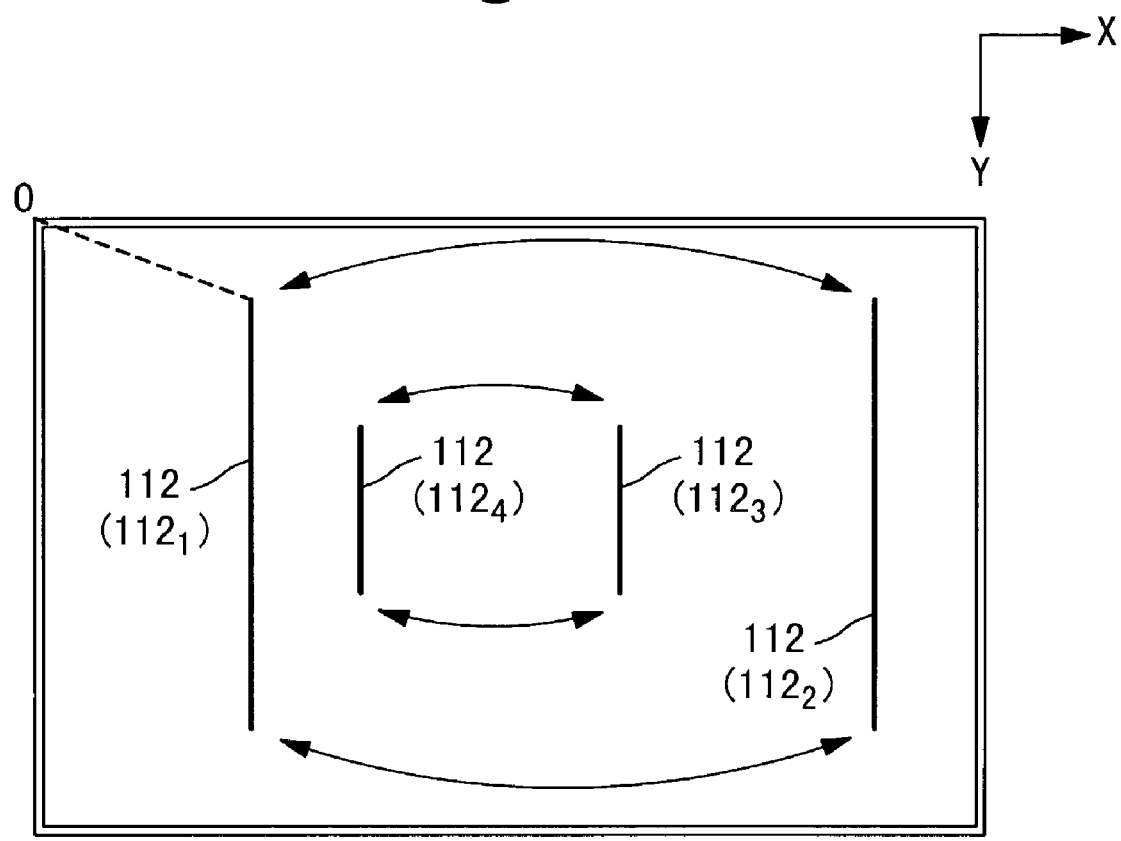
FIG. 23 shows the edges 112.

FIG. 23 shows the detected edges 112. The detected edges 112 are linked to thereby generate an outline. At first, an edge $112_1$ that is the closest to the origin O is selected. Moreover, an edge $112_2$ having a point thereon which is the farthest from the origin O is selected. The edge $112_1$ and the edge $112_2$ are linked to thereby generate the outline.

Moreover, an edge $112_3$ that is the next closest to the origin O and an edge $112_4$ that is the second farthest from the origin O are selected. The edge $112_3$ and the edge $112_4$ are linked to thereby generate an outline.

Even if other edges are present, they are similarly linked to thereby generate the outline.

Figure 24:
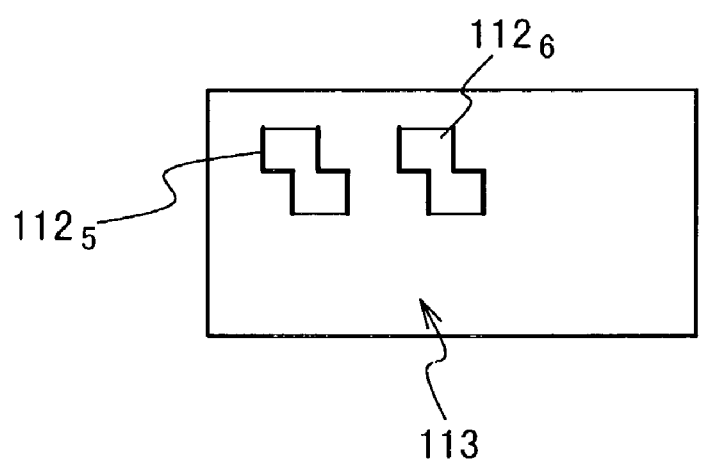
FIG. 24 shows a detecting method of a noise.

However, as shown in FIG. 24, if an area of a region 113 inside an outline generated by a link connecting an edge $112_5$ and an edge $112_6$ is smaller than a predetermined value η, the edge $112_5$ and the edge $112_6$ are judged to be noises. The edge $112_5$ and the edge $112_6$ are discarded.

Figure 25:
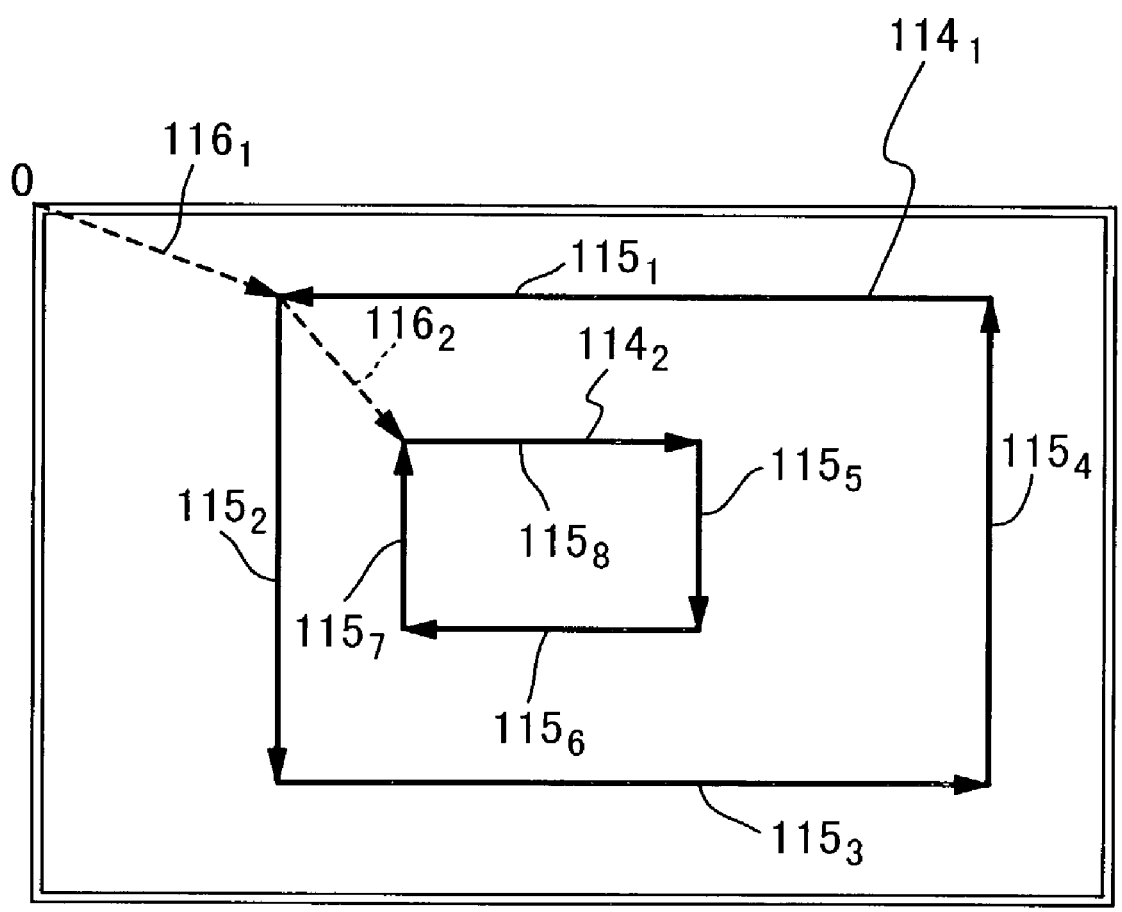
FIG. 25 shows outline vectors $115_1$ to $115_8$.

FIG. 25 shows the generated outline. An outline $114_1$ is generated by the link between the edge $112_1$ and the edge $112_2$. An outline $114_2$ is generated by the link between the edge $112_3$ and the edge $112_4$.

Outline vectors $115_1$ to $115_4$ are defined along the outline $114_1$. Outline vectors $115_5$ to $115_8$ are defined along the outline $114_2$. Moreover, position vectors $116_1$, $116_2$ representative of the positions of the outlines $114_1$, $114_2$ are respectively determined.

If necessary, smoothing is performed on the outline to reduce the number of the outline vectors.

Figure 26:
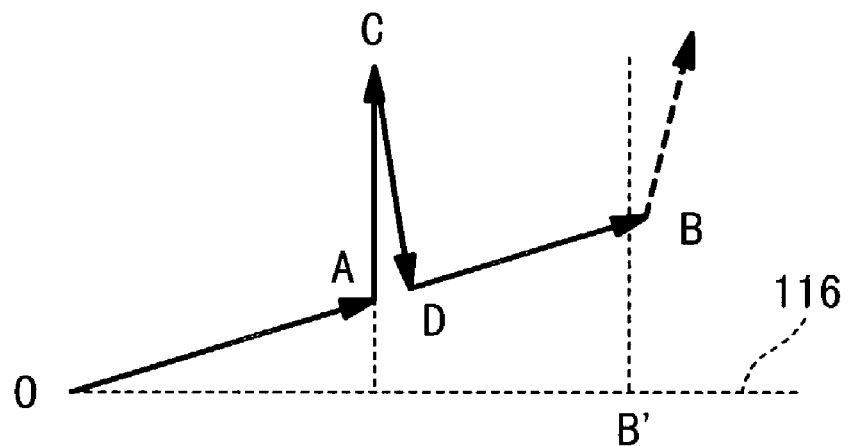
FIG. 26 shows a process of smoothing an outline.

As shown in FIG. 26, let us suppose that outline vectors OA, AC, CD and DB are defined along the outline. This corresponds to the case when a convex outline is locally defined. In this case, it is determined as follows whether the outline vectors OA, AC, CD and DB are left as they are or the outline vectors OA, AC, CD and DB are integrated and only the outline vector OB is left.

A straight line 116 is defined which passes through the point O and is parallel to the X-axis. Let the point B' be a foot of a perpendicular line dropped from the point B to the straight line 116. In this case, the outline vectors OA, AC, CD and DB are integrated to thereby generate the outline vector OB when a length $I_{AC}$ of the line segment AC and a length $I_{BB}$ of the line segment BB' satisfy the following equation:

$$I_{BB'} - I_{AC} \leq \alpha_1, \qquad (e)$$

where $\alpha_1$ is a predetermined standard value. If the equation (e) is not satisfied, the outline vectors OA, AC, CD and DB are left as they are. The case of satisfying the equation (e) is the case that the convex portion existing on the outline is small. If the equation (e) is satisfied, the convex portion existing on the outline is judged to be small, and the convex portion is ignored.

It may be judged whether the outline vectors OA, AC, CD and DB are left in their original states or only the outline vector OB is left can be judged on the basis of the following condition:

$$S_{OBB'} - S_{ACD} \leq \alpha_2, \qquad (f)$$

where $S_{ACD}$ is an area of a triangle ACD and $S_{OBB'}$ is an area of a triangle OBB'. $\alpha_2$ is a predetermined standard value. If the condition (f) is satisfied, the outline vectors OA, AC, CD and DB are integrated to thereby generate the outline vector OB. If the condition (f) is not satisfied, the outline vectors OA, AC, CD and DB are left as they are. The case that the condition (f) is satisfied is the case that the convex portion existing on the outline is small. If the condition (f) is satisfied, the convex portion existing on the outline is judged to be small, and the convex portion is ignored.

Figure 27:
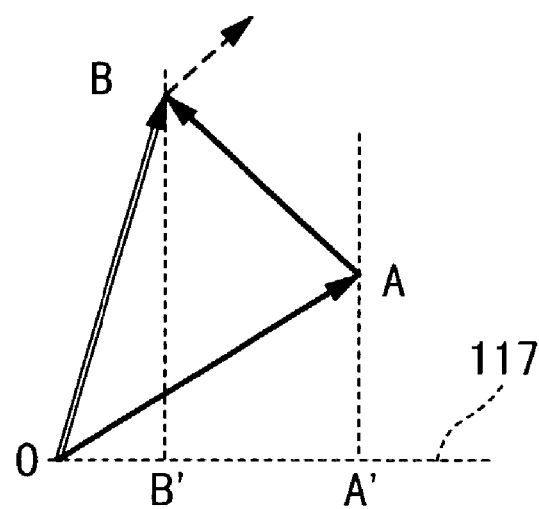
FIG. 27 shows a process of smoothing the outline.

Also, as shown in FIG. 27, let us suppose that outline vectors OA, AB are defined along an outline. In this case, it is determined as follows whether the outline vectors OA, AB are left as they are or the outline vectors OA, AB are integrated into an outline vector OB.

A straight line 117 is defined which passes through a point O and is parallel to an X-axis. A point A' and a point B' is respectively defined as being feet of perpendicular lines dropped from a point A and a point B to the straight line 117. Moreover, $S_{OAA'}$ is defined as being an area of a triangle OAA', and $S_{OBB'}$ is defined as an area of a triangle OBB'. The outline vectors OA, AB are integrated to thereby generate an outline vector OB, if they satisfy the following condition:

$$S_{OBB} - S_{ACD} \leq \alpha_3. \quad (g)$$

If the condition (g) is not satisfied, the outline vectors OA, AB are left as they are. The case when the condition (g) is satisfied corresponds to the case that the curvature of the outline is local and small. If the condition (g) is not satisfied, the curvature of the outline is ignored.

The outline vector and the position vector, which are generated by the above-mentioned processes, are encoded. Moreover, a graduation data is encoded for indicating the graduations of image elements existing between the outlines. It should be noted that the number of the graduations might be 2, or might be more, for example, 256.

The encoded outline vector and graduation constitute the compressed picture data. The compression of the picture based on the line picture compressing algorithm is completed by the above mentioned processes. The line picture image element data 53 is compressed in accordance with the line picture compressing algorithm to thereby generate the line picture compression data module 56.

As shown in FIG. 1, the free micro dot compression data module 54, the print dot compression data module 55 and the line picture compression data module 56 are integrated into one piece of data to generate a collectively compressed data module 57 (Step S06). The collectively compressed data module 57 may be recorded on a recording medium to be used.

The compression of the page space image data 50 is completed by the above mentioned processes. It should be noted that the free micro dot compression data module 54, the print dot compression data module 55 and the line picture compression data module 56 may not be integrated and they are stored as different files.

Figure 28:
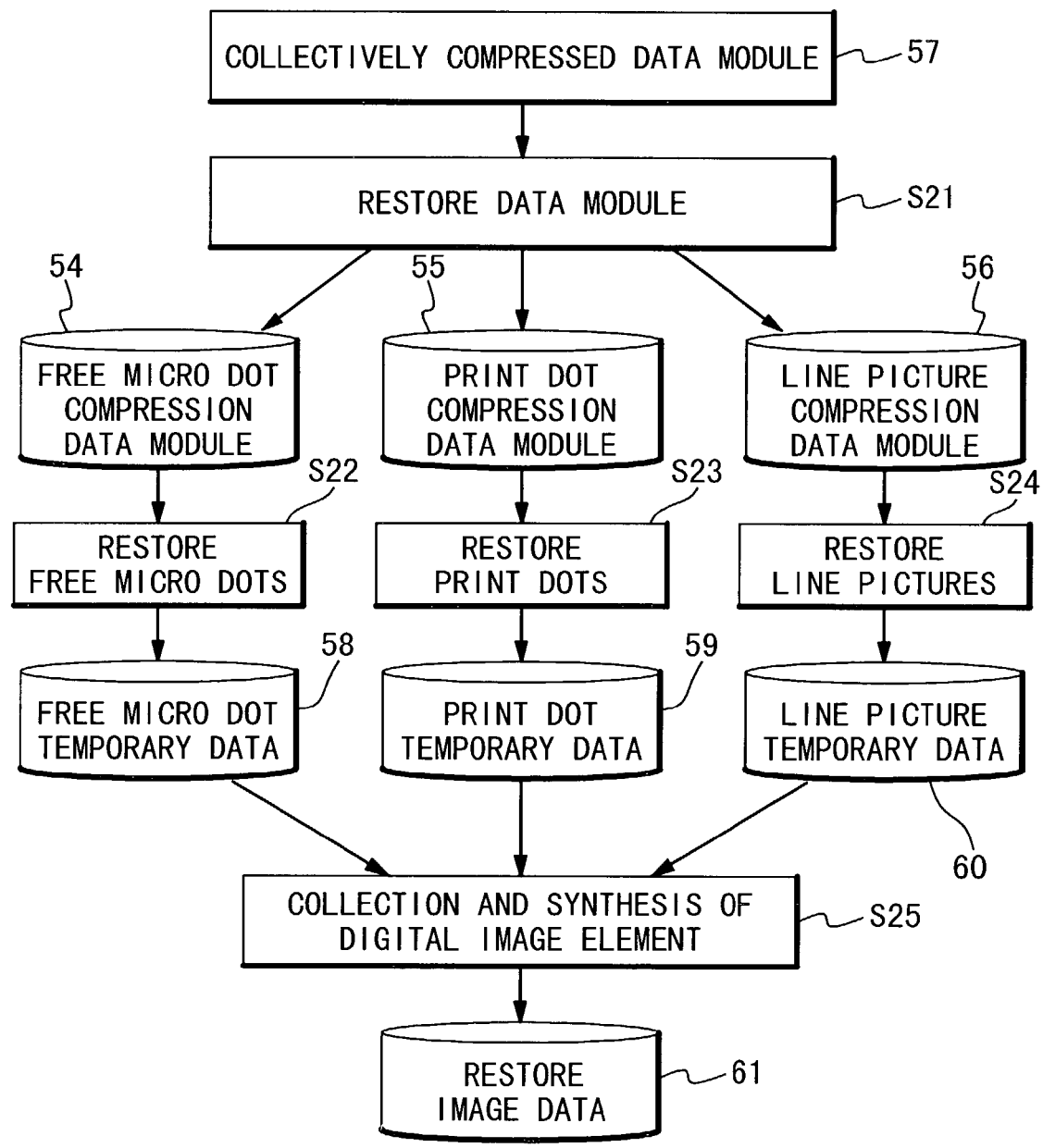
FIG. 28 is a flowchart showing the image data restoring method of the first embodiment of the present invention.

A process for restoring the original picture from the collectively compressed data module 57 will be described below. At first, as shown in FIG. 28, the free micro dot compression data module 54, the print dot compression data module 55 and the line picture compression data module 56 are restored from the collectively compressed data module 57 (Step S21). It should be noted that the step S21 is not carried out if the free micro dot compression data module 54, the print dot compression data module 55 and the line picture compression data module 56 are not integrated and they are stored as the different files.

The free micro dot compression data module 54 is restored in accordance with a free micro dot pattern restoring algorithm to generate a free micro dot temporary data 58 is generated (Step S22). The reverse conversion to the conversion done in the above-mentioned free micro dot pattern compressing algorithm is carried out in the free micro dot pattern restoring algorithm.

That is, the free micro dot compression data module 54 includes the data into which the pattern of the above mentioned area patch 71 is encoded and compressed. At first, a symbol representative of the pattern is decoded, and then the pattern of the area patch 71 is further reproduced. The patterns of the area patch 71 are arrayed corresponding to their original states to generate the free micro dot temporary data 58. The free micro dot temporary data 58 includes the data representative of the portion of the free micro dot in the original image 30.

The print dot compression data module 55 is restored in accordance with a print dot restoring algorithm to generate a print dot temporary data (Step S23).

As mentioned above, the dot vector p defined with respect to a characterizing dot is encoded into the print dot compression data module 55.

As mentioned above, the dot vector p is represented by:

$$p=(x^1, \Delta S^1, x^2, \Delta S^2, x^3, \Delta S^3, x^4, \Delta S^4),$$

where $x^1$ is the distance between the characterizing dot and the $x^1$ dot that is the other dot located on the $x^1$-axis;

$\Delta S^1$ is the difference in the area between the characterizing dot and the $x^1$ dot;

$x^2$ is the distance between the characterizing dot and the $x^2$ dot that is the other dot located on the $x^2$-axis.

$\Delta S^3$ is the difference in the area between the characterizing dot and the $x^3$ dot;

$x^3$ is the distance between the characterizing dot and the $x^3$ dot that is the other dot located on the $x^3$-axis;

$\Delta S^3$ is the difference in the area between the characterizing dot and the $x^3$ dot;

$x^4$ is the distance between the characterizing dot and the $x^4$ dot that is the other dot located on the $x^4$-axis.

$\Delta S^4$ is the difference in the area between the characterizing dot and the $x^4$ dot.

Figure 29:
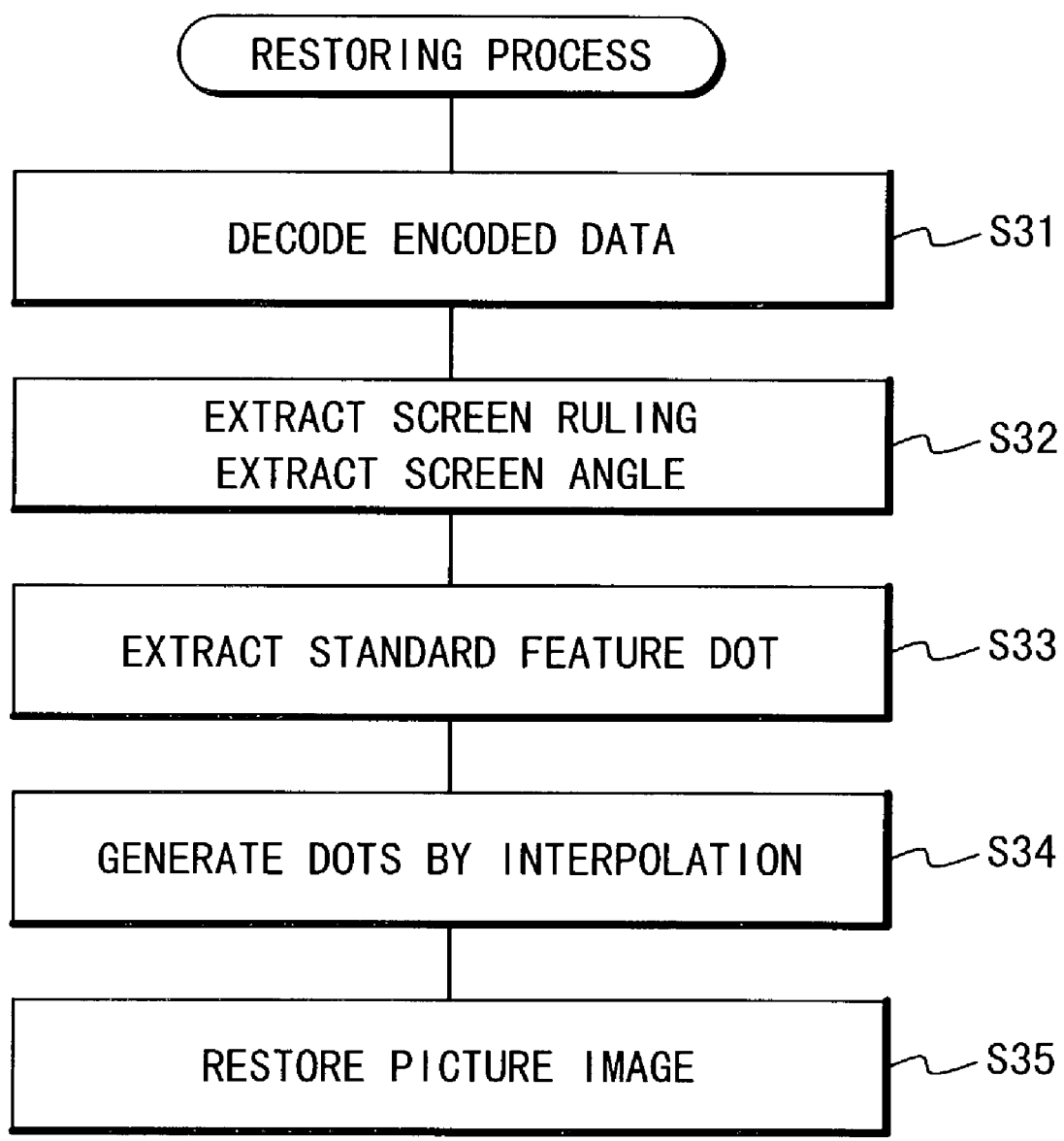
FIG. 29 is a flowchart showing a print dot restoring algorithm.

FIG. 29 is a flowchart showing the print dot restoring algorithm. At first, the print dot compression data module 55 is restored (Step S31).

The screen ruling D and the screen angle θ are extracted from the restored print dot compression data module 55 (Step S32). The direction and the number of the screen lines determined for the picture to be restored are determined.

The position and area of a standard characterizing dot are extracted from the restored print dot compression data module 55 (Step S33).

Moreover, the dot vector p determined for the standard characterizing dot is extracted. Moreover, the position and area of other dots are determined by the interpolation, on the basis of that dot vector p (Step S34)

Figure 30:
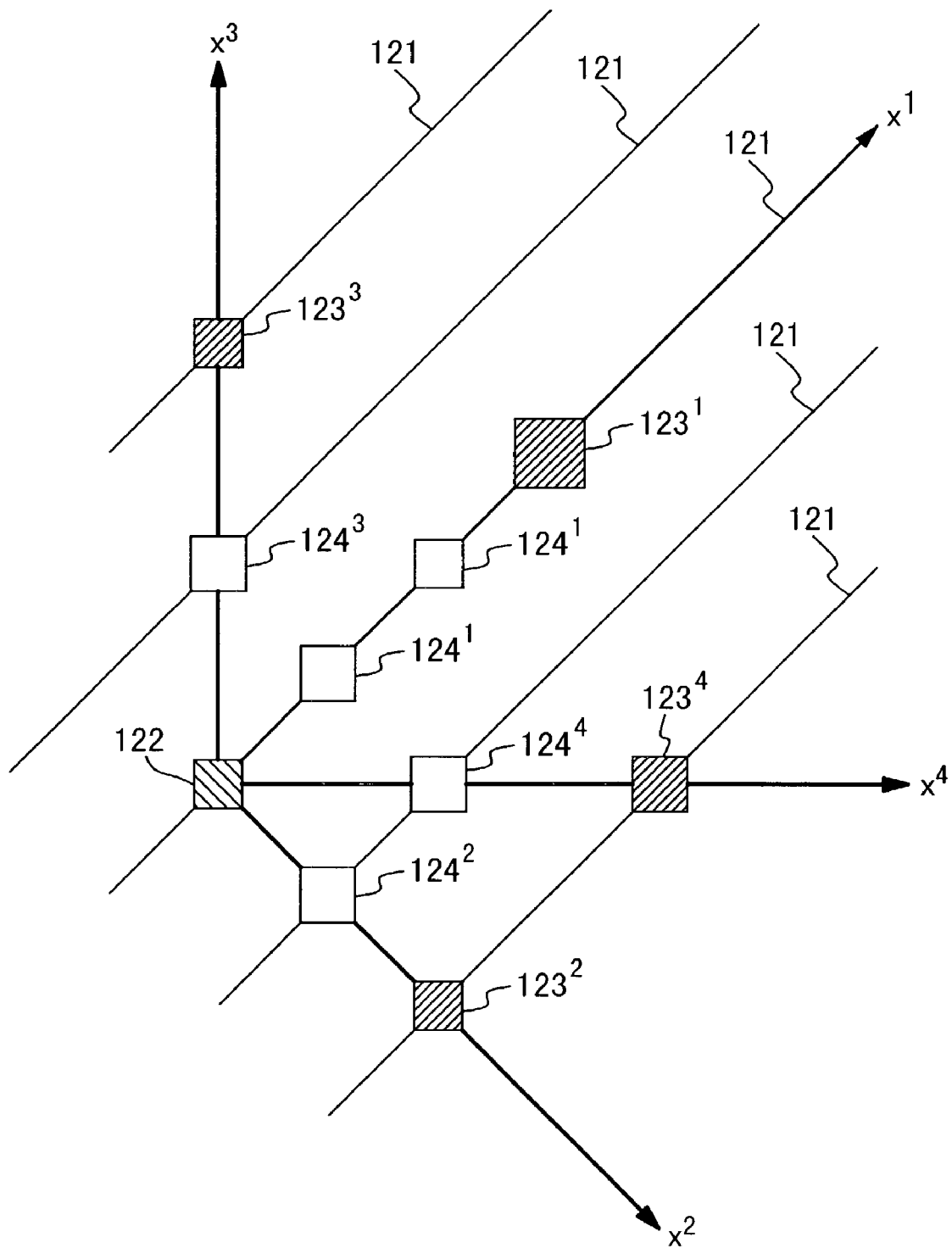
FIG. 30 is a flowchart showing a process for restoring dots.

FIG. 30 shows the process for determining the position and area of the other dots. A screen line 121 is restored on the basis of the screen ruling D and the screen angle θ extracted at the step S32.

Moreover, the standard characterizing dot 122 is restored on the basis of the position and area of the standard characterizing dot 122 extracted at the step S32. Next, an $x^1$-axis, an $x^2$-axis, an $x^3$-axis and an $x^4$-axis are determined, as shown in FIG. 30, using the standard characterizing dot 122 as an origin.

Moreover, an area and a point position of a center of a characterizing dot $123^1$ located on the $x^1$-axis are determined on the basis of the elements $x^1$ and $\Delta S^1$ of the dot vector p determined for the standard characterizing dot 122. The characterizing dot $123^1$ is restored. Moreover, on the basis of the areas and positions of the characterizing dot $123^1$ and the standard characterizing dot 122, an area and a position of a dot $124^1$ located between them are determined by an interpolation, on the basis of the element $x^1$ and the element $\Delta S^1$. The area of the dot $124^1$ ranges between the area of the standard characterizing dot 122 and the area of the characterizing dot $123^1$. The dot $124^1$ is restored.

Moreover, an area and a position of a characterizing dot $123^2$ located on the $x^2$-axis are determined on the basis of the element $x^2$ and $\Delta S^2$ of the dot vector p determined for the standard characterizing dot 122. The characterizing dot $123^2$ is restored. On the basis of the areas and positions of the characterizing dot $123^2$ and the standard characterizing dot 122, an area and a position of a dot $124^2$ located between them are determined by an interpolation, on the basis of the element $x^2$ and the element $\Delta S^2$. The area of the dot $124^2$ ranges between the area of the standard characterizing dot 122 and the area of the characterizing dot $123^2$. The dot $124^2$ is restored.

Moreover, an area and a position of a characterizing dot $123^3$ located on the $x^3$-axis are determined on the basis of the elements $x^3$ and $\Delta S^3$ of the dot vector p determined for the standard characterizing dot 122. The characterizing dot $123^3$ is restored. On the basis of the areas and positions of the characterizing dot $123^3$ and the standard characterizing dot 122, an area and a position of a dot $124^3$ located between them are determined by an interpolation, on the basis of the element $x^3$ and the element $\Delta S^3$. The area of the dot $124^3$ ranges between the area of the standard characterizing dot 122 and the area of the characterizing dot $123^3$. The dot $124^3$ is restored.

Moreover, an area and a position of a characterizing dot $123^4$ located on the $x^4$-axis are determined on the basis of the element $x^4$ and $\Delta S^4$ of the dot vector p determined for the standard characterizing dot 122. The characterizing dot $123^4$ is restored. On the basis of the areas and positions of the characterizing dot $123^4$ and the standard characterizing dot 122, an area and a position of a dot $124^4$ located between them are determined by an interpolation, on the basis of the element $x^4$ and the element $\Delta S^4$. The area of the dot $124^4$ ranges between the area of the standard characterizing dot 122 and the area of the characterizing dot $123^4$. The dot $124^4$ is restored.

In succession, another characterizing dot and another dot are restored from a different dot vector determined for the characterizing dot $123^1$. Similarly, other characterizing dots and other dots are restored from other dot vectors determined for the other characterizing dot located on the same screen line 121 as the standard characterizing dot 122.

Moreover, the operations identical to the above mentioned operations are performed on all the standard characterizing dots located on other screen lines 121, and other all characterizing dots and dots are restored. The restoration of the image element constituted by the print dots is completed (Step S35). The restored image element is stored as the print dot temporary data 59.

On the other hand, as shown in FIG. 28, the line picture compression data module 56 is restored in accordance with a line picture restoring algorithm to generate a line picture temporary data 60 (Step S24).

Figure 31:
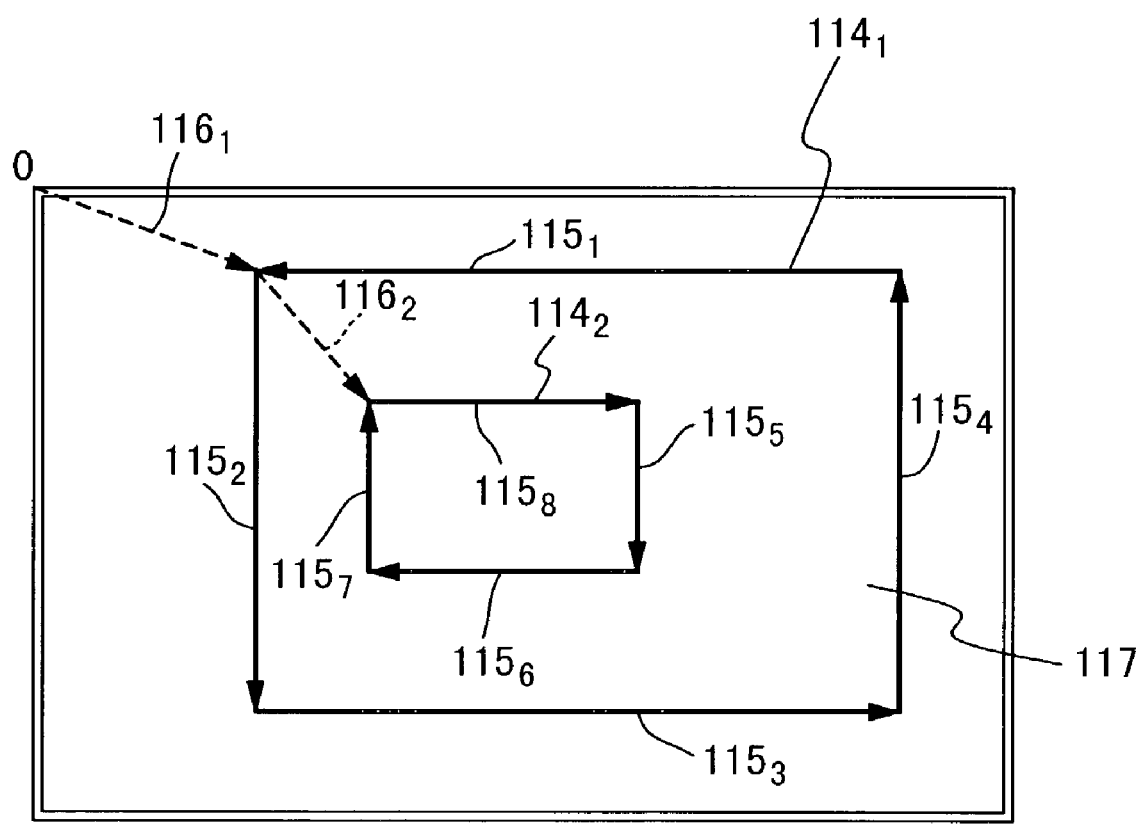
FIG. 31 is a flowchart showing a line picture restoring algorithm.

As mentioned above, the position vector, the outline vector, and the graduation data representative of the graduation of the image element existing between the outline are encoded in the line picture compression data module 56. At first, the outline vectors $115_1$ to $115_8$ and the position vectors $116_1$, $116_2$ are decoded. The outline vectors $115_1$ to $115_8$ are arranged at positions indicated by the position vectors $116_1$, $116_2$, as shown in FIG. 31. The arranged outline vectors $115_1$ to $115_8$ constitute outlines $114_1$, $114_2$.

Moreover, a region 117 between the outlines $114_1$, $114_2$ is embedded with the graduation indicated by the graduation data encoded in the line picture compression data module 56 to complete the restoration of the image element composed of the line pictures. The restored image element is stored as the line picture temporary data 60. At this time, the region 117 between the outlines $114_1$, $114_2$ can be embedded with a different pattern. A special picture process can be achieved by embedding the different pattern in the region 117 between the outlines $114_1$, $114_2$. In this case, data such as music and voice can be inserted into the region 117 as digital watermark.

As shown in FIG. 28, the free micro dot temporary data 58, the print dot temporary data 59 and the line picture temporary data 60 are synthesized to thereby generate a restored image data 61 (Step S25). The restored image data 61 is representative of the image substantially equal to the original page space image data 50.

In the compressing method and the restoring method of the image data in this embodiment, the image on the paper captured by the scanner and the like is classified into the image elements and extracted. Moreover, each of the image elements is compressed and restored in accordance with the algorithm corresponding to it. Thus, the compression ratio is improved, and the deterioration in the picture quality caused by the compression and restoration is suppressed.

Moreover, in the compressing and restoring method of the image data in this embodiment, the dot vector is generated from the dots included in the picture. The redundancy of the dots is effectively utilized to thereby improve the compression ratio.

In this embodiment, it should be noted that the print dots could be extracted by the following process to thereby generate the print dot image element data 52 at the step S02.

At first, the portion corresponding to a set of point regions having an area smaller than a maximum area of a print dot defined by the print rule is extracted from the page space image data 50. As for the point regions, both of the possibility that it is the print dot and the possibility that it is not the print dot should be considered. Next, positions of centers of the point regions are respectively calculated. The calculating method is identical to the method of calculating the positions of the centers of the print dots, in the above mentioned print dot compressing algorithm.

Moreover, it is judged whether or not the screen lines can be determined at an equal interval so as to pass in the vicinities of the centers of the point regions. If the screen lines can be determined, the set of the point regions is judged to be the set of the print dots. The set of the point regions is extracted to thereby generate the print dot image element data 52.

Figure 32:
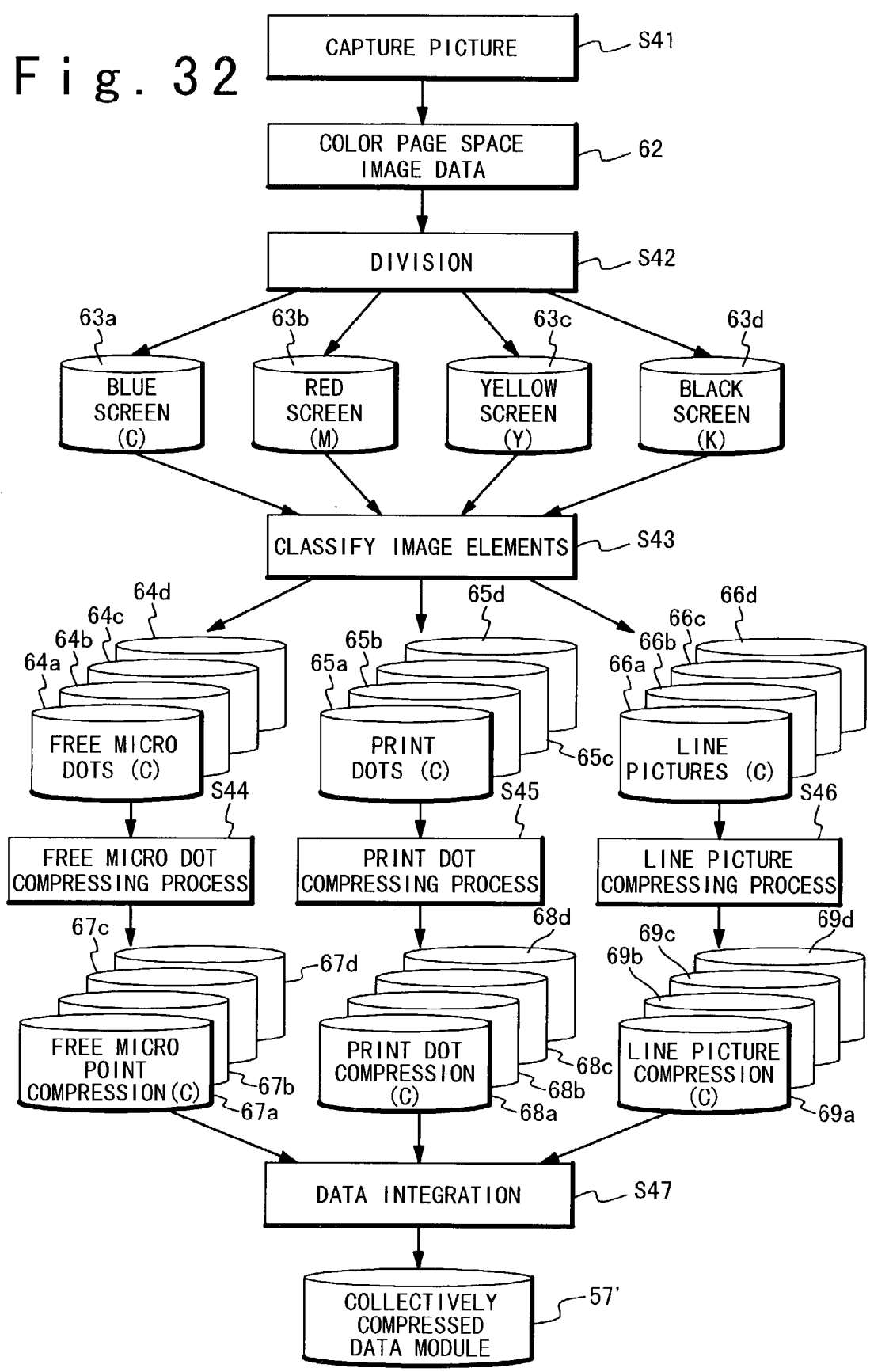
FIG. 32 is a flowchart showing a process for compressing a color page space image data representative of a color picture.

Also, in this embodiment, a color image may be compressed and restored. In this case, as shown in FIG. 32, a page space image data can be component-divided for each color.

In the same way of the compression of the above-mentioned monochrome image, the color image printed on the page space is captured to thereby generate a color page space image data 62 (Step S41).

The color page space image data 62 is component-divided for each color (Step S42). From the color page space image data 62, a component of cyan (C) is extracted to thereby generate a blue component page space image data 63a. A component of magenta (M) is extracted from the color page space image data 62 to thereby generate a red component page space image data 63b. A component of yellow (Y) is extracted from the color page space image data 62 to thereby generate a yellow component page space image data 63c. A component of black (K) is extracted from the color page space image data 62 to thereby generate a black component page space image data 63d. That is, the color page space image data 62 is component-divided into CMYK system.

The image elements are extracted and classified in the same way of the step S02 shown in FIG. 1, for each of the blue component page space image data 63a, the red component page space image data 63b, the yellow component page space image data 63c and the black component page space image data 63d (Step S43). A blue component free micro dot image data 64a, a red component free micro dot image data 64a, a yellow component free micro dot image data 64c and a black component free micro dot image data 64d, each of which is representative of the picture composed of the free micro dots, are respectively generated from the blue page space image data 63a, the red component page space image data 63b, the yellow component page space image data 63c and the black component page space image data 63d, respectively.

Moreover, a blue component print dot image data 65a, a red component print dot image data 65b, a yellow component print dot image data 65c and a black component print dot image data 65d, each of which is representative of the picture composed of the print dots, are respectively generated from the blue component page space image data 63a, the red component page space image data 63b, the yellow component page space image data 63c and the black component page space image data 63d.

Moreover, a blue component line picture image data 66a, a red component line picture image data 66b, a yellow component line picture image data 66c and a black component line picture image data 66d, each of which is representative of the picture composed of the pictures having the strong edges, are respectively generated from the blue component page space image data 63a, the red component page space image data 63b, the yellow component page space image data 63c and the black component page space image data 63d.

The blue component free micro dot image data 64a, the red component free micro dot image data 64b, the yellow component free micro dot image data 64c and the black component free micro dot image data 64d are compressed in accordance with the above mentioned free micro dot pattern compressing algorithm to respectively generate a blue component free micro dot temporary data 67a, a red component free micro dot temporary data 67b, a yellow component free micro dot temporary data 67c and a black component free micro dot temporary data 67d (Step S44).

The blue component print dot image data 65a, the red component print dot image data 65b, the yellow component print dot image data 65c and the black component print dot image data 65d are compressed in accordance with the above mentioned print dot compressing algorithm to respectively generate a blue component print dot temporary data 68a, a red component print dot temporary data 68b, a yellow component print dot temporary data 68c and a black component print dot temporary data 68d (Step S45).

The blue component line picture image data 66a, the red component line picture image data 66b, the yellow component line picture image data 66c and the black component line picture image data 66d are compressed in accordance with the above mentioned line picture compressing algorithm to respectively generate a blue component line picture temporary data 69a, a red component line picture temporary data 69b, a yellow component line picture temporary data 69c and a black component line picture temporary data 69d (Step S46).

The blue component free micro dot temporary data 67a, the red component free micro dot temporary data 67b, the yellow component free micro dot temporary data 67c, the black component free micro dot temporary data 67d, the blue component print dot temporary data 68a, the red component print dot temporary data 68b, the yellow component print dot temporary data 68c, the black component print dot temporary data 68d, the blue component line picture temporary data 69a, the red component line picture temporary data 69b, the yellow component line picture temporary data 69c and the black component line picture temporary data 68d are integrated to thereby generate a collectively compressed data module 57 (Step S47). The compression of the color page space image data 62 is completed.

It should be noted that the color page space image data 62 may be naturally component-divided not only into the CMYK system but also into one of other color systems, for example, an RGB system with a red (R), a green (G) and a black (B) as the three primary colors.

Also, in this embodiment, the calculation of the dot vector is performed on all of the $x^1$-axis, the $x^2$-axis, the $x^3$-axis and the $x^4$-axis. It should be understood that it is not always required to calculate the dot vector p for all of the $x^1$-axis, the $x^2$-axis, the $x^3$-axis and the $x^4$-axis. However, as mentioned in this embodiment, it is desired to calculate the dot vectors for a plurality of axes of the $x^1$-axis, the $x^2$-axis, the $x^3$-axis and the $x^4$-axis, since the compression ratio is improved.

Also, in this embodiment, the image can be enlarged and contracted while the restored image data 61 is generated. In this case, the free micro dot included in the free micro dot temporary data 58 generated by the restoration of the free micro dot compression data module 54 is enlarged at an enlargement rate or contracted at a contraction rate β.

Moreover, an operation for enlarging or contracting the image element is performed on the print dot temporary data 59, as described below.

Figure 33:
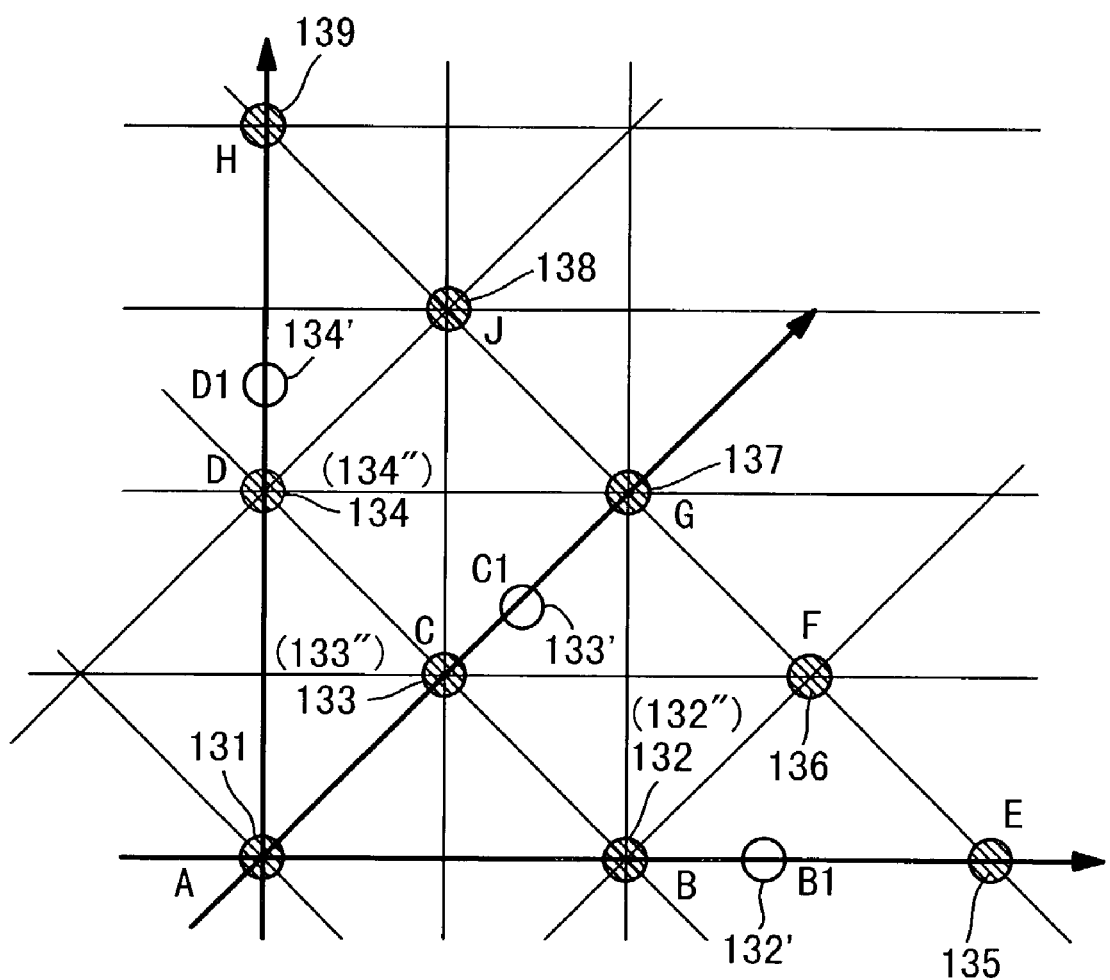
FIG. 33 shows a process in which a picture consists of print dots is simultaneously enlarged while print dot compression data module is restored.

The case of the enlargement of the image element included in the print dot temporary data 59 is described. Let us suppose that the print dot temporary data 59 includes dots 131 to 139, as shown in FIG. 33. Let us suppose that the dots 131 to 139 are located at points A to H, respectively.

Let the image element including the dots 131 to 139 be enlarged at the enlargement rate, the point A being the center of the enlargement. At first, as shown in FIG. 33, the dot 132 is virtually shifted to a point $B_1$ located on a straight line which passes the point A serving as the center of the enlargement and the point B where the dot 132 is located.

In this case, $$=AB_1/AB.$$

The virtually shifted dot 132 is hereafter referred to as a virtual dot 132'. An area of the virtual dot 132' is equal to an area of the dot 132. It should be noted that the virtual dot 132' is the virtually shifted dot and the virtual dot 132' is not placed actually.

Next, a new dot is generated at a point at which a dot is to be located in accordance with the print rule, the point being one of the points located between the virtual dot 132' and the dot 131 adjacent thereto on a side opposite to a direction in which the dot 132 is shifted. The generated new dot is referred to as a dot 132". In the case shown in FIG. 33, a position of the dot 132" coincides with the position of the dot 132. An area of the new dot 132" is determined by the interpolation of the areas of the virtual dot 132' and the dot 131 located on the side opposite to the direction in which the dot 132 is shifted, the dot 131 being one of the dots adjacent to the dot 132. The interpolation is executed with reference to the positions of the dot 131, the virtual dot 132', and the new dot 132".

The data representative of the area of the new dot 132" is recorded in the print dot temporary data 59, on which the operation for enlarging the image element is performed. At this time, the data representative of the area of the virtual dot 132' is discarded.

Other dots are virtually shifted to further generate new dots in the same way. The data representative of the areas of the generated new dots is recorded in the print dot temporary data 59. The dot 133 is virtually shifted to a point $C_1$, and the dot 134 is virtually shifted to a point $D_1$, respectively, and virtual dots 133', 134' are determined.

At this time, $$=AC_1/AC=AD_1/AD.$$

Moreover, new dots 133", 134" are generated at the same positions as the dots 133, 134.

Moreover, the same operation is performed on the other dots to determine the areas of the newly generated dots in turn. The enlargement of the image element is completed by the above mentioned processes.

At this time, the enlargement rate can be partially changed. This enables to generate the modified image element.

Figure 34:
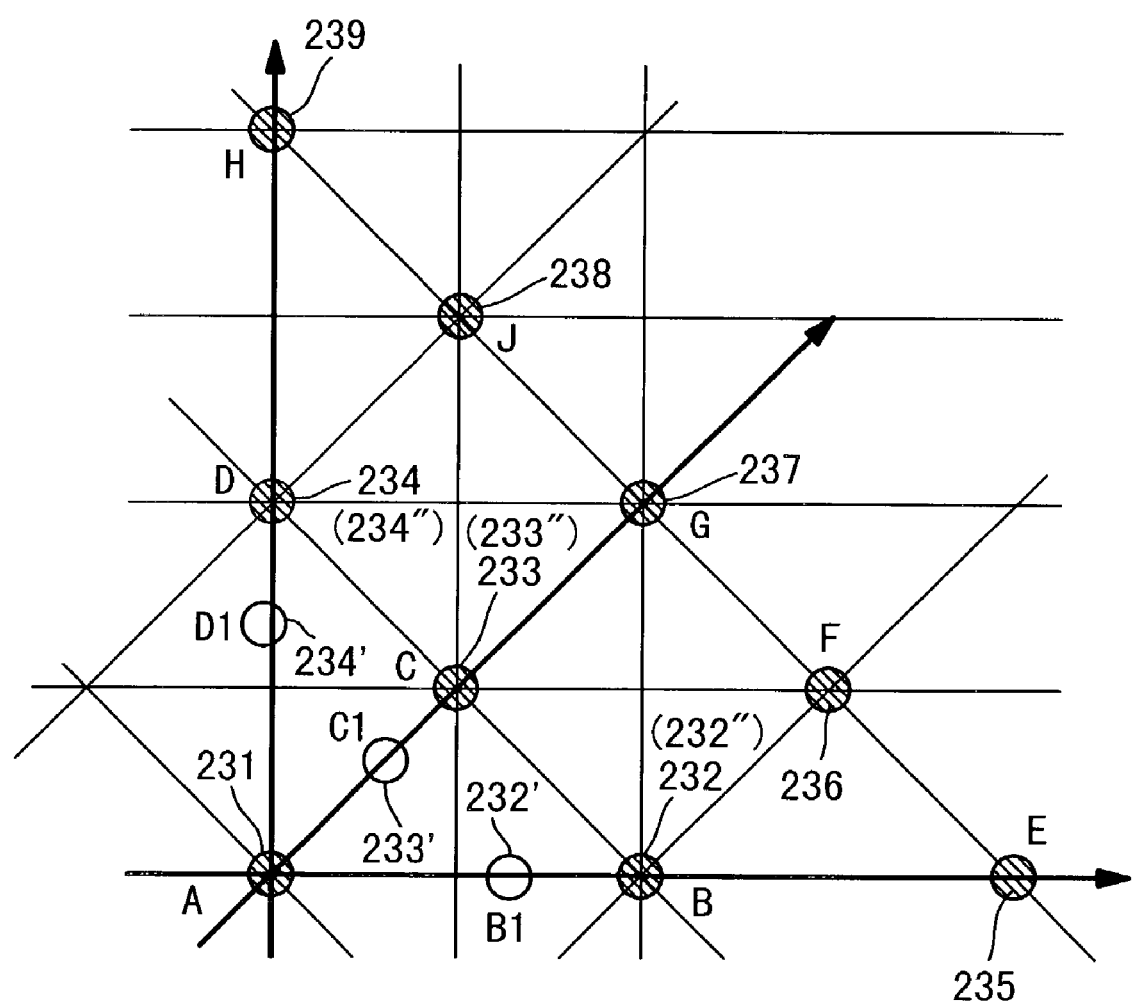
FIG. 34 shows process in which a picture consists of print dots is simultaneously contracted while print dot compression data module is restored.

Next, the case of the contraction of the image element included in the print dot temporary data 59 is described. Let us consider the case that the print dot temporary data 59 includes dots 231 to 239, as shown in FIG. 34. Let the dots 231 to 239 be located at points A to H, respectively.

Let the image element include the dots 231 to 239 to be contracted at the contraction rate β with the point A used as a center of contraction. At first, as shown in FIG. 34, the dot 232 is virtually shifted to a point $B_1$ located on a straight line which passes the point A serving as the center of the contraction and the point B where the dot 232 is located, and the shift generates a virtual dot 232'.

At this time, $$\beta=AB_1/AB.$$

Also, an area of the virtual dot 232' is equal to an area of the dot 232.

A new dot is generated at a point at which a dot is to be located in accordance with the print rule, the point being one of the points located between the virtual dot 232' and the dot 235 adjacent thereto on a side opposite to a direction in which the dot 232 is shifted. The generated new dot is referred to as a dot 232". In the case shown in FIG. 34, a position of the dot 232" coincides with the position of the dot 232. An area of the new dot 232" is determined by the interpolation between the areas of the virtual dot 232' and the dot 235 adjacent to the side opposite to the direction in which the dot 232 is shifted. The interpolation is executed with reference t the positions of the dot 235, the virtual dot 232', and the new dot 232".

The data representative of the area of the new dot 232" is recorded in the print dot temporary data 59, on which the operation for contracting the image element is performed. At this time, the data representative of the area of the virtual dot 232' is discarded.

Other dots are virtually shifted to further generate new dots in the same way. The data representative of the areas of the generated new dots is recorded in the print dot temporary data 59. The dot 233 is virtually shifted to a point $C_1$, and the dot 234 is virtually shifted to a point $D_1$, respectively, and virtual dots 233', 234' are determined.

At this time, $$\beta=AC_1/AC=AD_1/AD.$$

Moreover, new dots 233", 234" are generated at the same positions as the dots 233, 234.

Moreover, the same operation is performed on the other dots, and the areas of the newly generated dots are determined in turn. The contraction of the image element is completed by the above mentioned processes.

In this case, the contraction rate β can be partially changed. This enables to generate the modified image element.

Also, another modified restoration can be achieved by adding various operating functions to the print dot restoring algorithm besides the enlargement and the contraction functions.

Moreover, the operation for enlarging or contracting the image element as described below is performed on the line picture temporary data 60.

Figure 35:
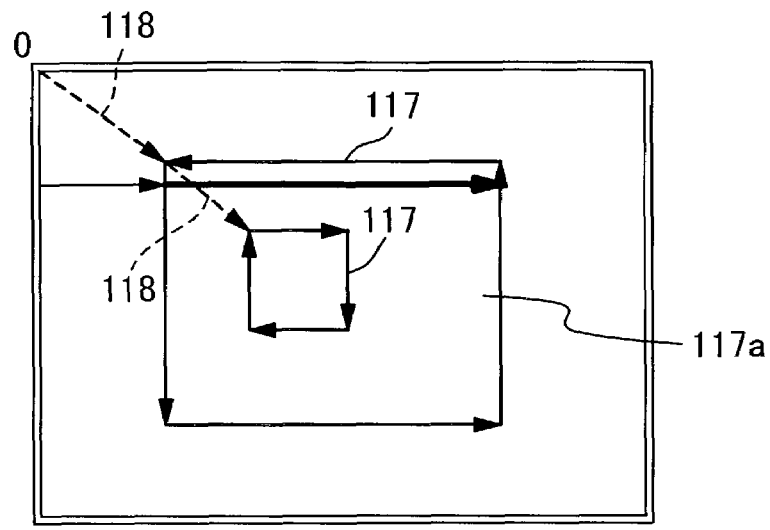
FIG. 35 shows a process in which a restored picture is simultaneously contracted while a line picture compression data module 56 is restored.

In the case of the contraction of the image element, as shown in FIG. 35, the outline vector and the position vector included in the line picture temporary data 60 are multiplied by the contraction rate β to thereby generate an outline vector 117 and a position vector 118. The graduation indicated by the graduation data included in the line picture temporary data 60 is embedded in a region 117a on a left side in a direction in which the outline vector 117 is oriented, and this achieves restoration of the contracted image element.

Figure 36:
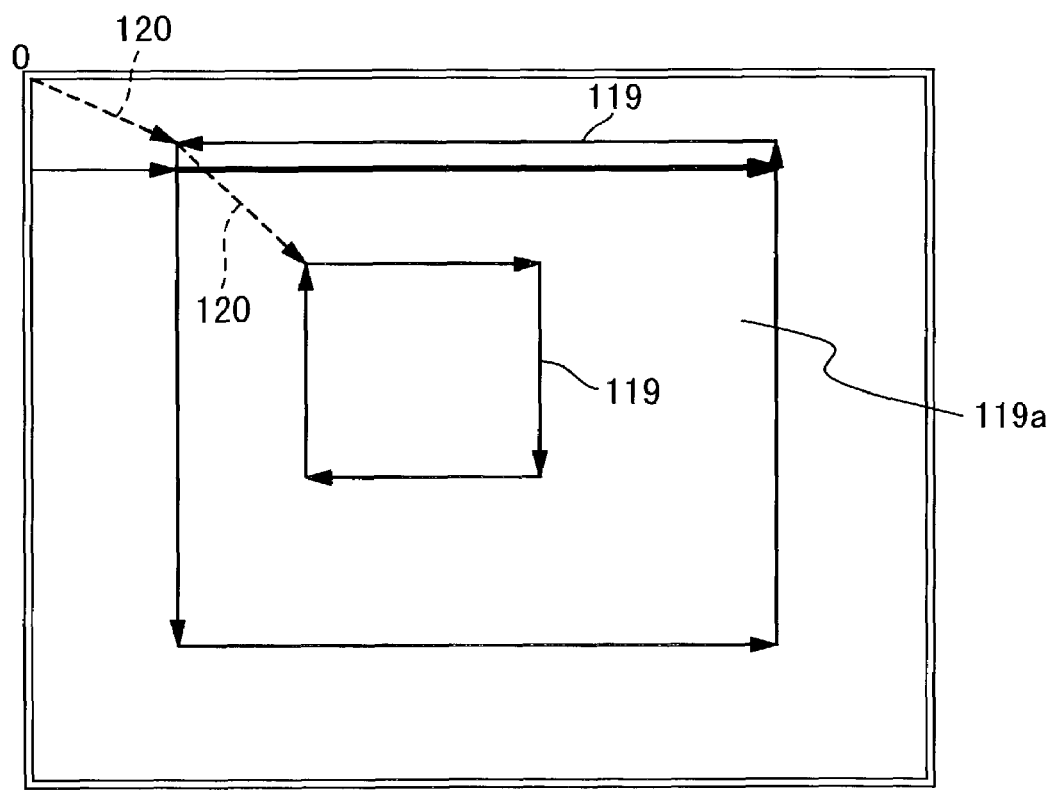
FIG. 36 shows a process in which a restored picture is simultaneously enlarged while the line picture compression data module 56 is restored.

Similarly, in the case of the enlargement of the image element, as shown in FIG. 36, the outline vector and the position vector included in the line picture temporary data 60 are multiplied by the enlargement rate to thereby generate an outline vector 119 and a position vector 120. The graduation indicated by the graduation data included in the line picture temporary data 60 is embedded in a region 119a on a left side in a direction in which the outline vector 119 is oriented, and this achieves restoration of the enlarged image element.

Also, in the embodiment of the present invention, the position information stored in the compression data can be used to restore the image element with the image element rotated.

Also, as mentioned above, in this embodiment, the free micro dot pattern compressing algorithm is used to compress the free micro dot image element data 51. In this embodiment, instead of the free micro dot pattern compressing algorithm, a free micro dot vector compressing algorithm as described below may be used to generate the free micro dot compression data module 54.

Figure 37:
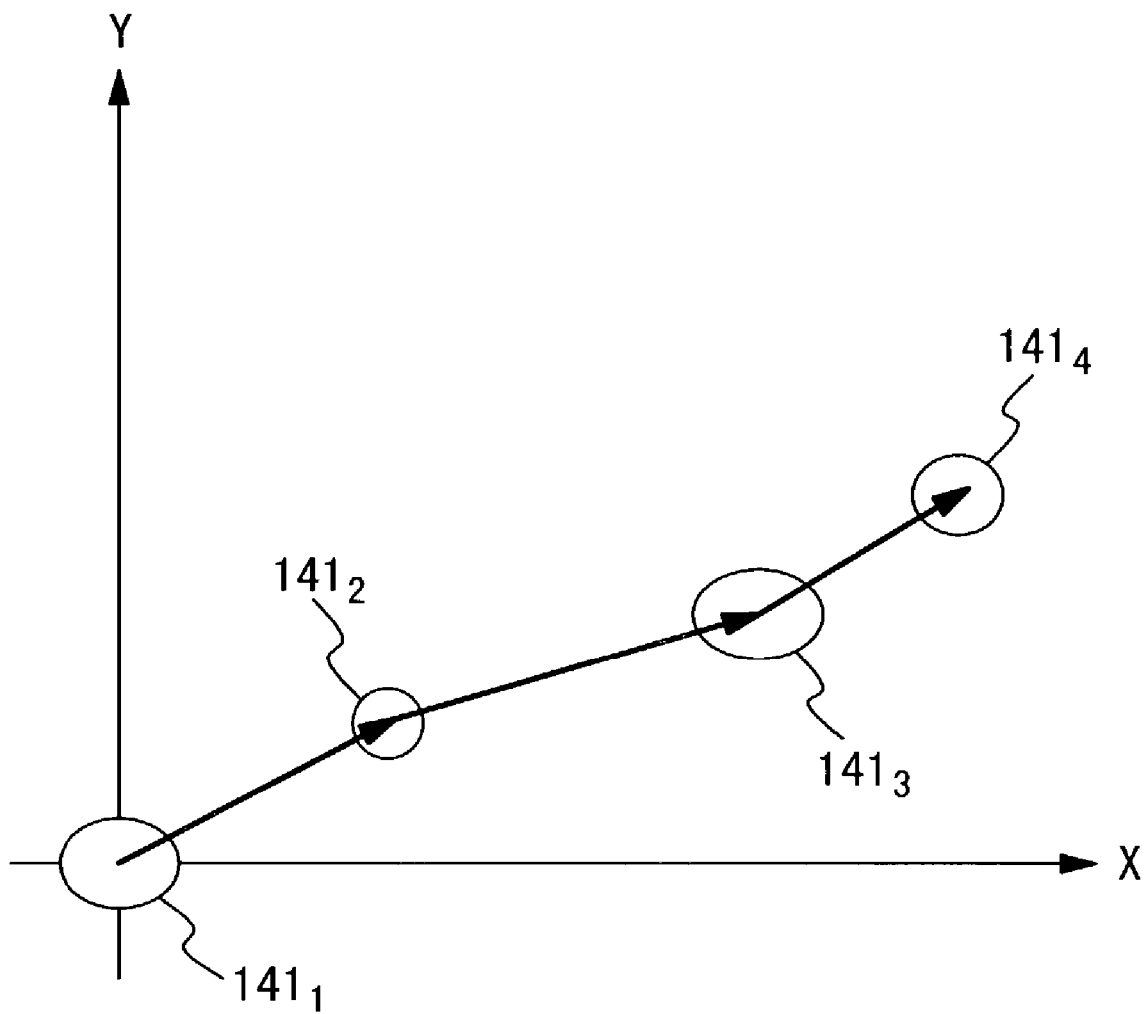
FIG. 37 shows a free micro dot vector compressing algorithm.

Let us consider the case of the compression of free micro dots $141_1$ to $141_4$ shown in FIG. 37. At first, positions of centers of the free micro dots $141_1$ to $141_4$ are determined in the same way as the above mentioned process for determining the positions of the centers of the print dots. The positions of the free micro dots $141_1$ to $141_4$ are represented by the positions of their centers. Hereafter, the positions of the free micro dots $141_1$ to $141_4$ imply the positions of the centers of the free micro dots $141_1$ to $141_4$.

Let a coordinate of the position of the free micro dot $141_i$ among the free micro dots $141_1$ to $141_4$ be $(x_i, y_i)$. Moreover, Let an area of the free micro dot $141_i$ be Si.

Free micro dot vectors $r_1$ to $r_3$ are determined as follows. At first, the free micro dot $141_1$ is selected. The position and the area of the free micro dot $141_1$ are added to the free micro dot compression data module 54. The free micro dot vector $r_1$ is the vector having as the elements thereof a relative position between the free micro dot $141_1$ and the free micro dot $141_2$ and the deference in the area between the free micro dot $141_1$ and the free micro dot $141_2$. That is, $r_1=(x_2-x_1, y_2-y_1, S_2-S_1)$ Similarly, the free micro dot vector $r_2$ is the vector having as the elements thereof a relative position between the free micro dot $141_2$ and the free micro dot $141_3$ and the difference in the area between the free micro dot $141_2$ and the free micro dot $141_3$. That is, $r_2=(x_3-x_2, y_3-y_2, S_3-S_2)$.

Similarly, the free micro dot vector $r_3$ is given by:

$r_3=(x_4-x_3, y_4-y_3, S_4-S_3)$.

The free micro dot vectors $r_1$ to $r_3$ are encoded to thereby generate the free micro dot compression data module 54.

Moreover, in this embodiment, the free micro dot image element data 51 maybe compressed to generate the free micro dot compression data module 54 in accordance with a free micro dot data compressing algorithm, instead of the above mentioned free micro dot pattern compressing algorithm, the free micro dot data compressing algorithm being described below with reference to FIG. 45.

In the free micro dot data compressing algorithm, a region 210 including a free micro dot 212 is divided into rectangular regions 211. Two sides of the rectangular region 211 are oriented to the x-axis direction, and the other two sides are oriented to the y-axis direction. Compression data is generated for each of the rectangular regions 211.

The method of generating a compression data is described by exemplifying the generation of a compression data for a rectangular region 211*a* of the rectangular regions 211. At first, the positions where free micro dots 212*a* to 212*c* included in the rectangular region 211*a* targeted for the generation of the compression data exist are recognized. Moreover, the distances between the existence positions of the free micro dots 212*a* to 212*c* and one side out of four sides of the rectangular region 211*a* are calculated.

Figure 45:
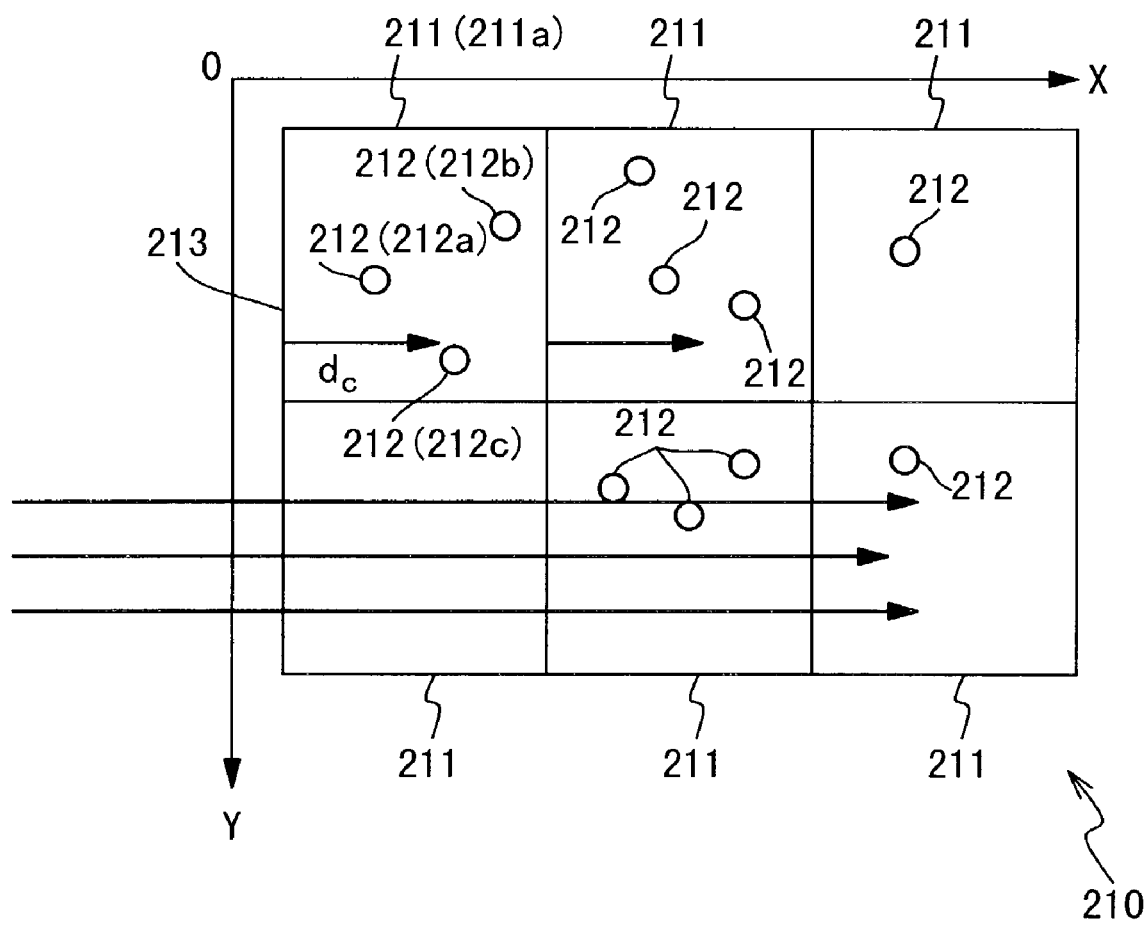
FIG. 45 is a view describing a free micro dot data compressing algorithm.

In this embodiment, as illustrated in FIG. 45, distances $d_a$, $d_b$ and $d_c$ between a side 213 extending in the y-axis direction and the positions of the free micro dots 212*a* to 212*c* are respectively calculated. The distances $d_a$, $d_b$ and $d_c$ are given by:

$d_a=x_a-x_0$, $d_b=x_b-x_0$, and $d_c=x_c-x_0$, where $x_0$ is an x-coordinate of the side 213, and $x_a$, $x_b$ and $x_c$ are x coordinates of the positions of the free micro dots 212*a* to 212*c*, respectively. The calculated distances function as members of the compression data generated for the rectangular region 211*a*. At this time, a distance from a side extending in the x-axis direction can be also calculated.

Moreover, an average of concentrations of the regions inside the rectangular region 211*a* is calculated. The average corresponds to a sum of the areas of the free micro dots 212*a* to 212*c* in a one-to-one relationship. As described later, the average of the concentrations of the regions inside the rectangular region 211*a* is used to restore the areas of the free micro dots 212*a* to 212*c*. The average functions as another member of the compression data generated for the rectangular region 211*a*. The generation of the compression data for the rectangular region 211*a* is completed as mentioned above.

The compression data is also generated for other rectangular regions 211 in the same way. The generated compression data are integrated to thereby generate the free micro dot compression data module 54.

The free micro dot compression data module 54 generated as mentioned above is restored as described below. At first, the compression data generated for the respective rectangular regions 211 are read out from the free micro dot compression data module 54. As described above, the compression data include the distances between the free micro dots included in the respective rectangular regions 211 and the sides of the rectangular regions. Moreover, they include the averages of the concentrations of the regions inside the respective rectangular regions.

The distances between the free micro dots included in the respective rectangular regions 211 and the sides of the rectangular regions are recognized from the compression data. The positions of the free micro dots are restored on the basis of the distances.

Moreover, the averages of the concentrations of the regions inside the respective rectangular regions 211 are recognized from the compression data. As mentioned above, the areas of the free micro dots included in the respective rectangular regions 211 are determined on the basis of the averages. At this time, it is defined that the free micro dots included in the respective rectangular regions 211 have the same area. The free micro dots included in the respective rectangular regions 211 are restored. The free micro dot temporary data 58 is restored from the free micro dot compression data module 54 by the above mentioned processes.

Also, in this embodiment, the following operation may be performed on the image element included in the page space image data 50 before the image element on which the operation is performed is compressed. Moreover, the following operation may be executed while the free micro dot temporary data 58, the print dot temporary data 59 and the line picture temporary data 60 are synthesized.

When all the image elements included in the free micro dot temporary data 58, the print dot temporary data 59 and the line picture temporary data 60 are restored, an OR operation is carried out. For example, let us suppose that image elements A, B, C and D are included in the free micro dot temporary data 58, the print dot temporary data 59 and the line picture temporary data 60. While all of them are restored, an OR thereof is generated to be a restoration image element 61. It holds

X=A OR B OR C OR D, where X is the restoration image element 61.

Also, when all the image elements included in the page space image data 50 is compressed, an OR operation is carried out. For example, let us suppose that the image elements A, B, C and D are included in the page space image data 50. While all of them are compressed, an OR thereof is used as image data to be compressed. It holds

X'=A OR B OR C OR D, where X' is the image data to be compressed.

When only the common portion of the image elements included in the free micro dot temporary data 58, the print dot temporary data 59 and the line picture temporary data 60 is restored, an AND operation is carried out. Let us suppose that the image elements A, B, C and D are included in the free micro dot temporary data 58, the print dot temporary data 59 and the line picture temporary data 60. If the common portion of the image elements A, B is restored as the restoration image data 61, it holds $$X = A \text{ AND } B,$$

where X is the restoration image data 61.

Also, when only the common portion of the image elements included in the page space image data 50 is compressed, an AND operation is carried out. For example, let us suppose that the image elements A, B, C and D are included in the page space image data 50. When the common portion of the image elements A, B is compressed, a logical product of the image elements A, B is used as image data to be compressed. It holds $$X' = A \text{ AND } B,$$

where X' is the image data to be compressed.

For the restoration of a portion besides a plurality of image elements, the portion selected from among the image elements included in the free micro dot temporary data 58 and the print dot temporary data 59 and the line picture temporary data 60, an NOR operation is carried out. For example, let us suppose that the image elements A, C are included in the free micro dot temporary data 58, the print dot temporary data 59 and the line picture temporary data 60. If the image element except the image element A and the image element C is restored, it holds $$X = A \text{ NOR } C,$$

where X is the restoration image data 61.

For the compression of a portion besides a plurality of image elements, the portion being selected from among the image elements included in the page space image data 50, an NOR operation is carried out. For example, let us suppose that the image elements A, C are included in the page space image data 50. When the image element except the image element A and the image element C is compressed, it holds $$X' = A \text{ NOR } C,$$

where X' is the image data to be compressed.

Also, when a portion besides a common portion in the plurality of image elements is restored, the portion being selected from among the image elements included in the free micro dot temporary data 58, the print dot temporary data 59 and the line picture temporary data 60, an NAND operation is carried out. That is, for example, let us suppose that the image elements A, C are included in the free micro dot temporary data 58, the print dot temporary data 59 and the line picture temporary data 60. When all the portions except the common portions of the image element A and the image element C are restored, it holds $$X = A \text{ NAND } C,$$

where X is the restoration image data 61.

Also, when a portion except a common portion of the plurality of image elements is compressed, the portion being selected from among the image elements included in the page space image data 50, a NAND operation is carried out. For example, let us suppose that the image elements A, C are included in the page space image data 50. When all the portions except the common portion in the image element A and the image element C are compressed, it holds, $$X' = A \text{ NAND } C,$$

where X' is the image data to be compressed.

Also, the image elements included in the free micro dot temporary data 58, the print dot temporary data 59 and the line picture temporary data 60 may be restored using the operation of an exclusive-OR. Let us suppose that the image elements A, C are included in the free micro dot temporary data 58, the print dot temporary data 59 and the line picture temporary data 60. It may be defied that $$X = A \text{ XOR } C,$$

where X is the restoration image data 61.

Also, the image elements included in the page space image data 50 can be compressed after carrying out the exclusive-OR. Let us suppose that the image elements A, C are included in the page space image data 50. It may be defined that $$X' = A \text{ XOR } C,$$

where X' is the image data to be compressed.

Also, let us suppose that the image element A and the image element B are included in the free micro dot temporary data 58, the print dot temporary data 59 and the line picture temporary data 60. Here, let the image element B superimpose on the image element A. In this case, Restoring the image element A with a transmission process enables the image element A to be visible in the portion where the image elements A, B superimposes with each other. Also, restoring the image element A through a non-transmission process enables only the image element B to be visible in the portion where the image elements A, B superimpose with each other.

The selection of the image element to be compressed from the image elements included in the page space image data 50 may be done on the basis of a name given to each image element, a size of an image of each image element, a shape of an image of each image element, a color of an image of each image element and an image data amount of each image element. In the same way, the selection of the image element to be compressed from the image elements in the free micro dot temporary data 58, the print dot temporary data 59 and the line picture temporary data 60 can be done on the basis of a name given to each image element, a size of an image of each image element, a shape of an image of each image element, a color of an image of each image element and an image data amount of each image element.

The above mentioned selection and operation processes enables to extract and restore the necessary image elements and the feature image elements from the page space image. For example, performing the compressing process on only a photograph, only a sentence and only a table from the page space is effective for a filing and database establishment. Also, restoration of particular image elements is effective for the reduction in the information processing amount when a large number of image elements are distributed and read through the Internet.

In this embodiment, as mentioned above, the page space image data 50 is generated from the image 30 located on the page space, and the page space image data 50 is compressed and restored. In this embodiment, another image data that is not generated from the page space may be compressed and restored instead of the page space image data 50.

Also, in this embodiment, the image element data may be classified and extracted in accordance with another standard, at the step S02. For example, the classification and extraction may be executed on the basis of the component element. This enables to classify and extract types, handwritten characters, seals, line pictures, graphics, tints, graduation nets and photograph nets. Also, the classification and extraction may be executed on the basis of kinds of image. This enables to classify and extract documents, comics, maps, advertisements, tables sample and photographs.

SECOND EMBODIMENT

A compressing and restoring method of image data in the second embodiment classifies pictures included in the image data into a region in which a graduation is continuously changed and a region in which a graduation is not substantially changed, and then compresses and restores the image data. The compressing and restoring method of image data in the second embodiment will be described below.

Figure 38:
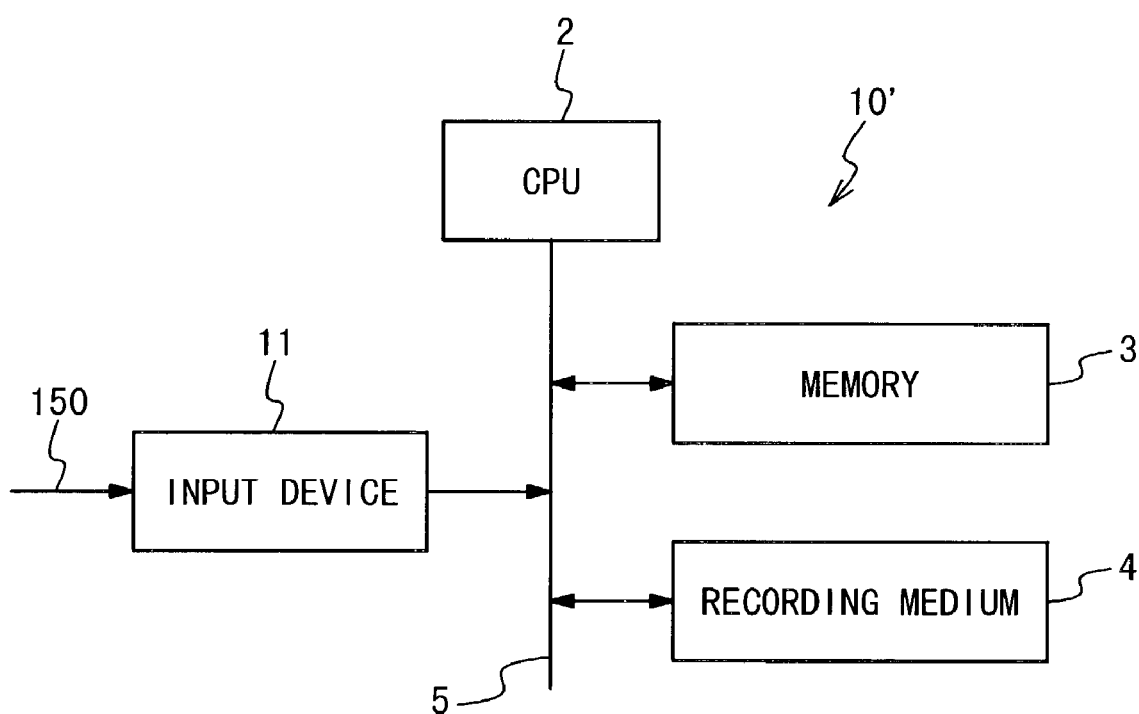
FIG. 38 shows a hardware resource 10' in which an image data compressing method of a second embodiment is carried out.

The compressing and restoring method of image data of the second embodiment is executed with a hardware resource. That hardware resource 10 includes an input device 11, a CPU 2, a memory 3, a recording medium 4 and a bus 5, as shown in FIG. 38. The input device 11, the CPU 2, the memory 3 and the recording medium 4 are connected to the bus 5. An image data 150 is inputted to the input device 11. The CPU 2 carries out an operation for compressing or restoring the image data 150. The memory 3 stores the data generated in the process for carrying out the compressing method and the restoring method of the image data in the second embodiment. The recording medium 4 stores the program for describing the procedures included in the compressing method and the restoring method in the image data of the second embodiment. The CPU 2 is operated in accordance with the program. The bus 5 transmits the data to be exchanged between the input device 11, the CPU 2, the memory 3 and the recording medium 4.

Figure 39:
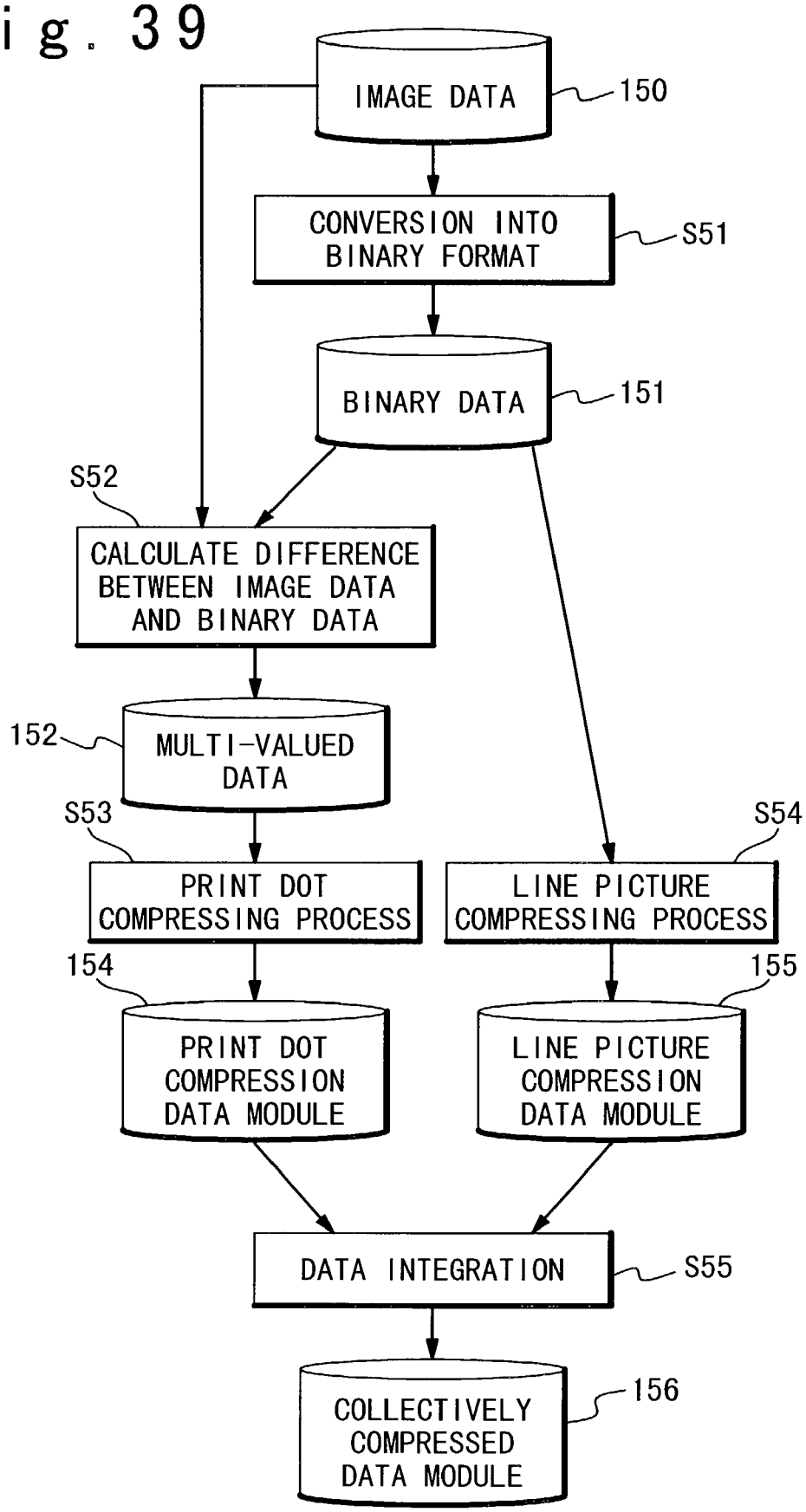
FIG. 39 is a flowchart showing the image data compressing method of the second embodiment.

FIG. 39 shows the image data compressing method in the second embodiment. At first, the image data 150 is inputted to the input device 11. A picture represented by the image data 150 includes a region in which the graduation is continuously changed and a region in which the graduation is not substantially changed. Image elements that are composed of dots are placed in the region in which the graduation is continuously changed. Image elements that are not composed of the dots are placed in the region in which the graduation is not substantially changed.

The image data 150 is converted in a binary format to generate a binary data 151 (Step S51). Moreover, the difference between the image data 150 and the binary data 151 is calculated to thereby generate a multi-valued data 152 (Step S52).

The image data 150 is divided into the binary data 151 and the multi-valued data 152. The region in which the graduation is not substantially changed is extracted from the image data 150 as the binary data 151. A portion corresponding to the region in which the graduation is continuously changed is extracted from the image data 150 as the multi-valued data 152. The image elements composed of the dots as mentioned above are placed in the region in which the graduation is continuously changed. The multi-valued data 152 is constituted by the data indicative of the dots.

The multi-valued data 152 is compressed in accordance with the print dot compressing algorithm explained in the first embodiment to generate print dot compression data module 154 (Step S53). Moreover, the binary data 151 is compressed in accordance with the line picture compressing algorithm explained in the first embodiment to generate a line picture compression data module 155 (Step S54).

The print dot compression data module 154 and the line picture compression data module 155 are integrated to thereby generate a collectively compressed data module 156 (Step S55). The compression of the image data 150 is completed by the above mentioned processes. The collectively compressed data module 156 may be recorded on the recording medium for the use thereof.

The process for restoring the collectively compressed data module 156 will be described below.

Figure 40:
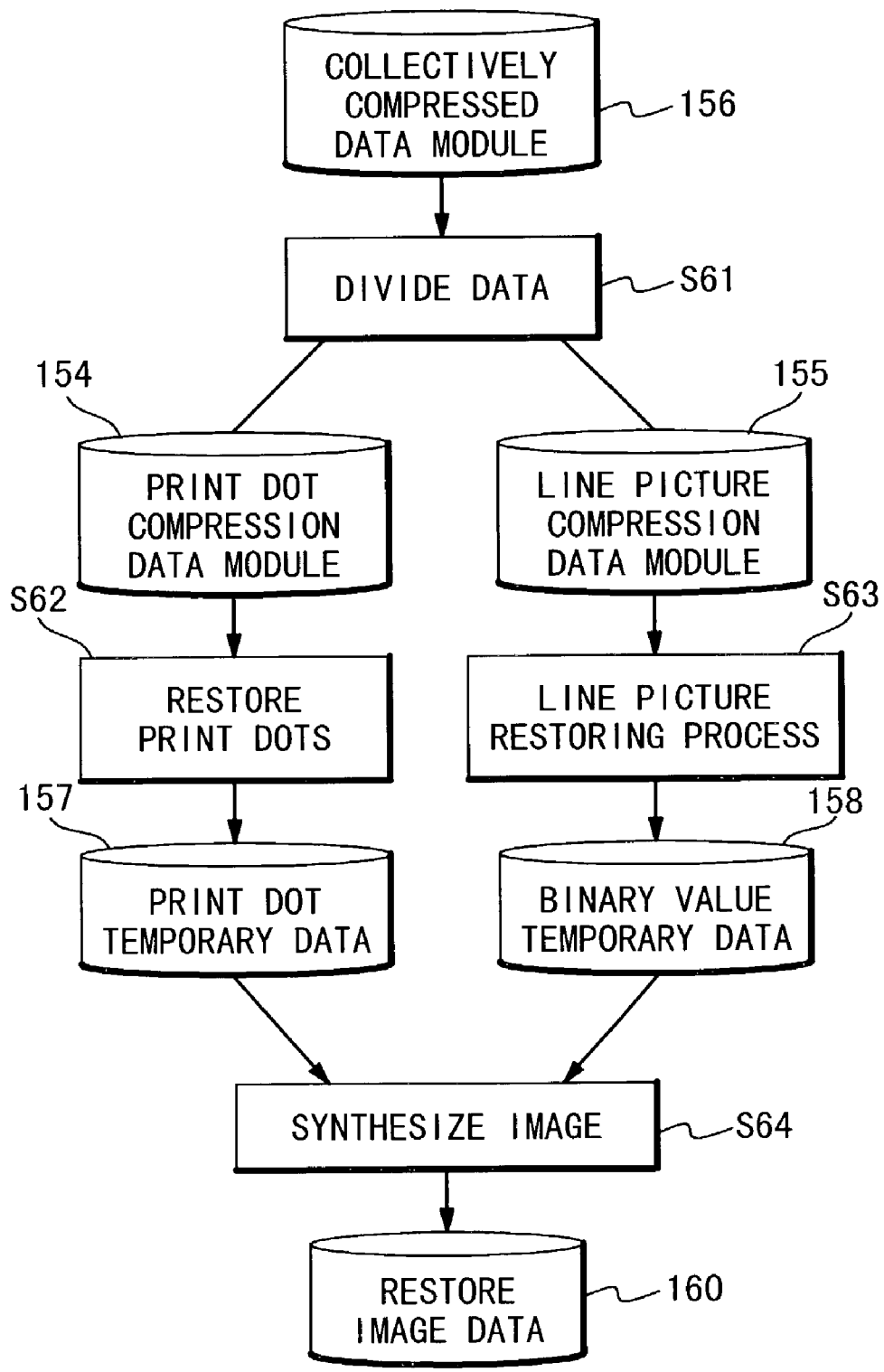
FIG. 40 is a flowchart showing an image data restoring method of the second embodiment.
Figure 41:
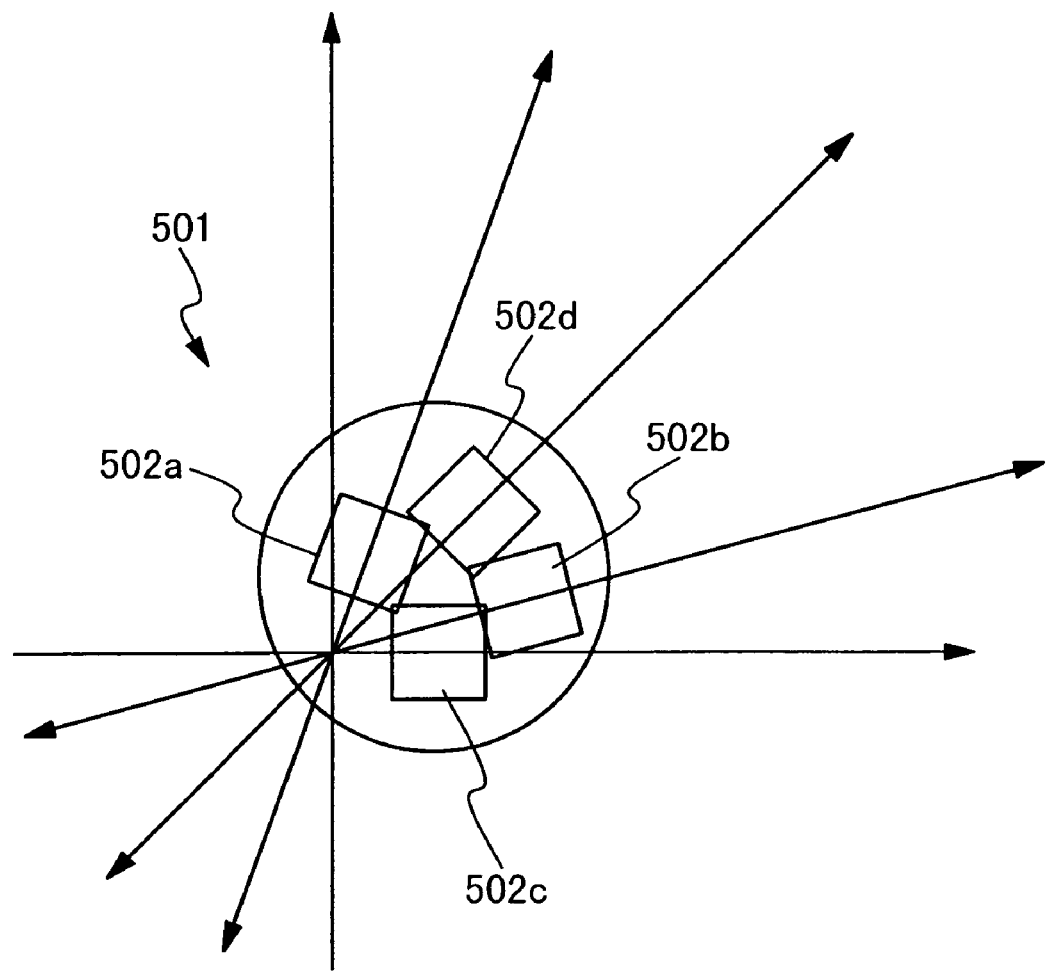
FIG. 41 shows a structure of a pixel 501.
Figure 42A:
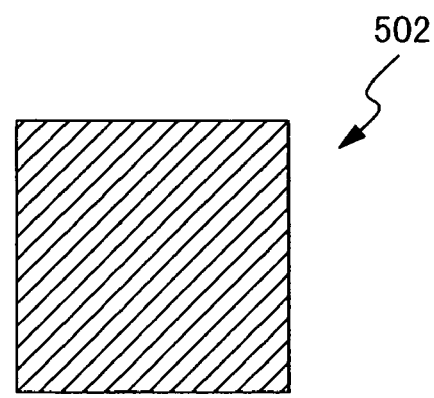
FIGS. 42A and 42B show structures of a dot 502.
Figure 42B:
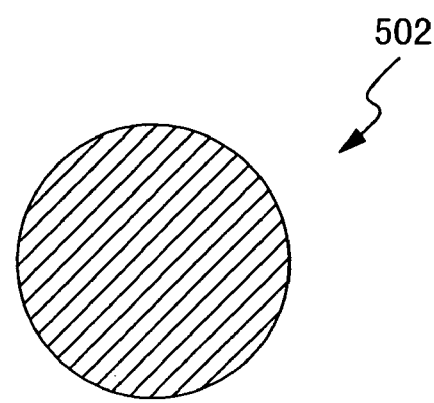
Figure 43:
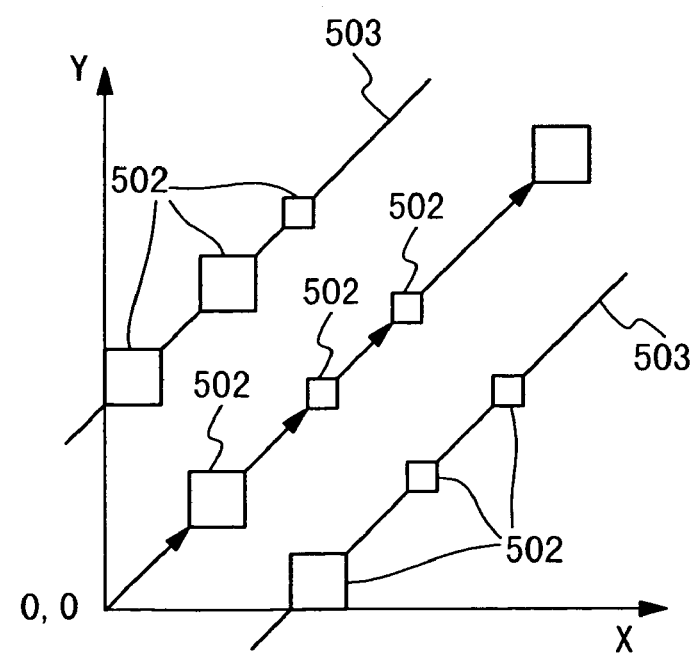
FIG. 43 shows a picture composed of dots.

As shown in FIG. 40, the collectively compressed data module 156 is divided to restore the print dot compression data module 154 and the line picture compression data module 155 (Step S61).

The print dot compression data module 154 is restored in accordance with the print dot restoring algorithm explained in the first embodiment to generate a print dot temporary data 157 is generated (Step S62). The picture composed of the dots is restored in the print dot temporary data 157.

Moreover, the line picture compression data module 155 is restored in accordance with the line picture restoring algorithm explained in the first embodiment to generate a line picture temporary data 158 (Step S63).

Moreover, the print dot temporary data 157 and the line picture temporary data 158 are image-synthesized to thereby generate a restoration dot data 160 (Step S64).

The compressing and restoring method of the image in the second embodiment are modified as described below to be applied to the case that the image data 150 does not have any print dot.

At first, the image data 150 is converted into the binary format in the same way as the compressing and restoring algorithm of the image in the second embodiment, (Step S51). Moreover, the difference between the image data 150 and the binary data 151 is calculated to thereby generate the multi-valued data 152. At this time, the print dot is not included in the picture indicated by the multi-valued data 152.

In this case, after the dots are generated from the picture indicated by the multi-valued data 152, the multi-valued data 152 is compressed in accordance with the print dot compressing algorithm. At first, the graduation at each position of the picture represented by the multi-valued data 152 is calculated. Moreover, at each position of the picture, a dot having an area proportional to the graduation at the position is generated. On the basis of the positions and the areas of the dots, the multi-valued data 152 is compressed in accordance with the print dot compressing algorithm to generate the print dot compression data module 154. Moreover, it is integrated with the line picture compression data module 155 to generate the collectively compressed data module 156.

When the thus-generated collectively compressed data module 156 is restored, the picture represented by the restored restoration image data 160 includes the dots that are not included in the picture represented by the original image data 150.

In this case, the print dot temporary data 157 may be synthesized with the binary temporary data 158 after conversion of the print dot temporary data 157 representative of the picture composed of the dots into the picture temporary data that is not the picture composed of the dots. The picture temporary data is generated as follows. At first, the positions and areas included in the print dot temporary data 157 is recognized. The picture in which a region near the positions where the dots exist is smeared at the graduation corresponding to the area of the dots is generated. The data representative of the picture is generated as the picture temporary data.

The original picture, which includes no dot, is approximately restored in the restoration image data 160 generated from the binary temporary data 158 and the thus-generated picture temporary data.

The restoration of the restoration image data 160 so as not to include the dots is effective for the case that the occurrence of the moiré is desired to be protected.

In the compressing and restoring method of the image data in this embodiment, the image data is classified into the image element in the same way as the first embodiment. Moreover, each image element is compressed and restored in accordance with the algorithm corresponding to it. This enables to improve the compression rate and to suppress of the deterioration in the picture quality caused by the compression and restoration.

Moreover, in the compressing and restoring method of the image data in this embodiment, the dots are generated from the picture including no dots. Then, the dot vectors are generated from the dots. The redundancy of the dots is effectively utilized. This enables to improve the compression rate.

It should be note that the color image may be compressed and restored by the compressing and restoring method of the image data in this embodiment in the same way as the first embodiment. In this case, the color image data representative of the color image is divided to thereby generate the divided image data for each color in the same way as the first embodiment. The compression and restoration are performed on each of the divided image data by the same method as the compression and restoring method of the image data in this embodiment.

EFFECT OF THE INVENTION

The present invention provides the compression and restoring method of the image data, in which the deterioration in the picture quality caused by the compression and the restoration is suppressed.

Also, the present invention provides the compression and restoring method of the image data, in which the compression rate is large.

Also, the present invention provides the compression and restoring method of the image data, in which the compression rate is large and the deterioration in the picture quality caused by the compression of the image data is suppressed.

Also, the present invention provides the compression and restoring method of the image data, in which the image data generated from the printed matter composed of the dots is effectively compressed and restored.

Also, the present invention provides the compressing method of the image data, in which the image data is compressed at a high speed.

Also, the present invention provides the compressing method of the image data, in which the image data indicative of the picture whose edge is emphasized is compressed at a high speed.

Also, the present invention provides the compression and restoring method of the image data, which effectively compresses and restores the image data generated from the printed matter composed of the micro points having the small areas, which do not have the arrangement defined by the print rule.

INDUSTRIAL APPLICABILITY

The present invention relates to a compressing method and a restoring method of an image data.

The invention claimed is:

1. An image data compressing method comprising:
obtaining image data representative of a picture including dots;
calculating the areas of said dots;
calculating the positions of said dots; and
generating compression data based on said areas and said positions, wherein
said dots include a first dot and a second dot,
said areas include a first area of said first dot and a second area of said second dot, and
said compression data is generated based on an area difference between said first area and said second area.

2. An image data compressing method according to claim 1, wherein
said positions include a first position of said first dot and a second position of said second dot, and
said compression data is generated based on a distance between said first position and said second position.

3. An image data compressing method according to claim 2, wherein said obtaining includes:
obtaining more image data representative of another picture; and
generating dots based on graduations of said another picture to generate said image data.

4. The image data compressing method according to claim 1, wherein
said dots further include a third dot located off a straight line on which said first dot and second dot are located,
said areas further include a third area of said third dot, and
said compression data is generated based on another area difference between said first area and said third area.

5. The image data compressing method according to claim 1, wherein calculating the areas of said dots comprises:
extracting an outline of a dot indicated by the image data;
determining curvature points on the extracted outline of the dot;
determining a vector connecting two adjacent curvature points;
determining a square circumscribed about a polygon having the curvature points as vertexes; and
subtracting an area located inside the square and outside the polygon from an area of the square.

6. The image data compressing method according to claim 1, wherein calculating the positions of said dots comprises:
determining a square circumscribed around a dot;
determining an intersection of diagonals of the square as the position of the dot.

7. An image data processing method comprising:
obtaining image data representative of a picture including first and second dots having an arrangement in accordance with a print rule;
shifting said second dot to define a virtual dot, wherein a virtual dot position of said virtual dot is located on a straight line which passes said first dot and said second dot, said virtual dot is located in a first direction orienting to said second dot from said first dot with respect to said second dot, and a virtual dot area of said virtual dot is equal to a second dot area of said second dot;
generating a third dot located between said first dot and said virtual dot on said straight line, wherein a third dot position of said third dot is determined so as to comply with said print rule, and a third dot area of said third dot is determined by an interpolation from said virtual dot position of said virtual dot, a dot position of said first dot, said third dot position, a first dot area of said first dot, and said virtual dot area; and erasing said virtual dot.

8. An image data restoring method comprising:

obtaining compression data including area difference data representative of the difference in the area between a first dot and a second dot, and distance data representative of a distance between said first dot and said second dot; and restoring image data containing said first dot and said second dot based on said area difference data and said distance data.

9. An image data restoring method according to claim 8, wherein said image data are restored so as to further include a third dot located between said first dot and said second dot; and an area of said third dot is determined on the basis of said area difference data.

10. A computer-readable recording medium encoded with a computer program for causing a computer to execute the steps of:

obtaining image data representative of a picture including a dot;

calculating the area of said dot;

calculating the position of said dot; and generating compression data based on said area and said position, wherein said dots include a first dot and a second dot, said areas include a first area of said first dot and a second area of said second dot, and said compression data is generated based on an area difference between said first area and said second area.

11. The computer-readable recording medium according to claim 10, wherein said dots further include a third dot located off a straight line on which said first dot and second dot are located, said areas further include a third area of said third dot, and said compression data is generated based on another area difference between said first area and said third area.

12. The computer-readable recording medium according to claim 10, wherein calculating the areas of dots comprises:

extracting an outline of a dot indicated by the image data;

determining curvature points on the extracted outline of the dot;

determining a vector connecting two adjacent curvature points;

determining a square circumscribed about a polygon having the curvature points as vertexes; and subtracting an area located inside the square and outside the polygon from an area of the square.

13. The computer-readable recording medium according to claim 10, wherein calculating the positions of said dots comprises:

determining a square circumscribed around a dot;

determining an intersection of diagonals of the square as the position of the dot.

14. A computer-readable recording medium encoded with a computer program for causing a computer to execute the steps of:

obtaining compression data including area difference data representative of a difference in the area between a first dot and a second dot, and distance data representative of a distance between said first dot and said second dot; and restoring image data including said first dot and said second dot based on the basis of said area difference data and said distance data.

15. A computer-readable recording medium according to claim 14, wherein said image data is restored so as to further include a third dot located between said first dot and said second dot, and an area of said third dot is determined based on said area difference data.

* * * * *